United States Patent [19]

Wiesman et al.

[11] Patent Number: 5,172,639
[45] Date of Patent: Dec. 22, 1992

[54] CORNERING PIPE TRAVELER

[75] Inventors: Richard M. Wiesman, Wayland; Edward E. Fischer, Acton; Richard R. Fontana, Lexington; Bruce B. Gamble, Wellesley; Robert T. Hsiung, Brookline; Steven J. Kozminski, Rutland, all of Mass.

[73] Assignee: Gas Research Institute, Chicago, Ill.

[21] Appl. No.: 675,487

[22] Filed: Mar. 26, 1991

[51] Int. Cl.⁵ ............................................. B61B 13/10
[52] U.S. Cl. .................................................. 104/138.2
[58] Field of Search .................. 104/138.1, 138.2, 306; 105/365, 73, 77; 378/59, 60; 250/358.1; 15/104.05, 104.063; 33/1 H; 73/40.5 R, 40, 40.5 A, 592; 358/100; 324/320, 321; 346/33 P; 352/131

[56] References Cited

U.S. PATENT DOCUMENTS

| | | | |
|---|---|---|---|
| 2,838,009 | 6/1958 | Bonanno | 105/77 |
| 4,526,106 | 7/1985 | Okada et al. | 104/138.2 |
| 4,722,001 | 1/1988 | Rohrich et al. | 358/100 |
| 4,862,808 | 9/1989 | Hedgcoxe et al. | 378/60 |
| 5,018,451 | 5/1991 | Hapstack | 104/138.2 |

FOREIGN PATENT DOCUMENTS

| | | | |
|---|---|---|---|
| 3236947 | 4/1984 | Fed. Rep. of Germany | 104/138.2 |
| 0105839 | 1/1983 | Japan | 104/138.2 |
| 0038639 | 2/1989 | Japan | 378/60 |
| 0210852 | 8/1989 | Japan | 378/60 |
| 0011458 | 1/1990 | Japan | 104/138.2 |
| 0060875 | 3/1990 | Japan | 104/138.2 |
| 0117463 | 5/1990 | Japan | 104/138.2 |
| 0283564 | 11/1990 | Japan | 104/138.2 |

Primary Examiner—Robert J. Oberleitner
Assistant Examiner—Mark T. Le
Attorney, Agent, or Firm—Iandiorio & Dingman

[57] ABSTRACT

A cornering pipe traveler includes a tractor having a pair of carriages, a leading carriage and a trailing carriage, each carriage including a clamping device for positively engaging the inner surface of the pipe, and structure for propelling the carriage along the pipe; interconnected between the pair of carriages there is a device for exerting a curling force between the two carriages for mechanically compelling the lead carriage to curl and enter a turn in the pipe; also included is structure for aligning the lead carriage so that the curling force compels the pipe traveler to enter a selected turn to be made.

14 Claims, 56 Drawing Sheets

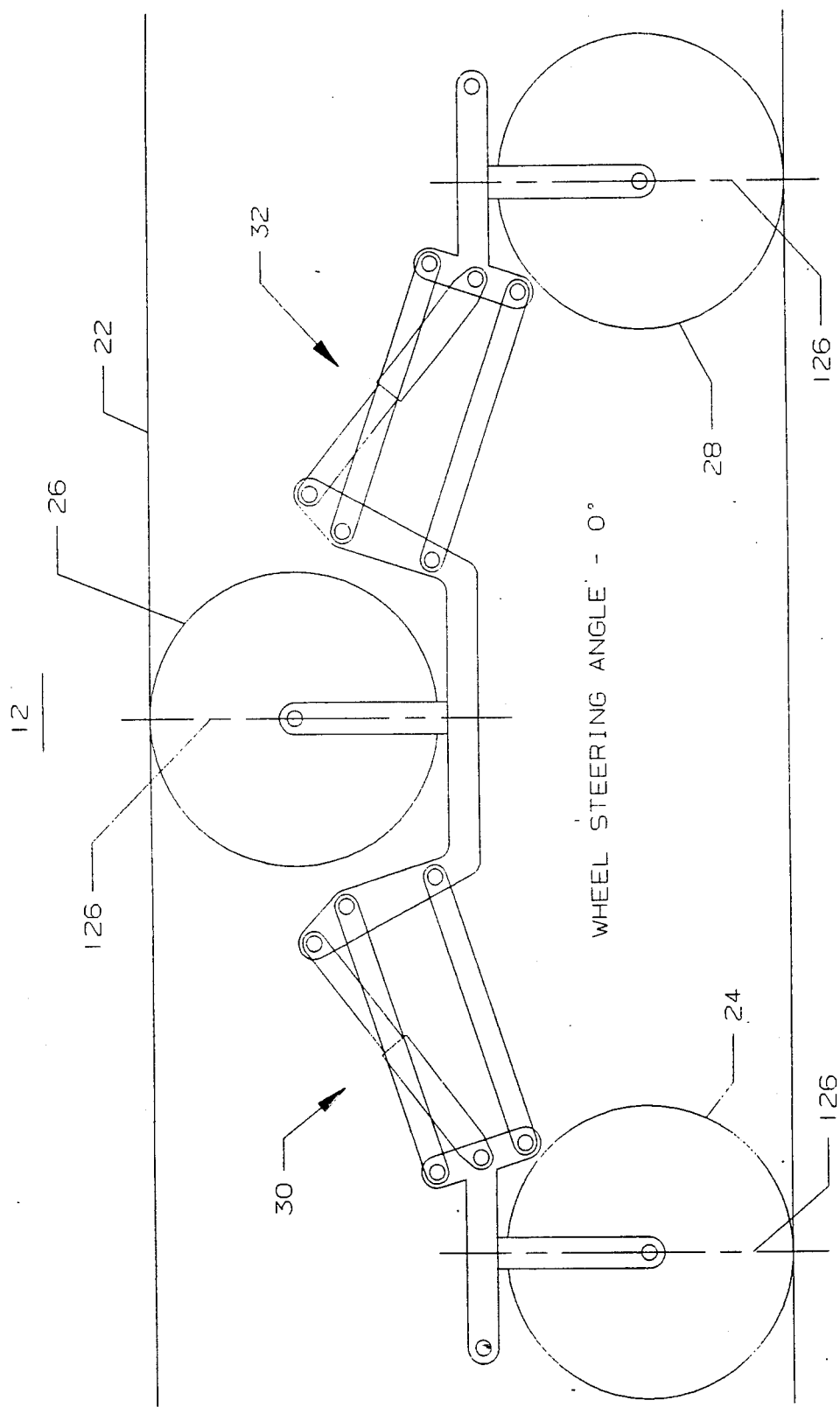

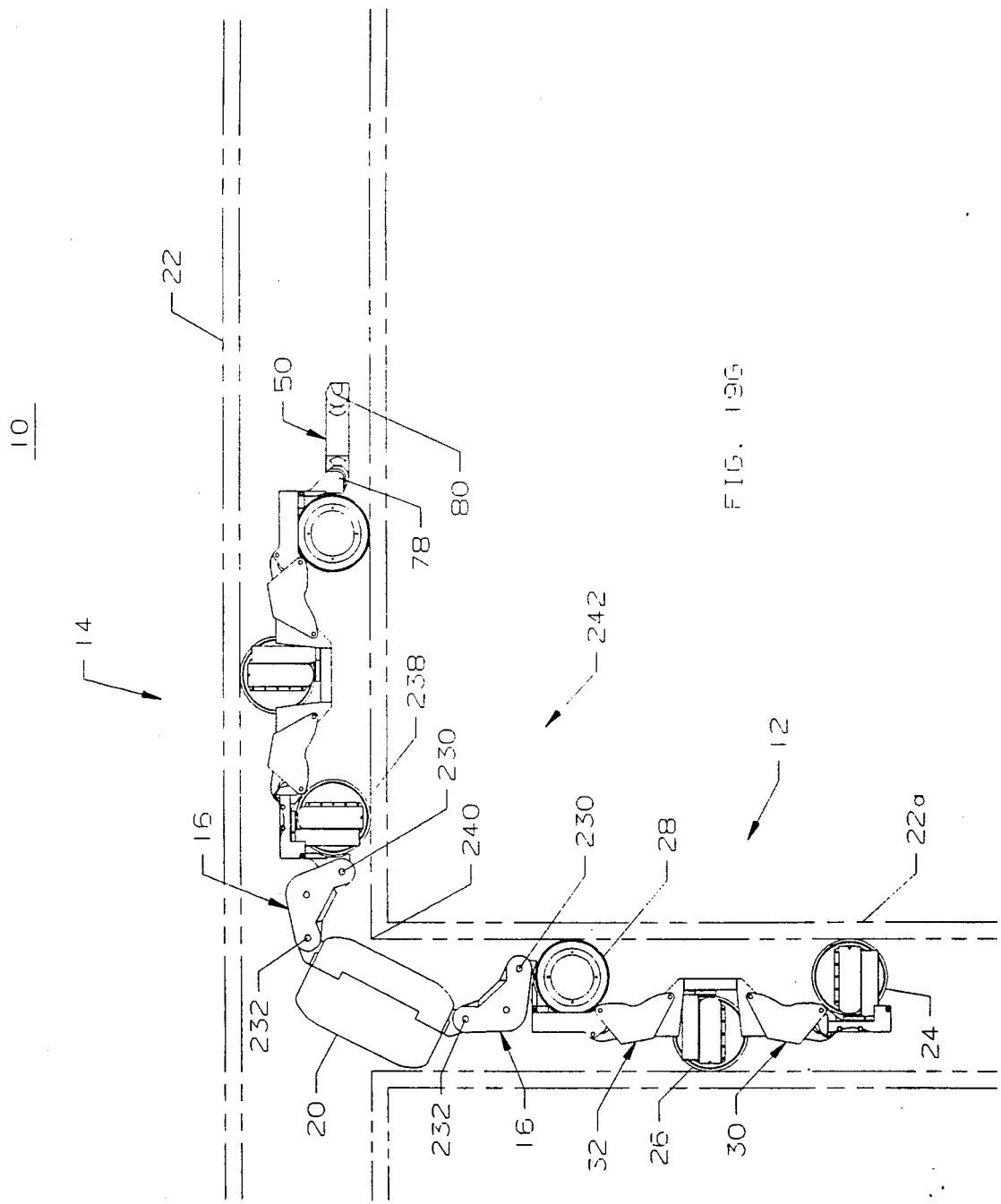

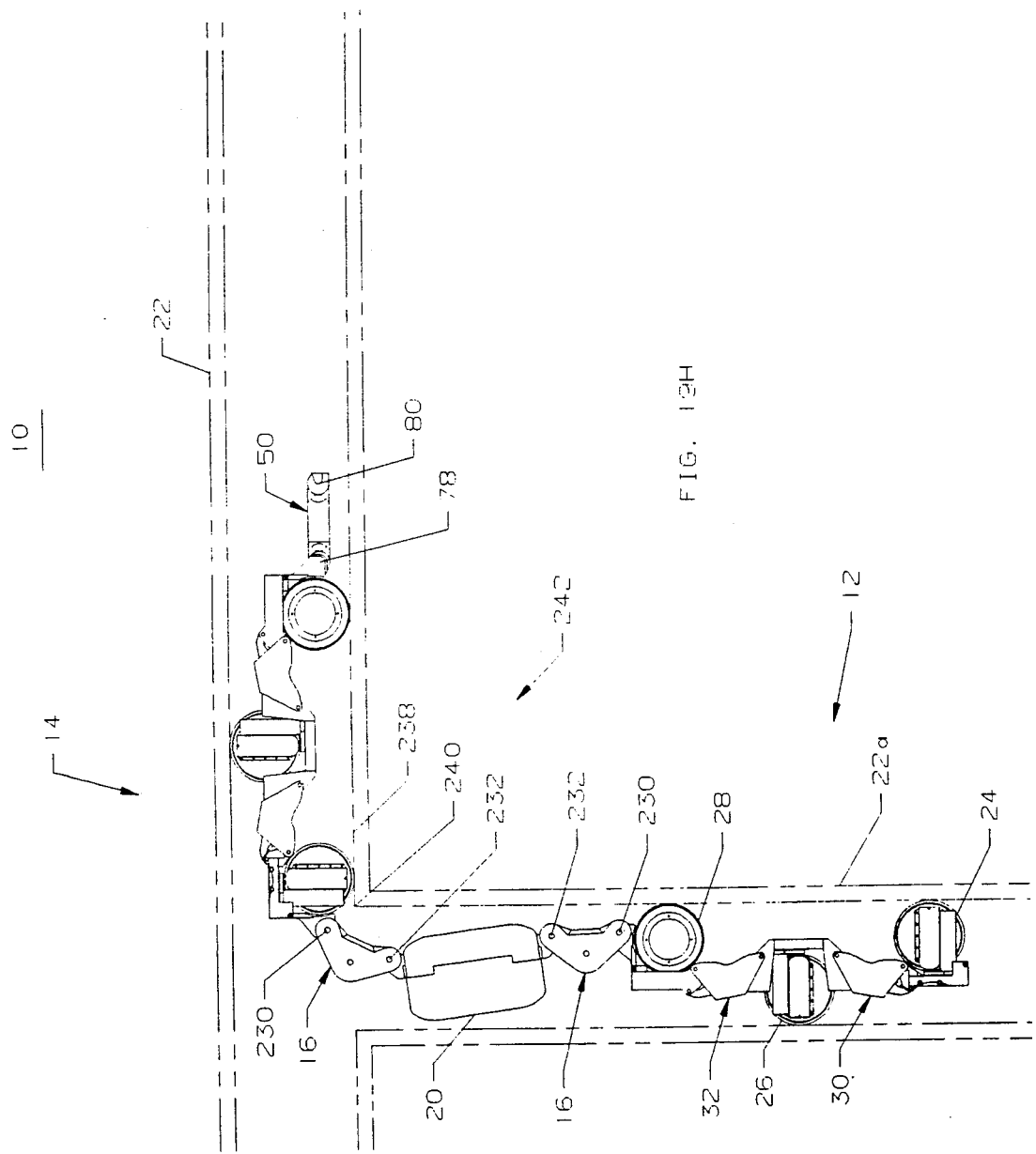

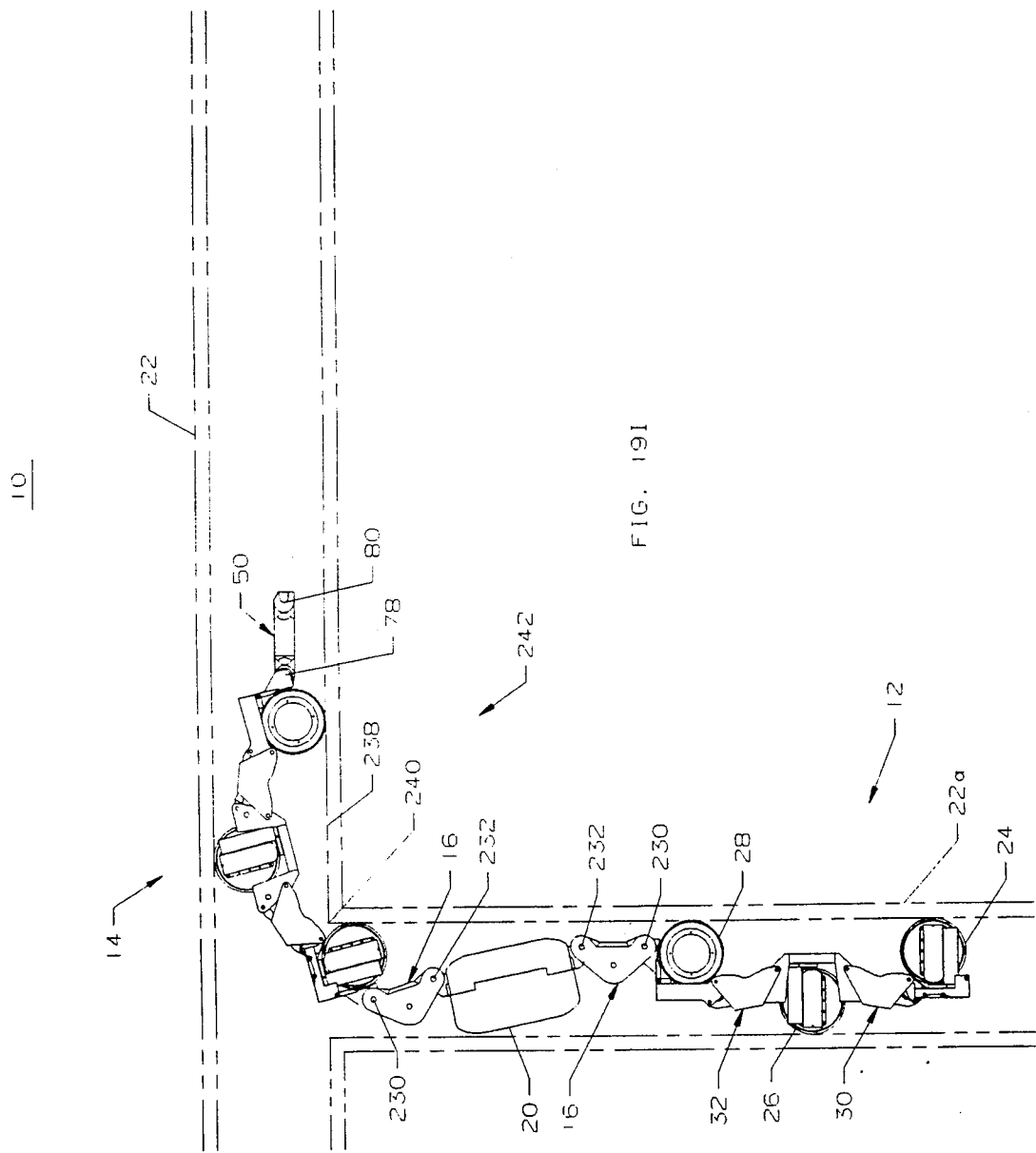

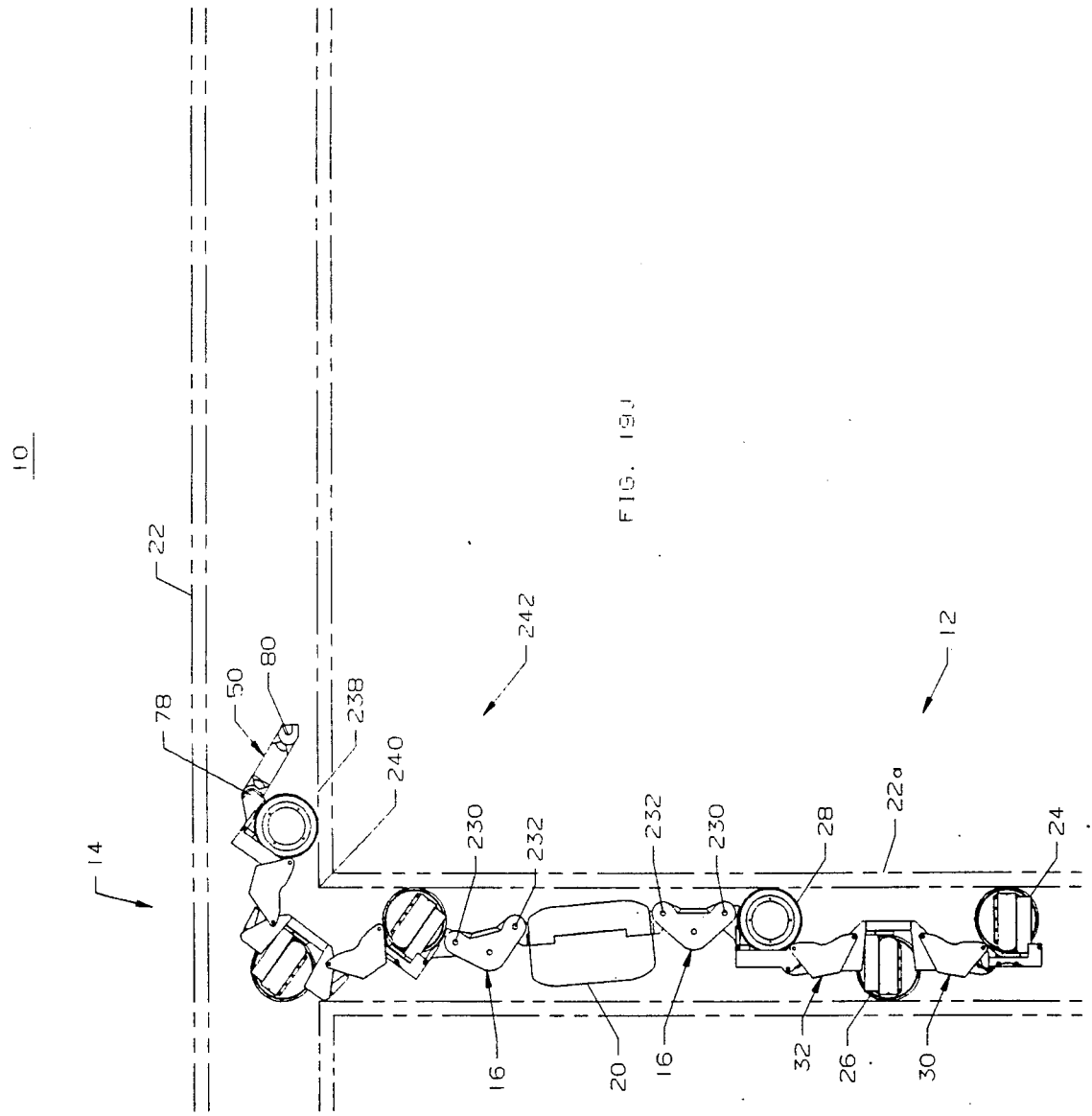

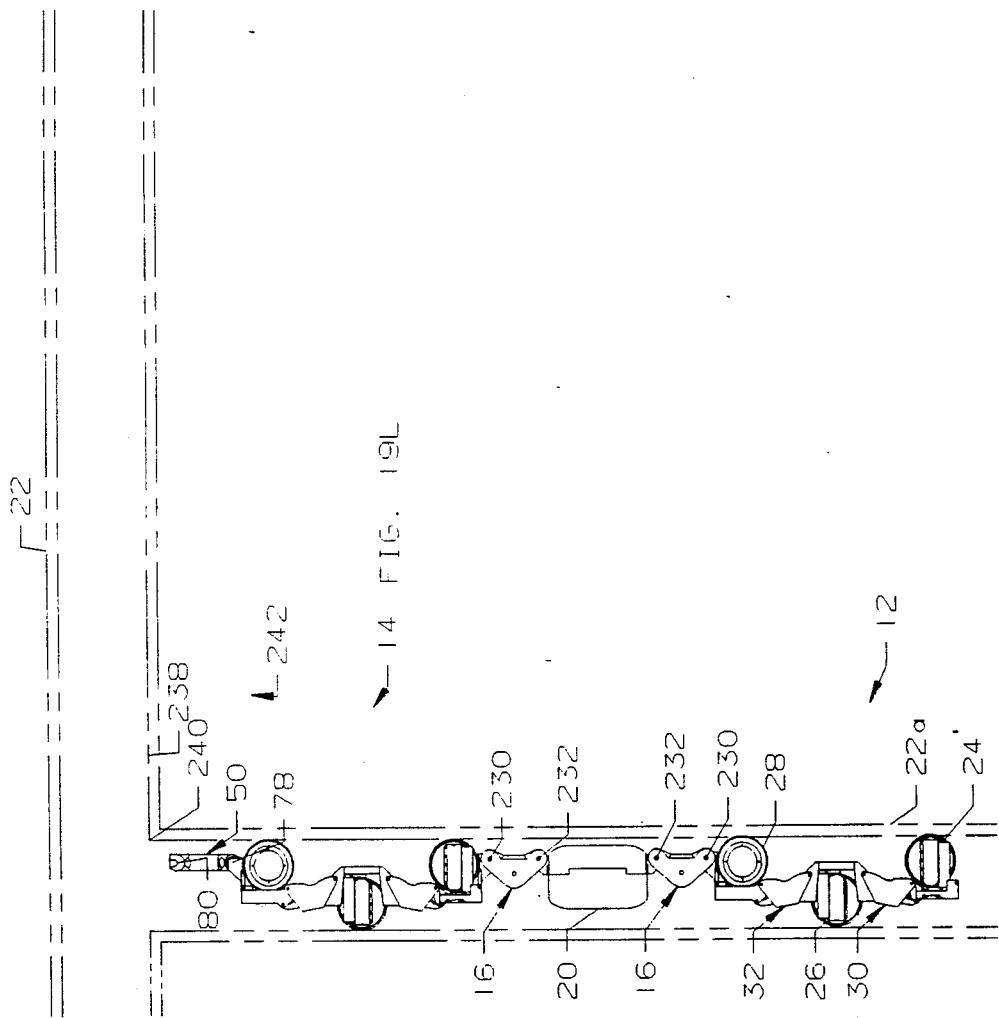

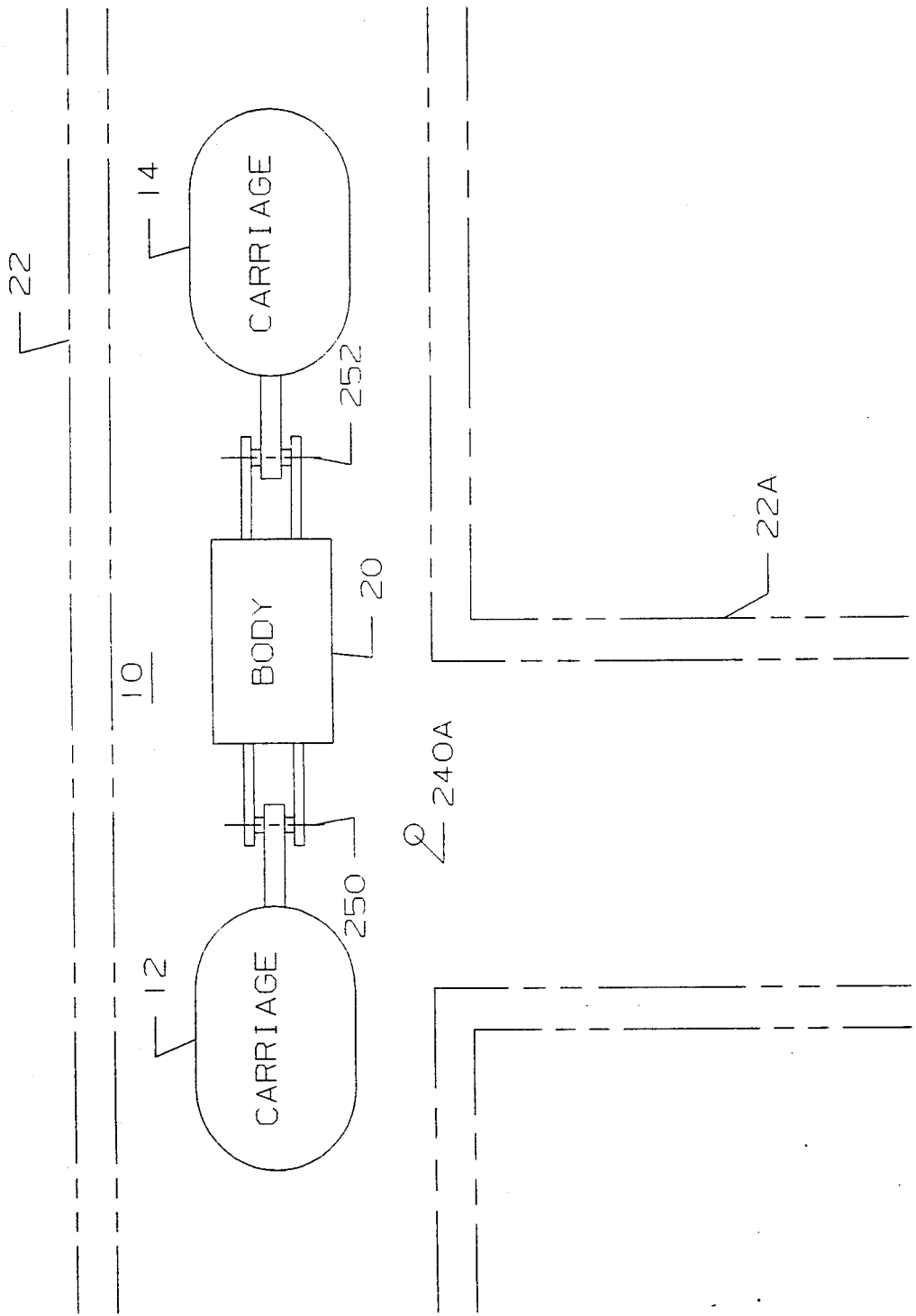

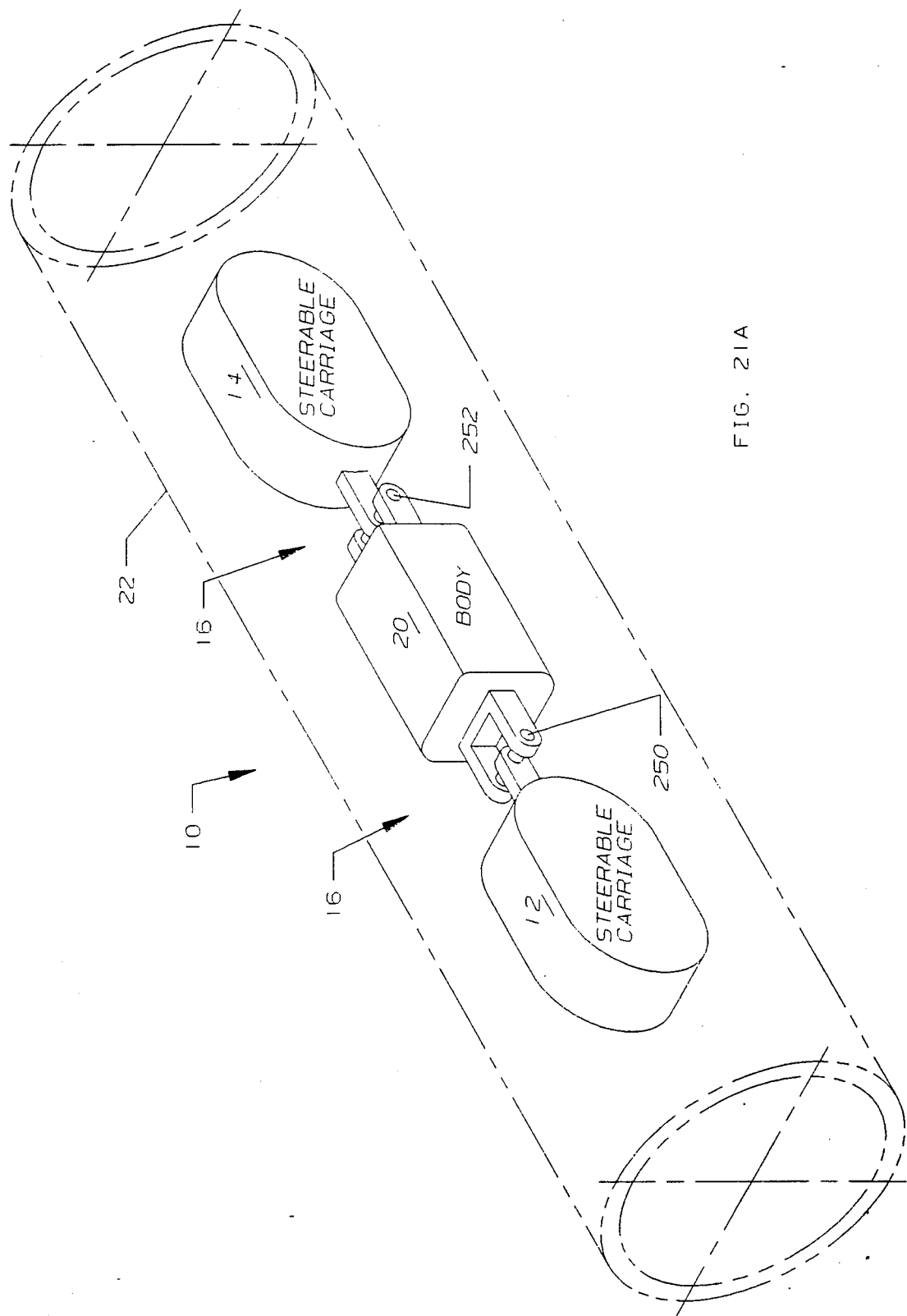

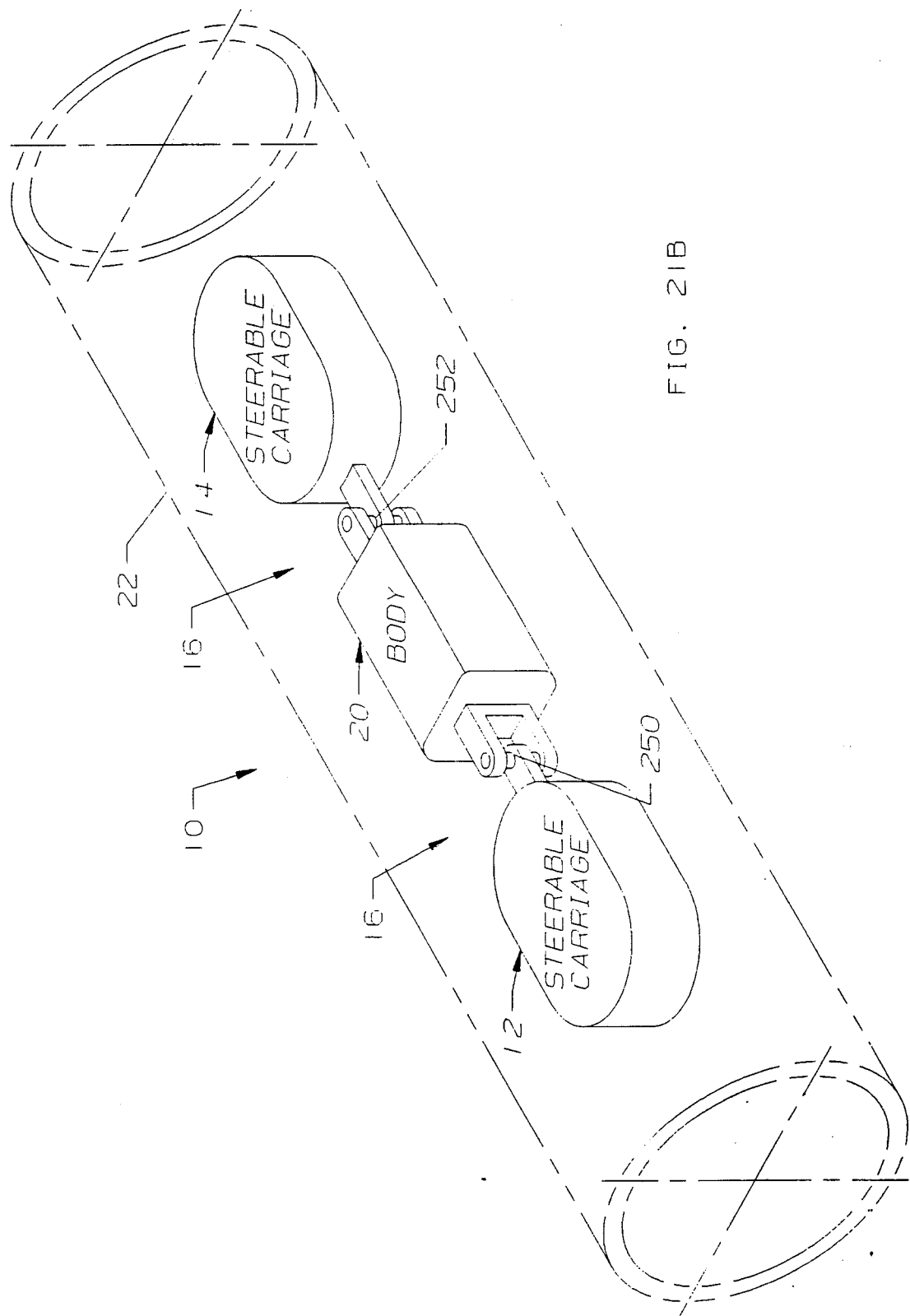

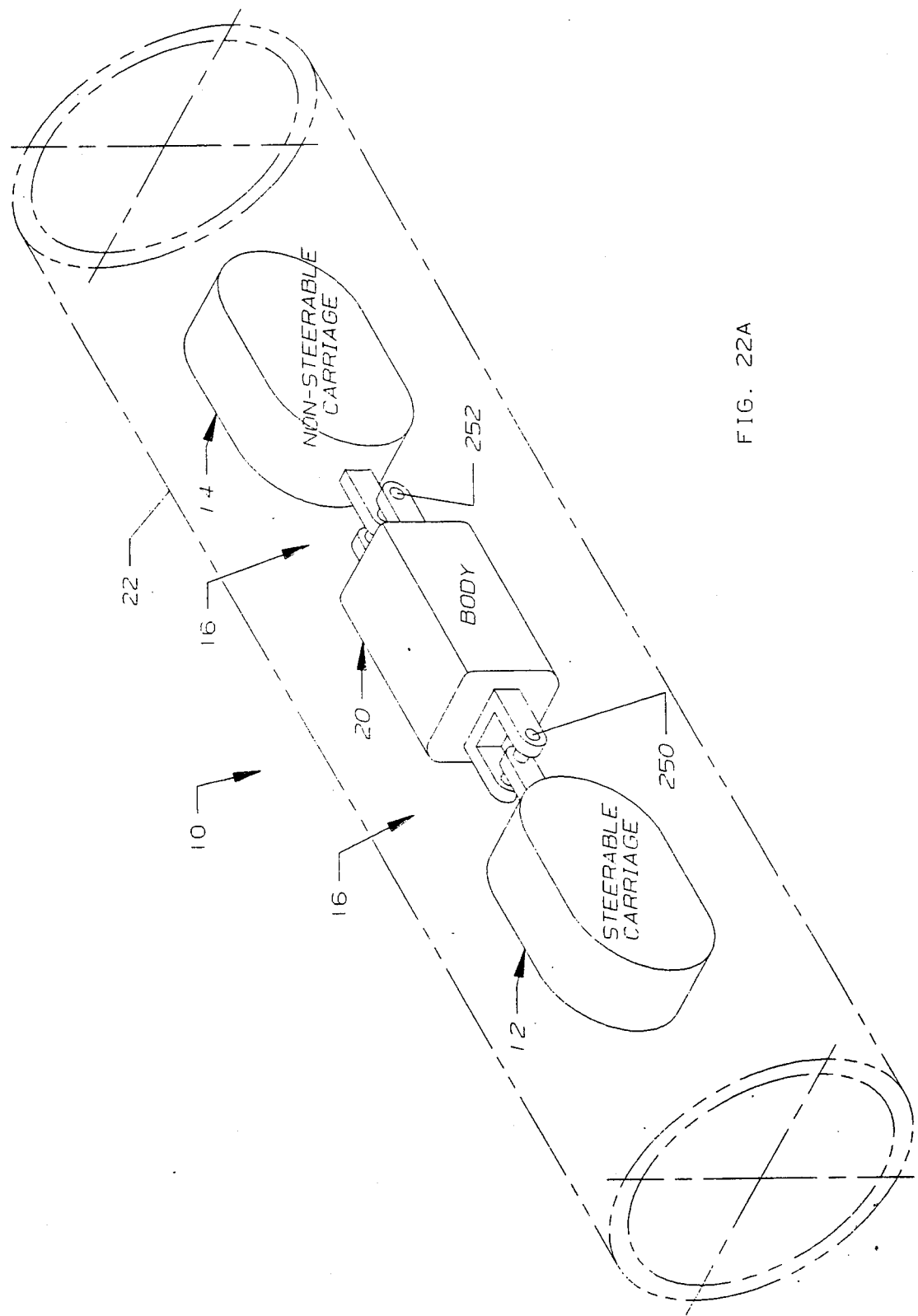

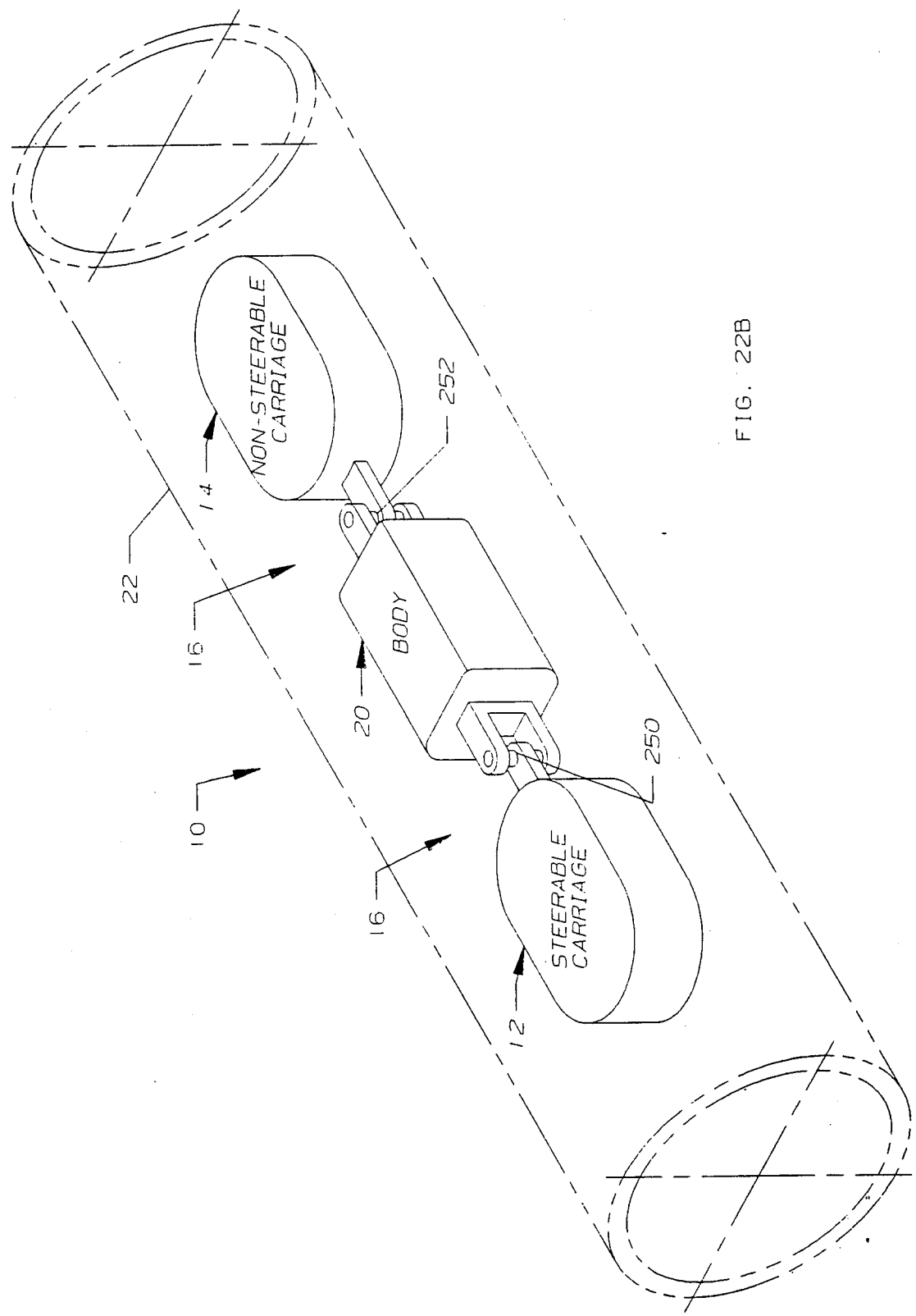

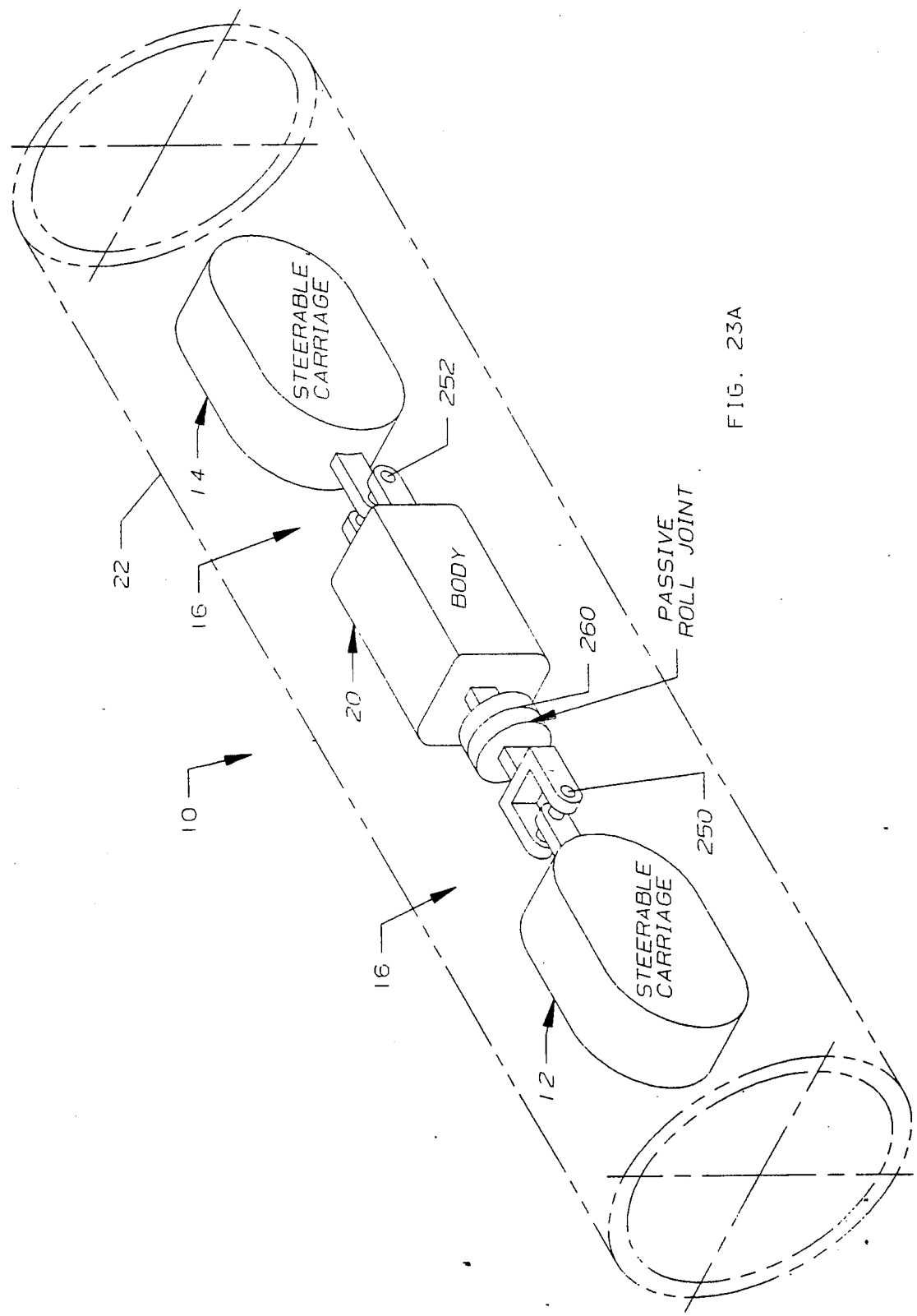

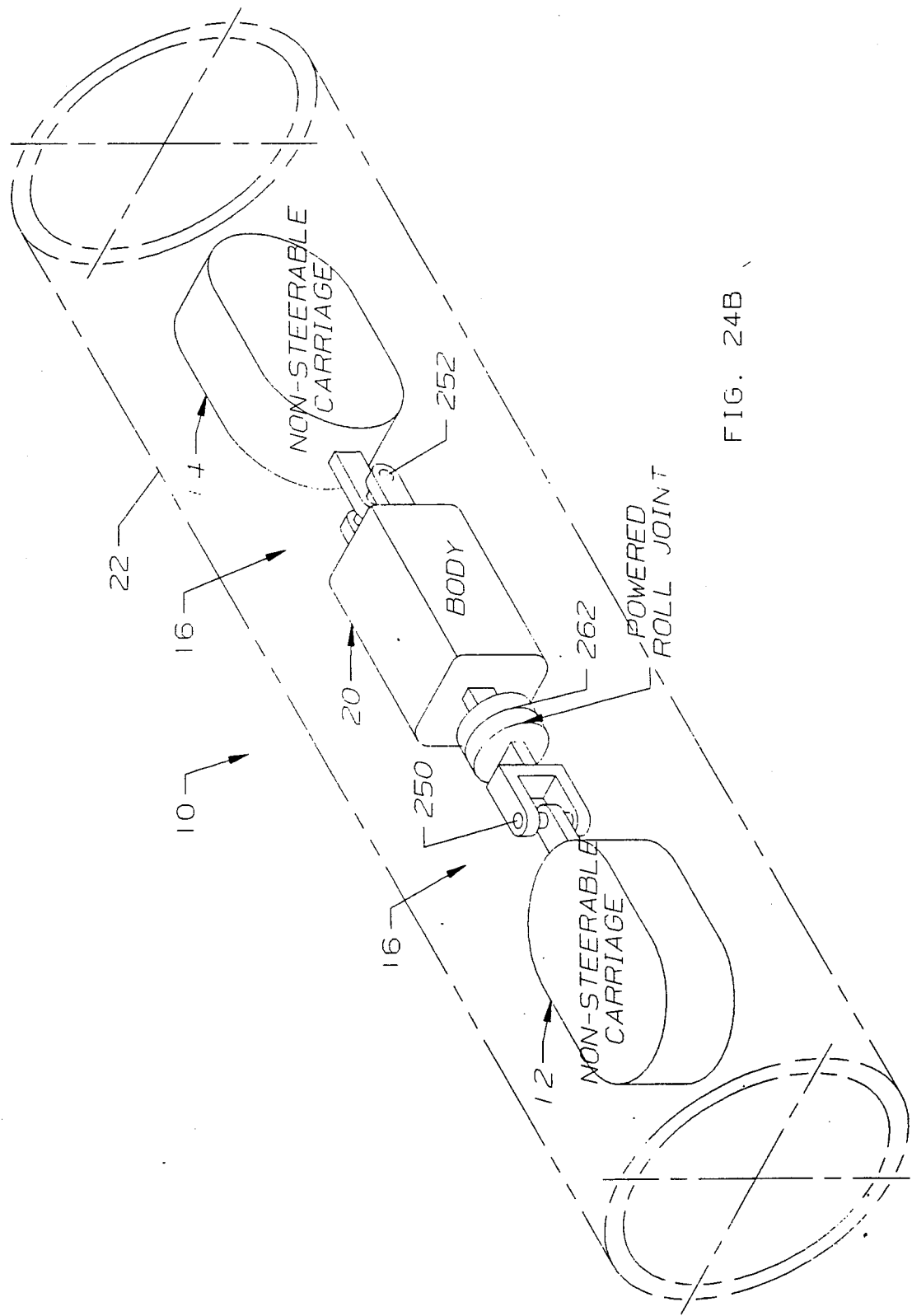

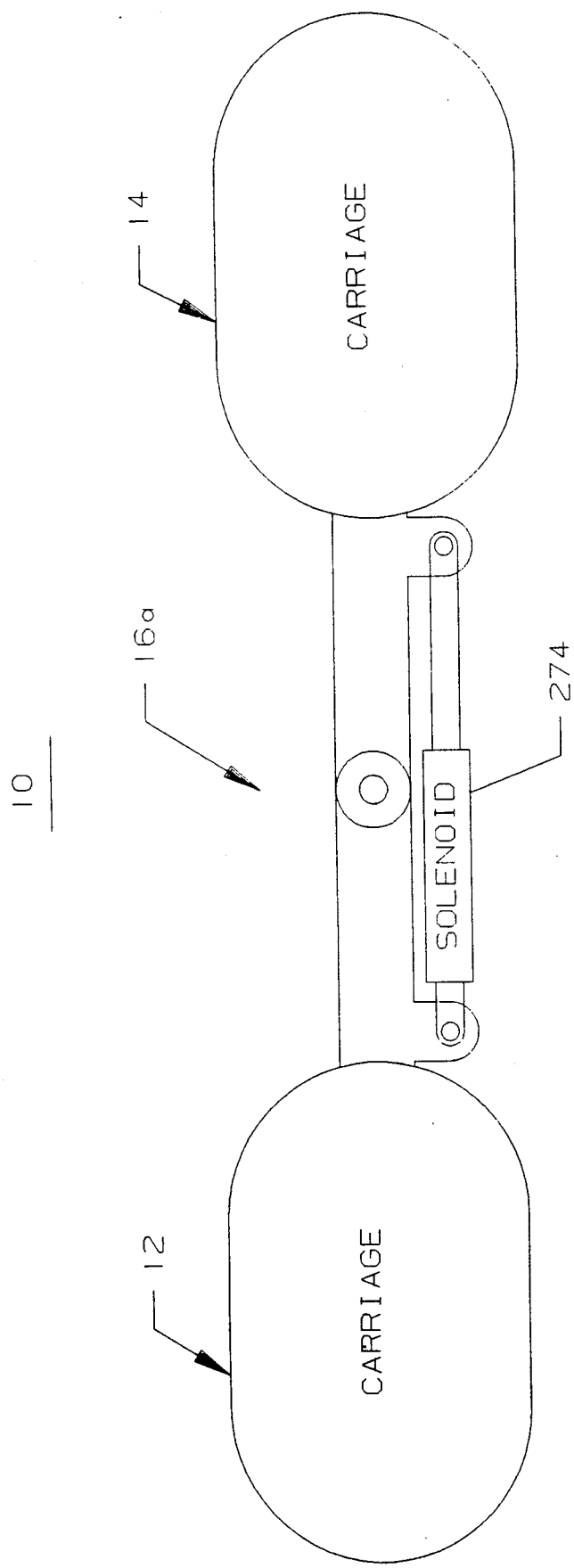

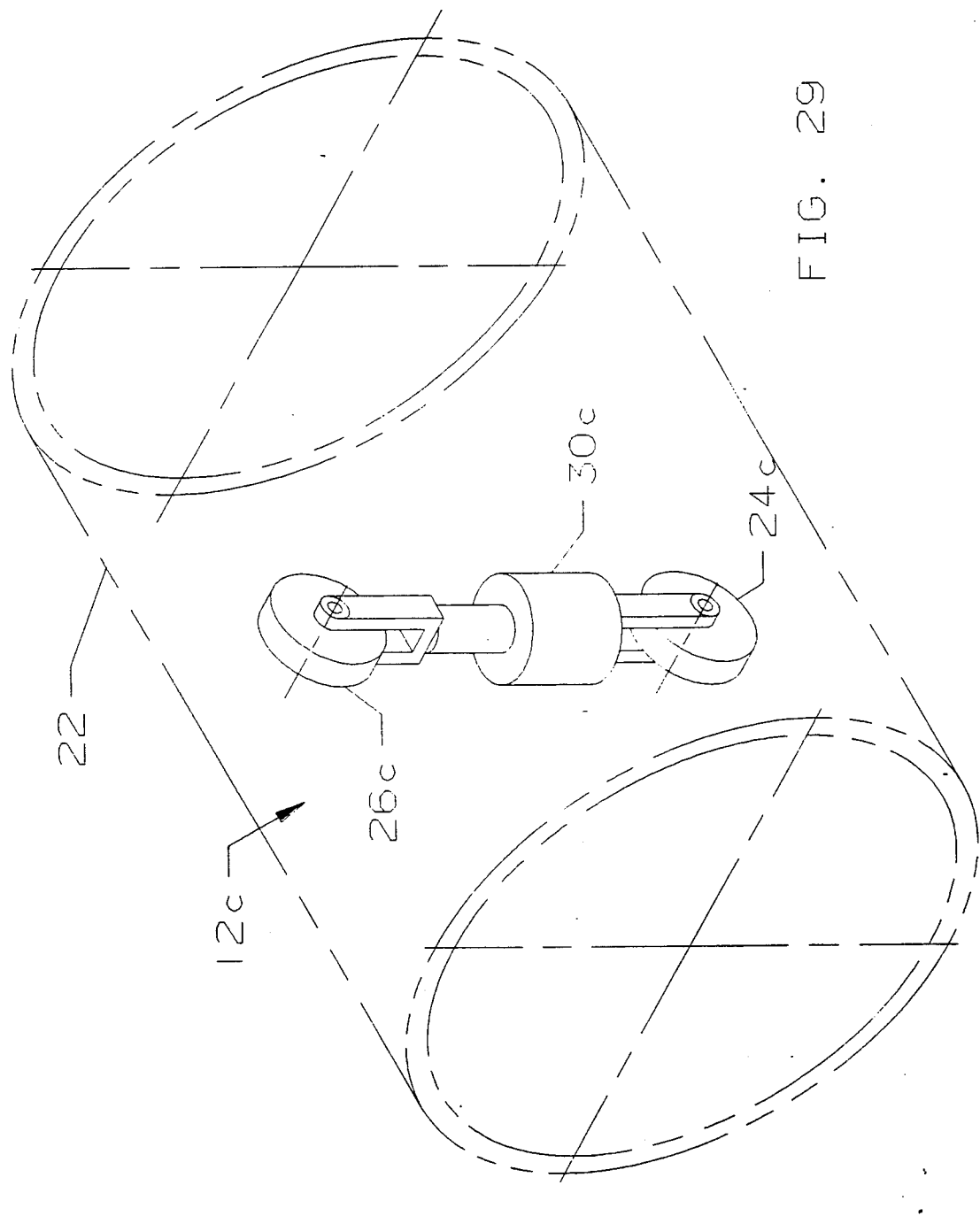

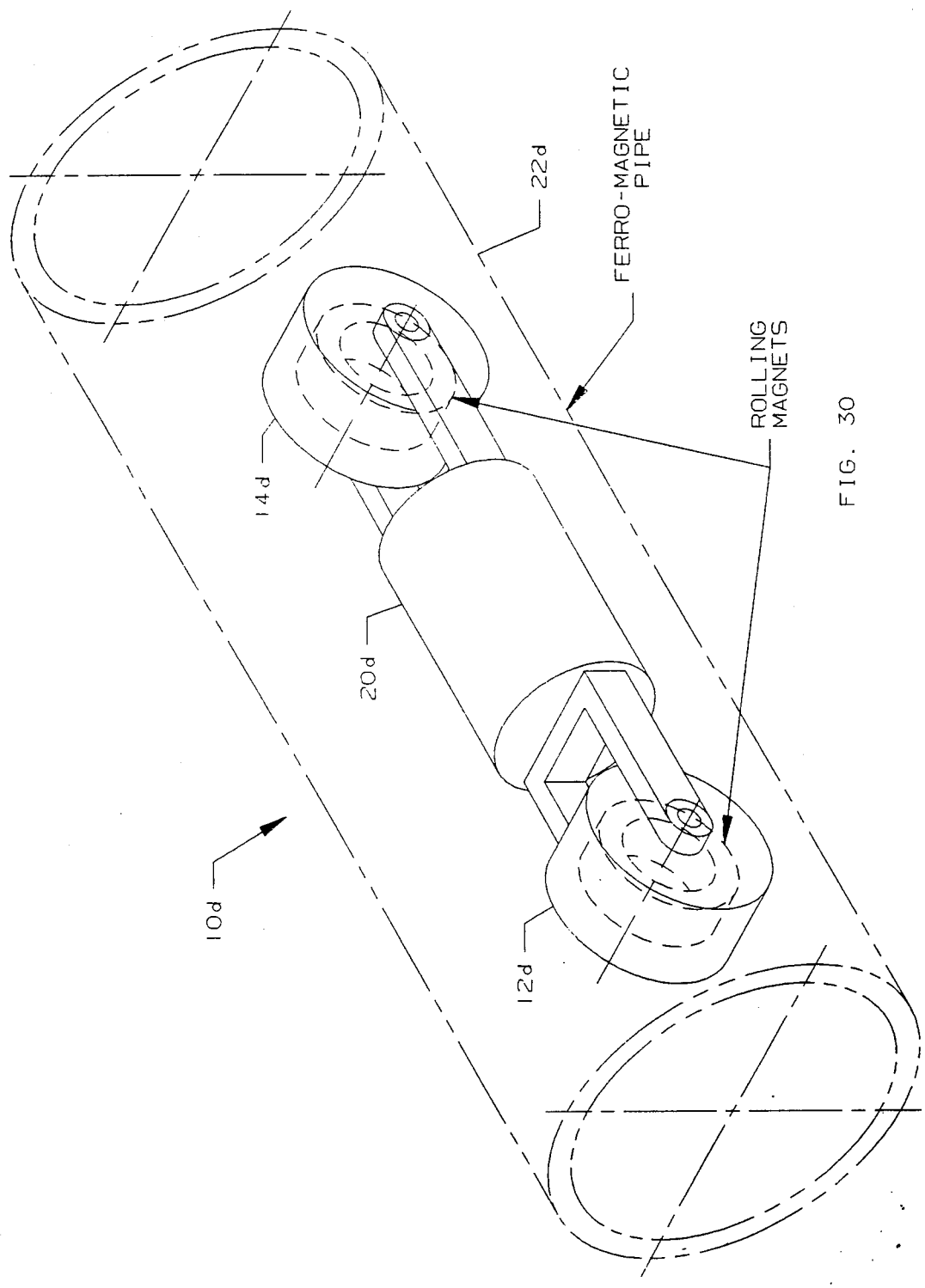

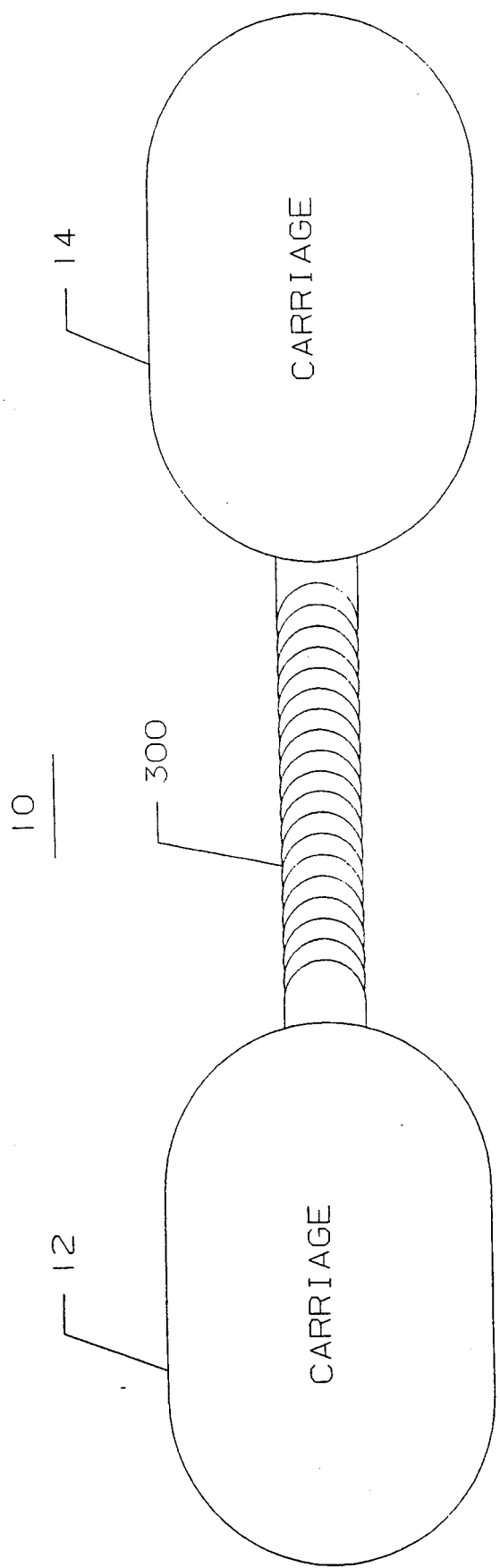

CORNERING PIPE TRAVELER

FIELD OF INVENTION

This invention relates to a cornering pipe traveler, and more particularly to such a pipe traveler which automatically, mechanically feels and enters branch paths.

BACKGROUND OF INVENTION

There are a number of devices available for traveling through pipes, but none of these devices or travelers can turn corners selectively, that is, where there is a sharp corner or more than one option. Others can turn but only when the pipe itself makes a turn without any other options or branches. A separate problem is designing travelers which can climb and descend steep or vertical pipes as well as adapt to travel through pipes of widely ranging sizes and locally irregular sizes and shapes. For example, those tractors which are small enough to travel through many different sized, larger and larger pipes have no way of establishing traction to ascend or descend steep or vertical pipes. Some such travelers work only in pipes of specific material, e.g., ferromagnetic pipes. Some travelers cannot be used in live systems because they block the fluid flow.

SUMMARY OF INVENTION

It is therefore an object of this invention to provide an improved pipe traveler which can selectively, mechanically turn corners.

It is a further object of this invention to provide such an improved pipe traveler which can positively engage the pipe for steep ascents and descents.

It is a further object of this invention to provide such an improved pipe traveler which can adjust for operation in a wide range of different pipe diameters.

It is a further object of this invention to provide such an improved pipe traveler which accommodates for local irregularities in the pipe surface.

It is a further object of this invention to provide such an improved pipe traveler which is operable in pipes of any material.

It is a further object of this invention to provide such an improved pipe traveler which is usable in live fluid flow systems with minimum blocking or interfering with the fluid flow.

It is a further object of this invention to provide such an improved pipe traveler which is selectively engageable in different orientations with the pipe to avoid contact with obstructions, contaminants or other hazards in the pipe.

The invention results from the realization that a truly effective and reliable selective cornering pipe traveler can be achieved using a tractor having a pair of carriages, a leading carriage and a trailing carriage, each of which engages opposing surfaces of a pipe, and curling means interconnecting the carriages for exerting a curling force in a plane to mechanically compel the leading carriage to curl in the plane of the curling force and enter a turn in the pipe.

This invention features a cornering pipe traveler including a tractor having a pair of carriages, a leading carriage and a trailing carriage. Each carriage includes clamping means for positively engaging the inner surface of the pipe and means for propelling the carriage along the pipe. There are curling means interconnected between the pair of carriages for exerting in a single plane a curling force between the two carriages for mechanically compelling the lead carriage to curl in the plane of the curling force and enter a turn in the pipe. There are means for aligning the plane of the curling force with the plane of a selected turn to be made.

In a preferred embodiment the clamping means includes at least two members for contacting opposing surfaces of the pipe. The pipe may include a ferromagnetic material and the clamping means may include at least one magnetic member for engaging the pipe surface. The clamping means may include at least three members, two for contacting one surface of the pipe and the third for contacting the opposing surface of the pipe. The clamping means may include means for adjusting the carriage to engage with the surface of pipes having a range of different diameters. The means for adjusting may also include means for maintaining clamping force through a range of angles of the two members about the third member from an acute angle to an angle of 180° or greater. The clamping means may include at least one wheel. The means for propelling may include means for driving at least one of the wheels. The clamping means may include a track. The means for aligning may include means for orienting the tractor to align the plane of the curling force with the plane of the turn. The means for orienting may also include means for steering at least one of the carriages. The means for steering may steer the carriages simultaneously or sequentially. The means for aligning may also include means for swiveling members of at least one of the carriages about their respective swivel axes to reorient the carriage and the plane of the curling force. The clamping means may further include a mechanism interconnecting the third member with each of the first and second members for maintaining the position of the swivel axes relative to the pipe surface.

DISCLOSURE OF PREFERRED EMBODIMENT

Other objects, features and advantages will occur to those skilled in the art from the following description of a preferred embodiment and the accompanying drawings, in which:

FIG. 8 is a schematic diagram of the carriage of FIGS. 7A and B with all three wheels at a steering angle of 0°;

Figure 23B:
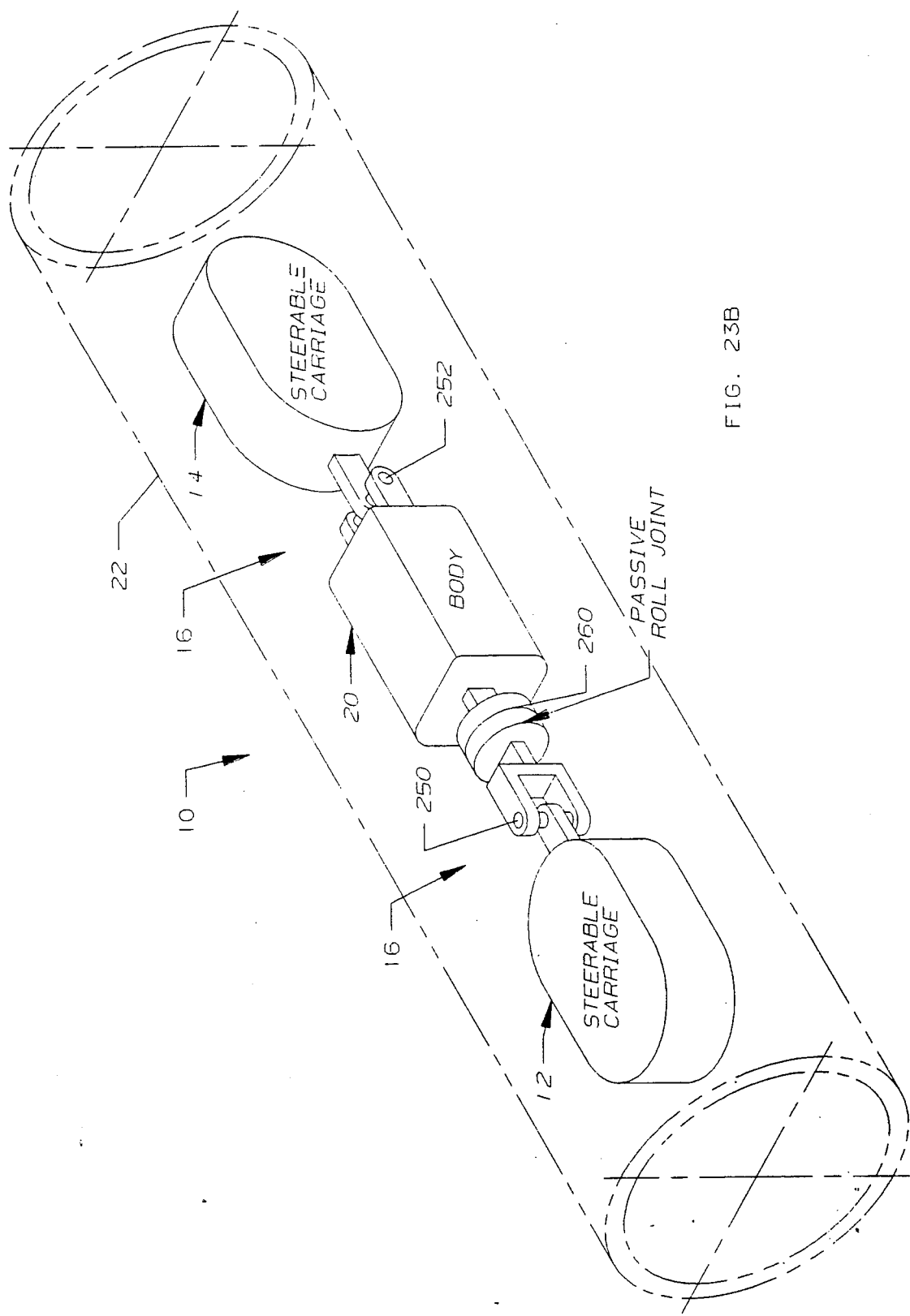
Figure 23C:
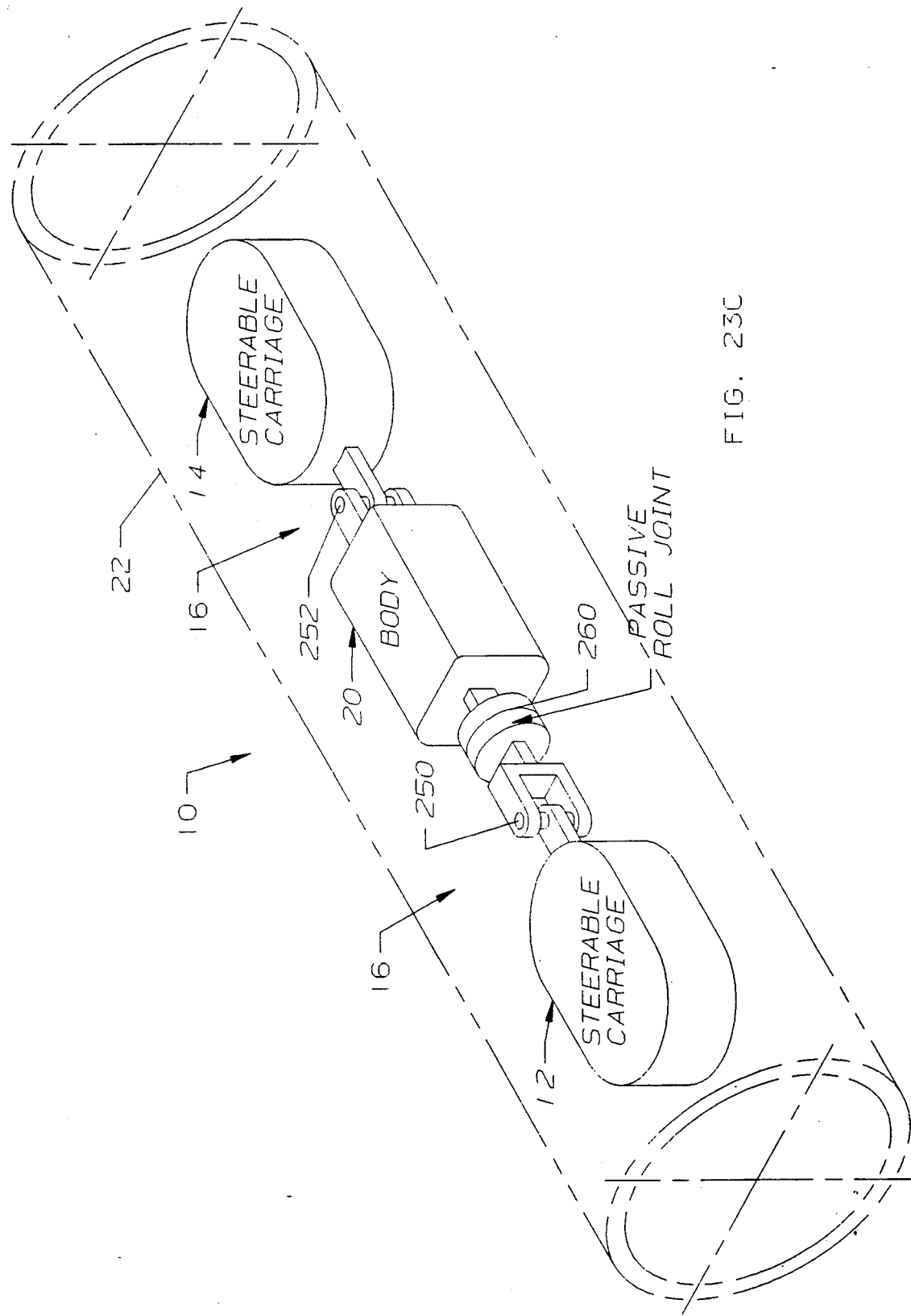
Figure 24A:
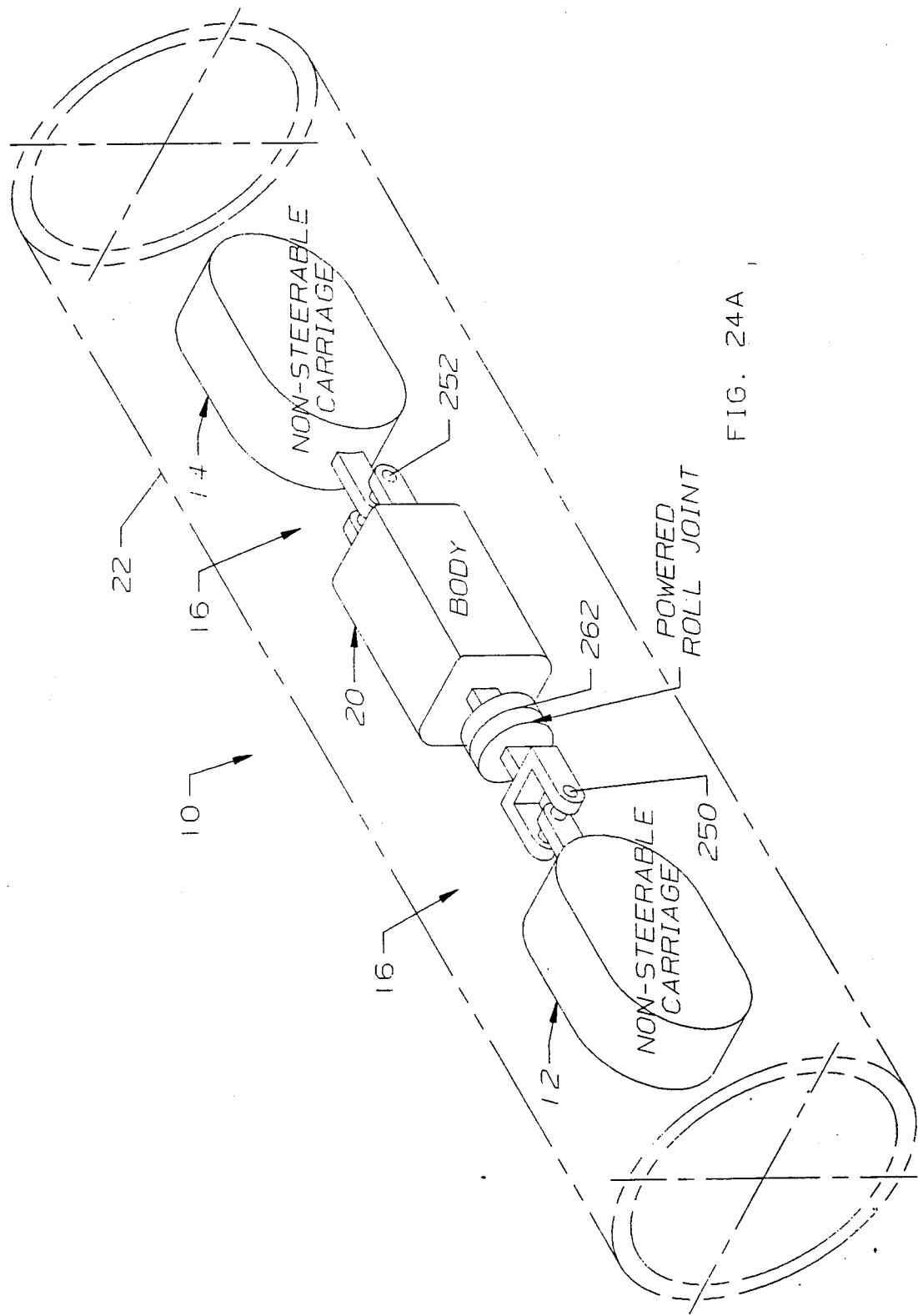
Figure 24C:
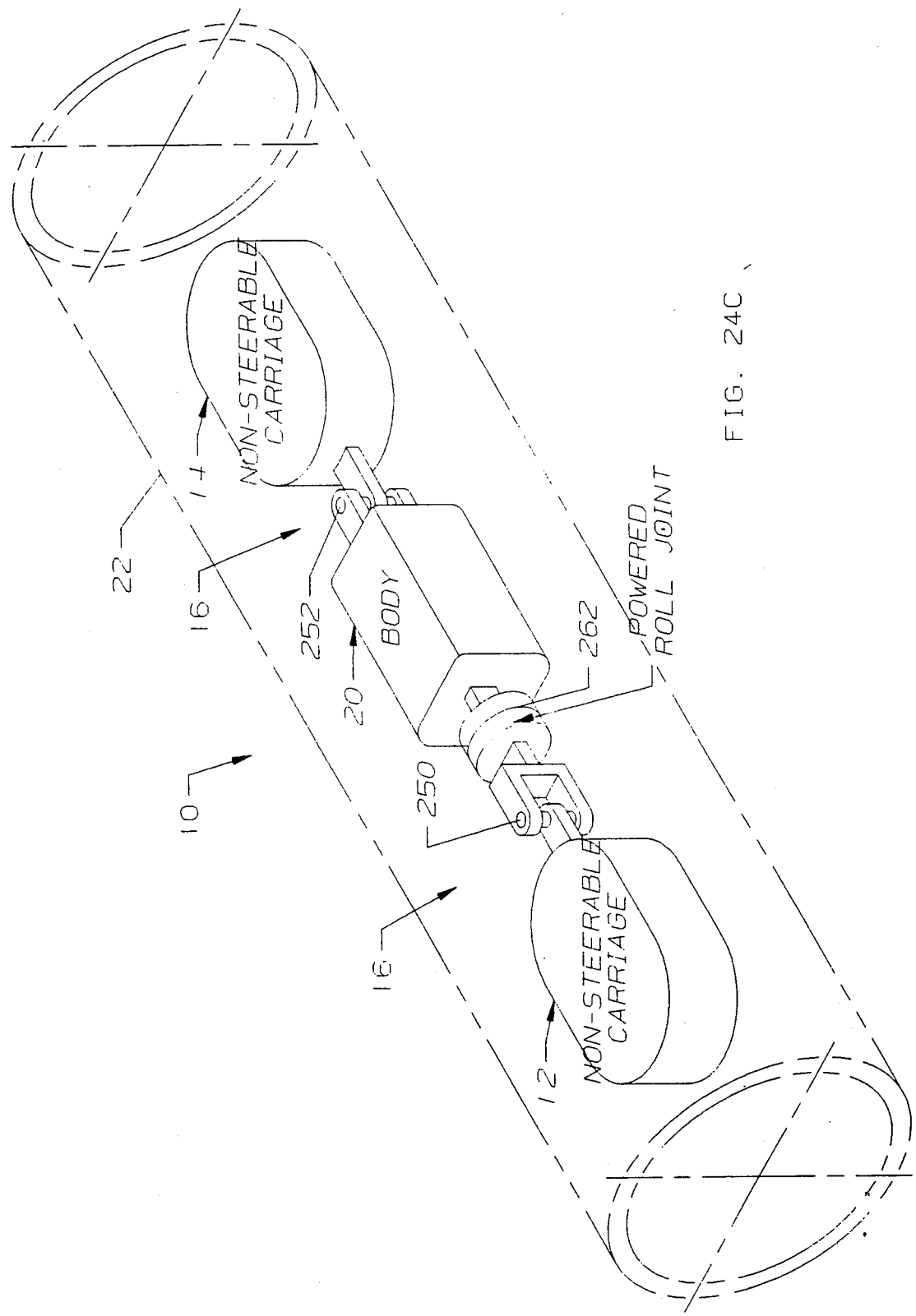
Figure 25:
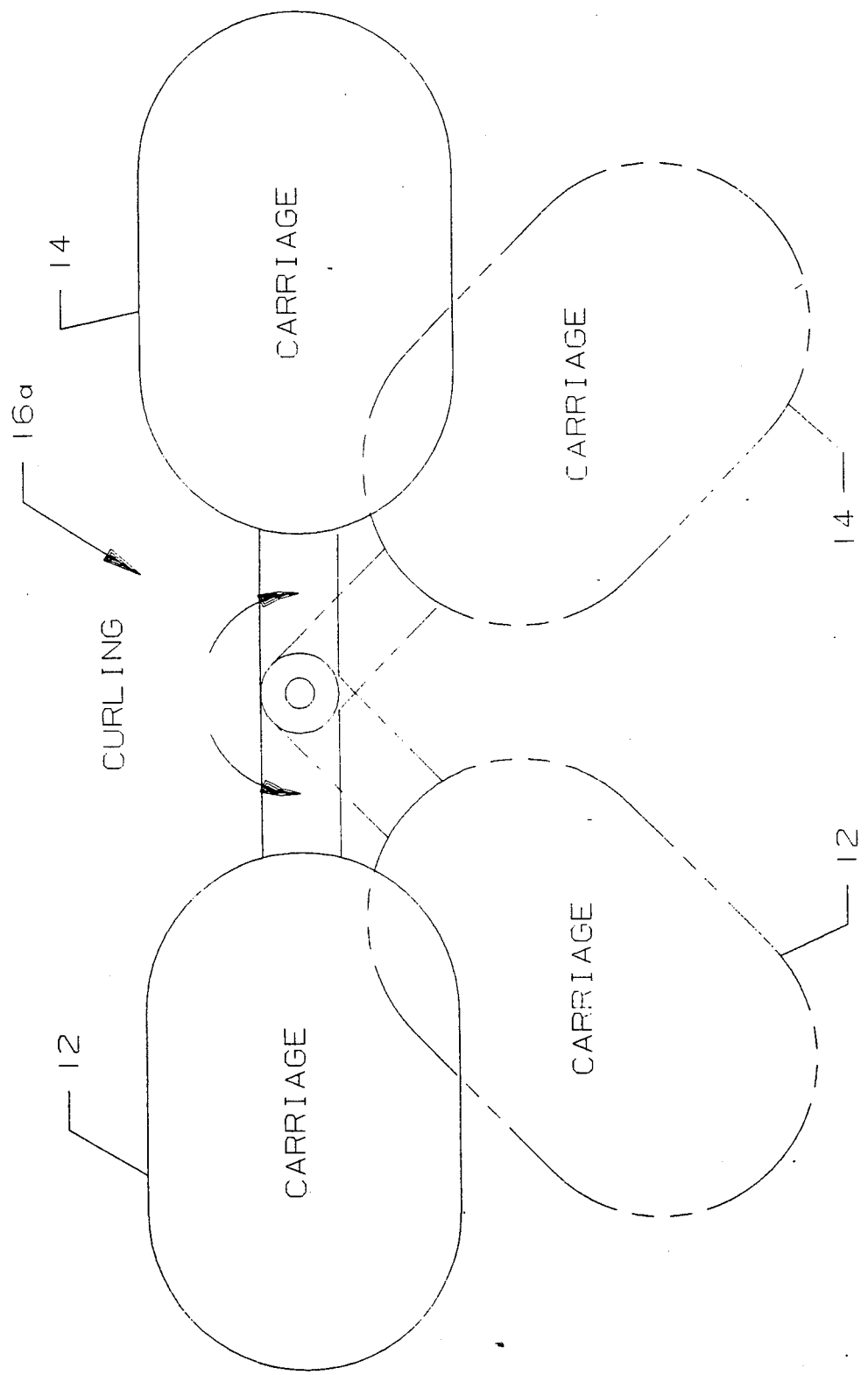
Figure 26A:
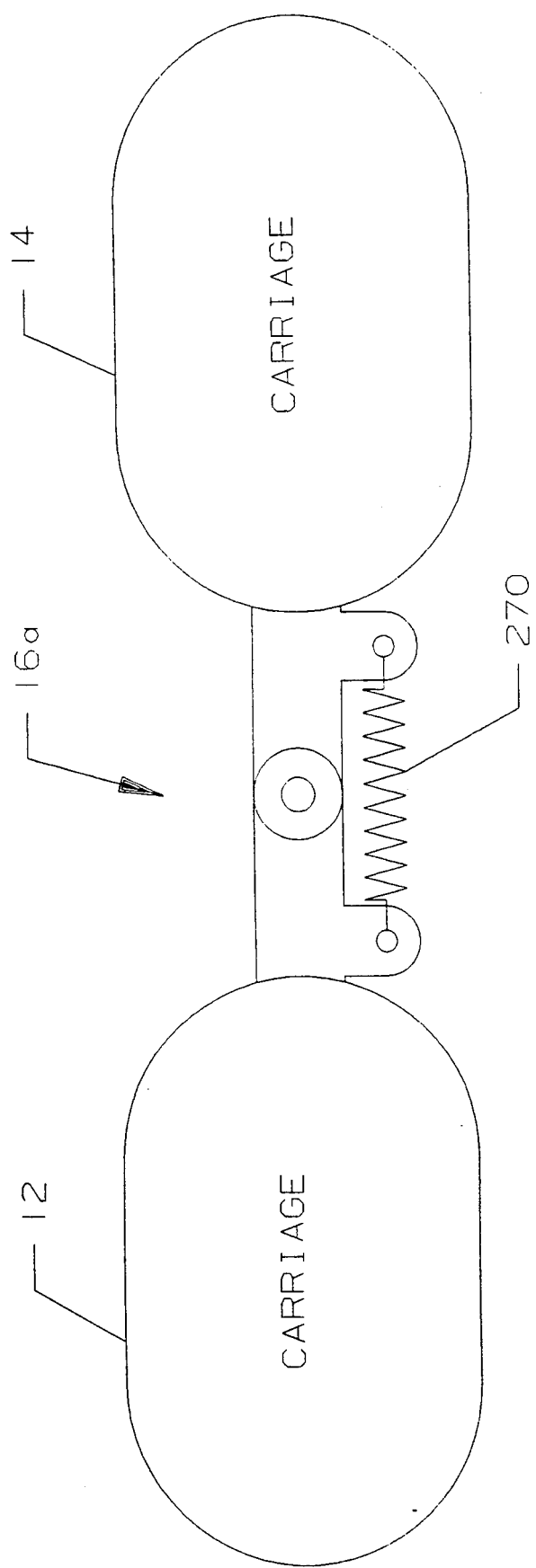
Figure 27B:
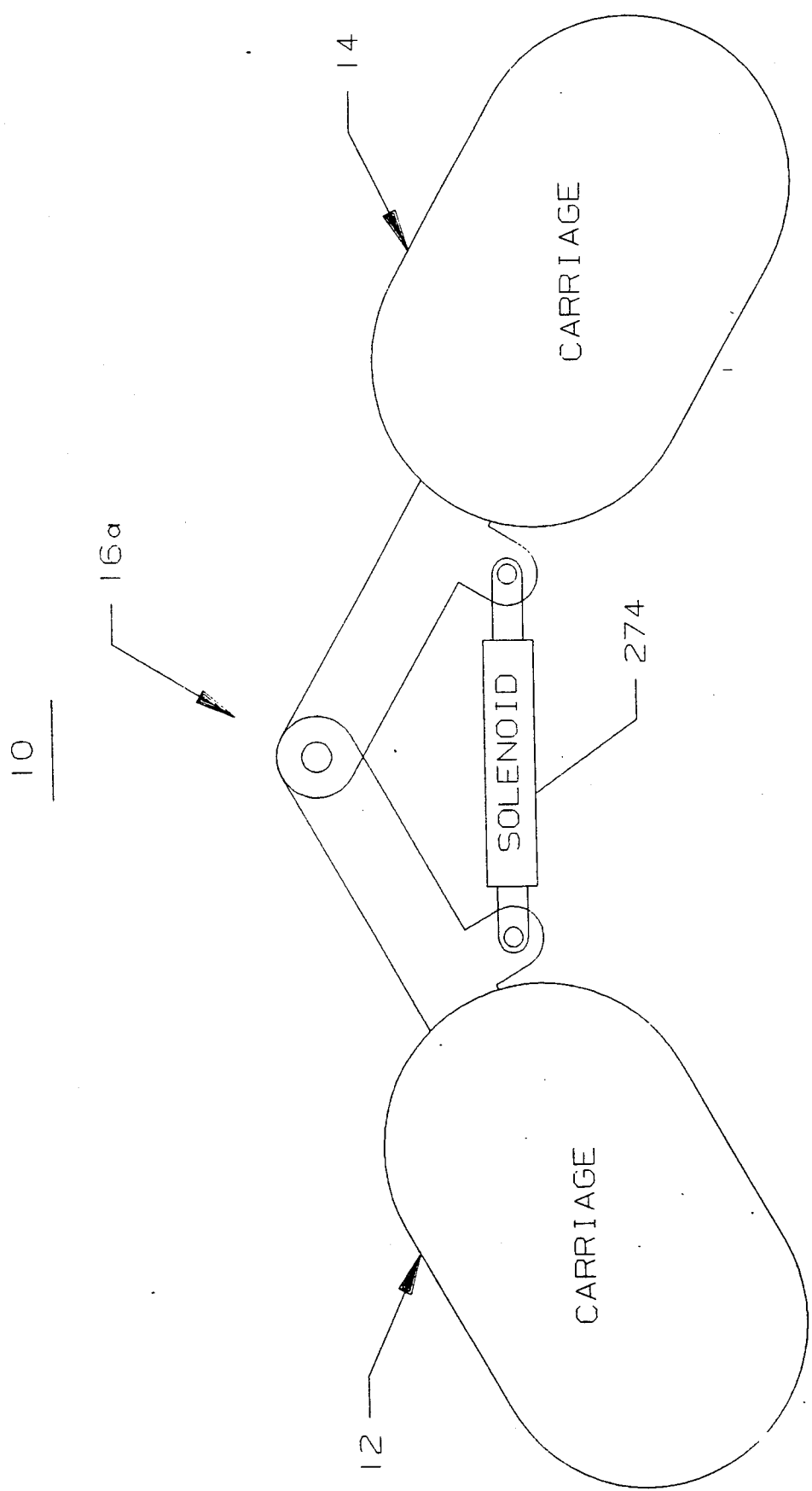
Figure 28:
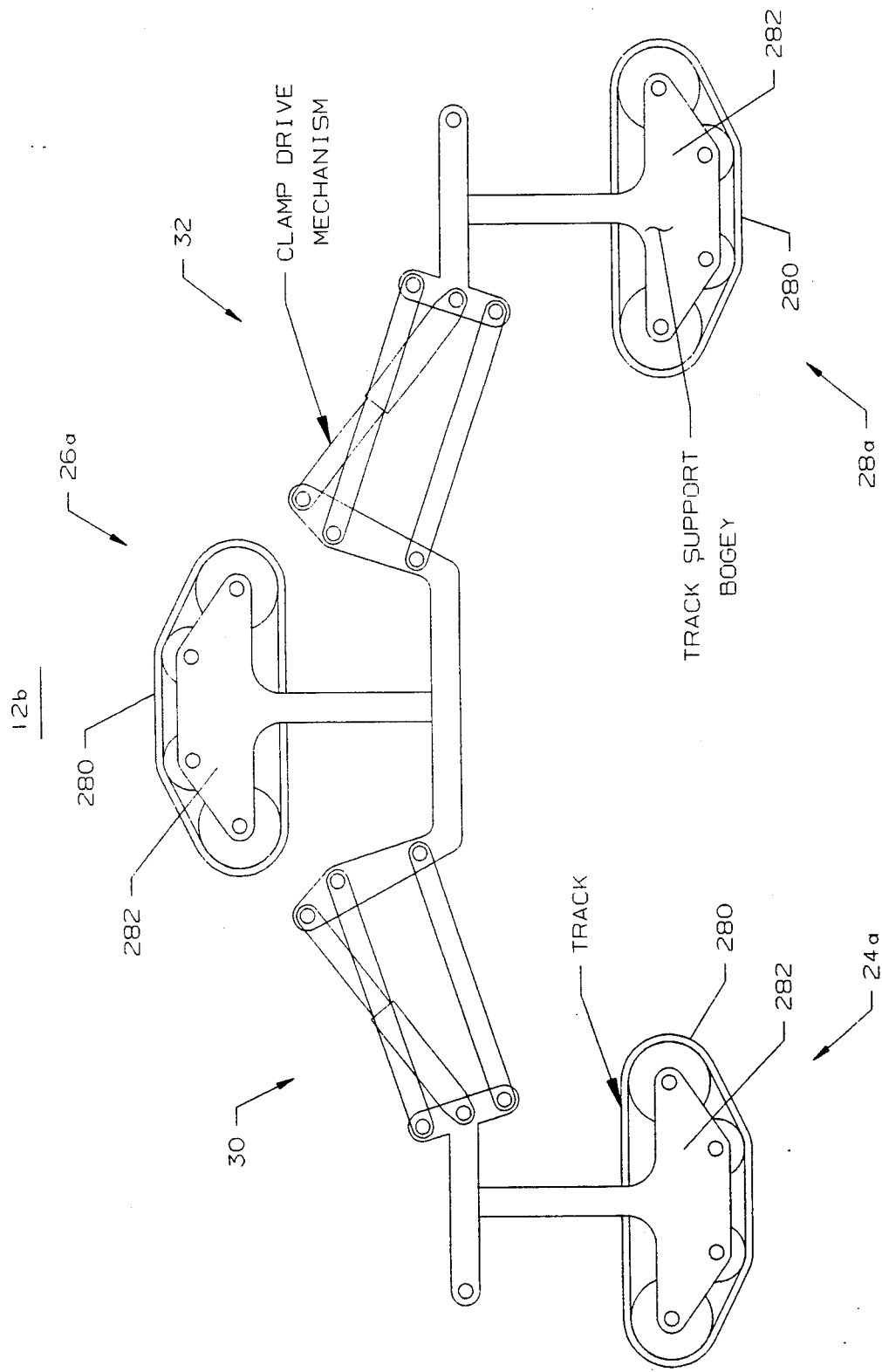
Figure 31B:
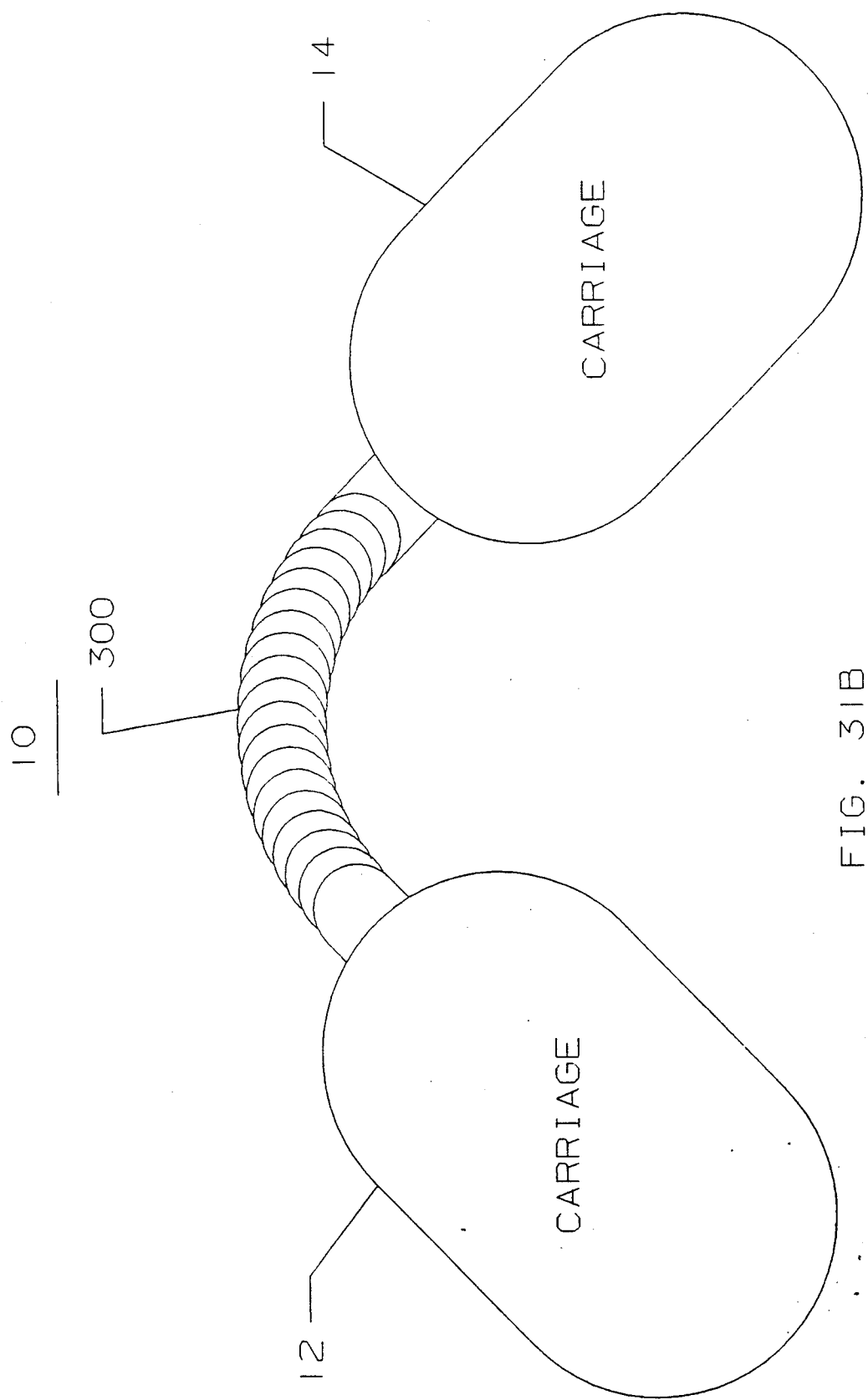
Figure 31C:
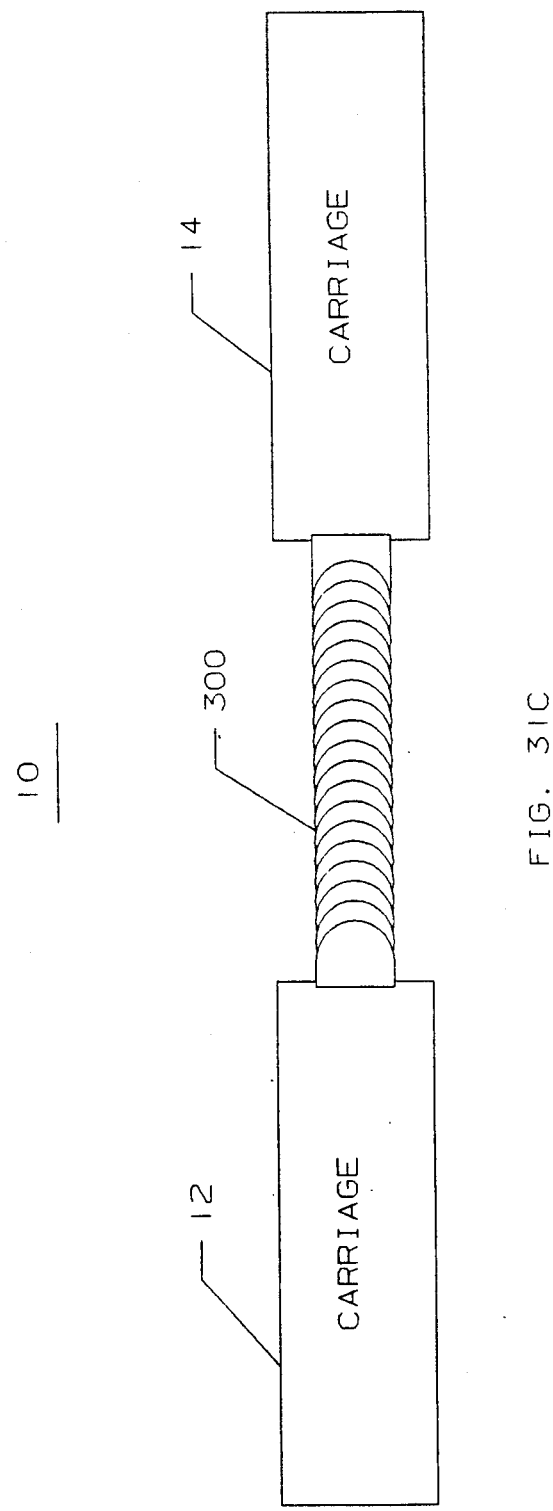

FIGS. 19A-L show a sequence of movement of a tractor including two carriages around a 90° corner in a pipe;

FIG. 20 is a schematic view of a tractor including two carriages and a body oriented to move straight through a pipe past a T-joint;

FIGS. 21A and B are three-dimensional views illustrating the re-orienting of a tractor using two steerable carriages;

FIGS. 22A and B are three-dimensional views illustrating the re-orienting of a tractor using a steerable carriage and a non-steerable carriage;

FIGS. 23A-C are three-dimensional views illustrating the re-orienting of a tractor using a passive roll joint;

FIGS. 24A-C are three-dimensional views illustrating the sequence of re-orienting the tractor using two non-steerable carriages with a powered roll joint;

FIG. 25 is a schematic illustration of an alternative tractor construction using two carriages directly connected without an intermediate body or module, using only one curling link;

FIGS. 26A and B are schematic diagrams illustrating alternative curling links;

FIGS. 27A and B are schematic diagrams illustrating an alternative curling link in which the curling force can be selectively applied;

FIG. 28 is a schematic diagram of a carriage using tracks instead of wheels;

FIG. 29 is a schematic diagram of an alternative carriage using just two opposing wheels;

FIG. 30 is a schematic diagram of an alternative tractor in which each carriage includes one magnetic wheel for engaging a ferromagnetic pipe;

FIG. 31A is a side view of a tractor including two carriages with an "elephant trunk" used in place of the curling link;

FIG. 31B is a view similar to FIG. 31A with the "elephant trunk" applying a curling force in the first plane parallel to the drawing;

FIG. 31C is a top view of the tractor shown in FIG. 31A; and

Figure 31D:
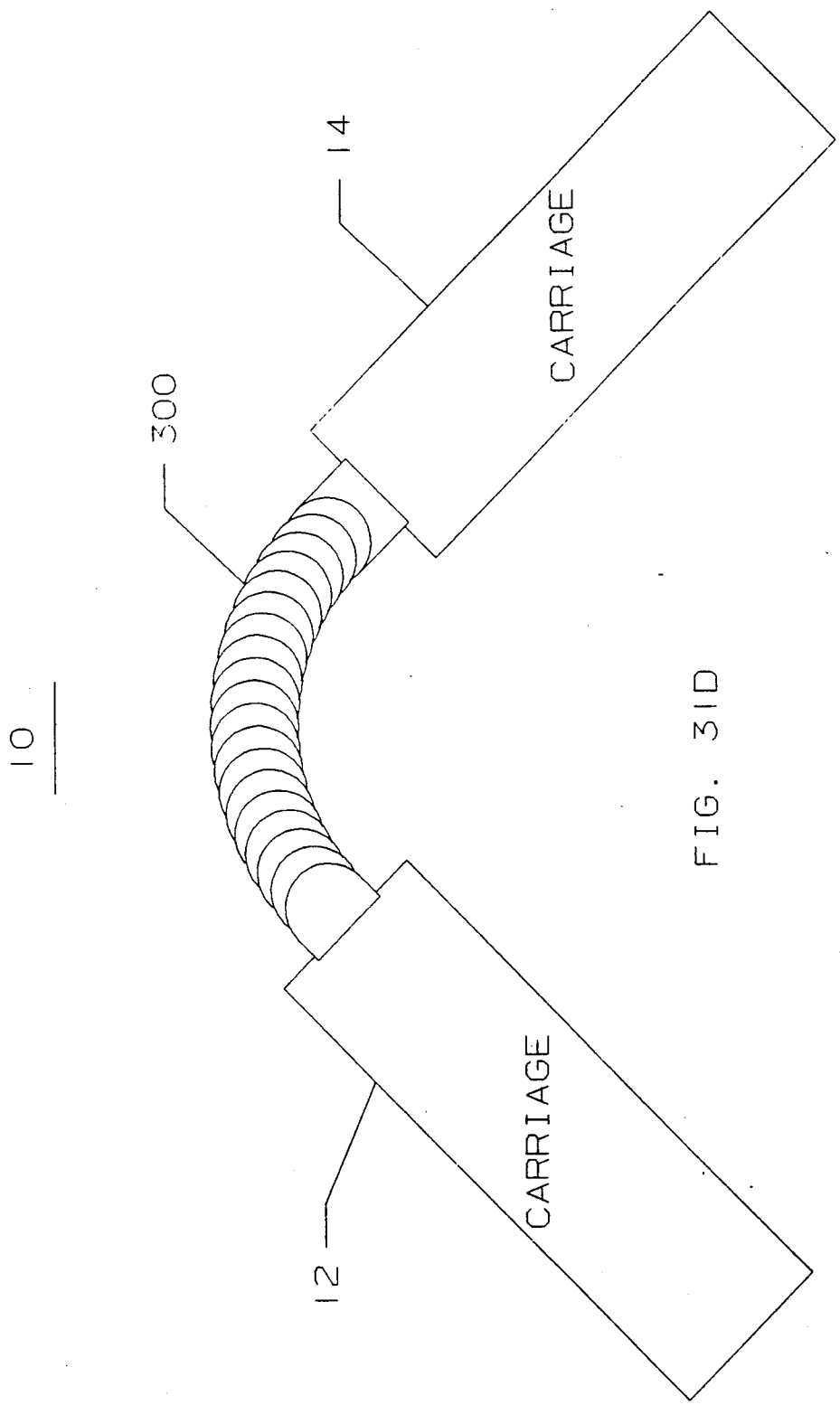

FIG. 31D is a view similar to FIG. 31C with the "elephant trunk" actuated to apply a curling force in a second plane perpendicular to the first.

Figure 1:
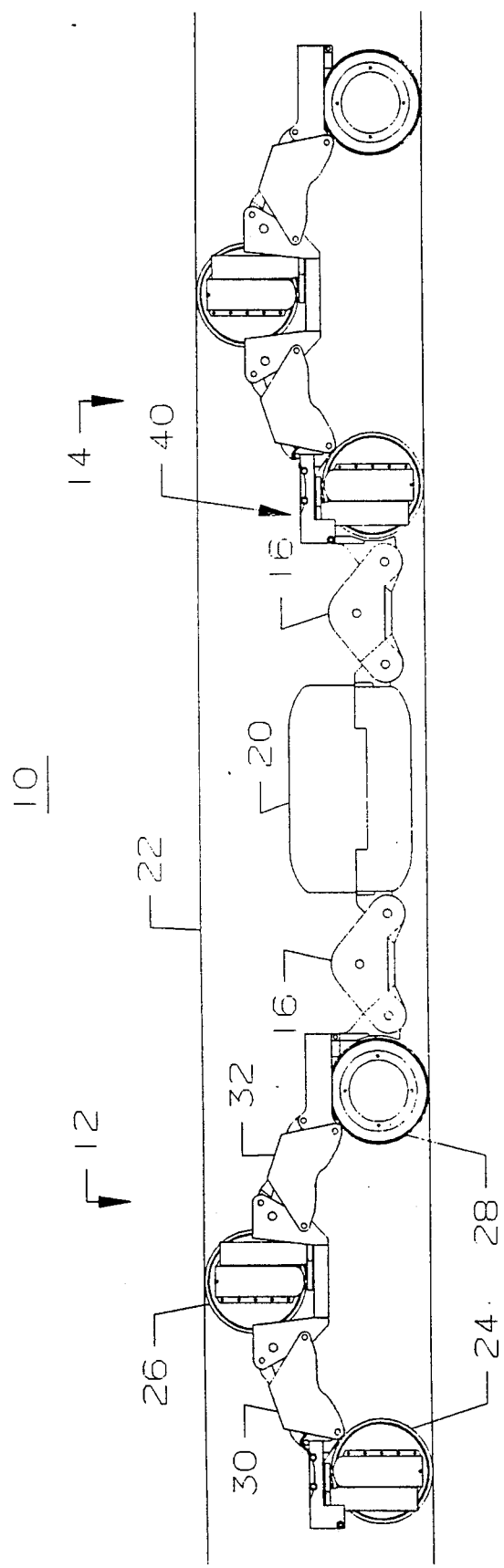
FIG. 1 is a side elevational diagrammatic view of a tractor according to this invention including two carriages and an intermediate body.

There is shown in FIG. 1 a tractor 10 according to this invention including two carriages, a leading carriage 12 and a trailing carriage 14 interconnected through curling links 16 and an intermediate center section or body 20. The entire tractor 10 is made to move inside of pipe 22. The use of the terms "leading" and "trailing" in describing parts of the tractor 10 is arbitrary since the tractor is equally capable of and may move in either direction in the pipe. Each carriage 12 and 14 includes two wheels 24 and 28 which contact one side of pipe 22, and a third wheel 26 which contacts the opposing side. Wheels 24, 26 and 28 are interconnected by clamping mechanisms 30 and 32.

Figure 2:
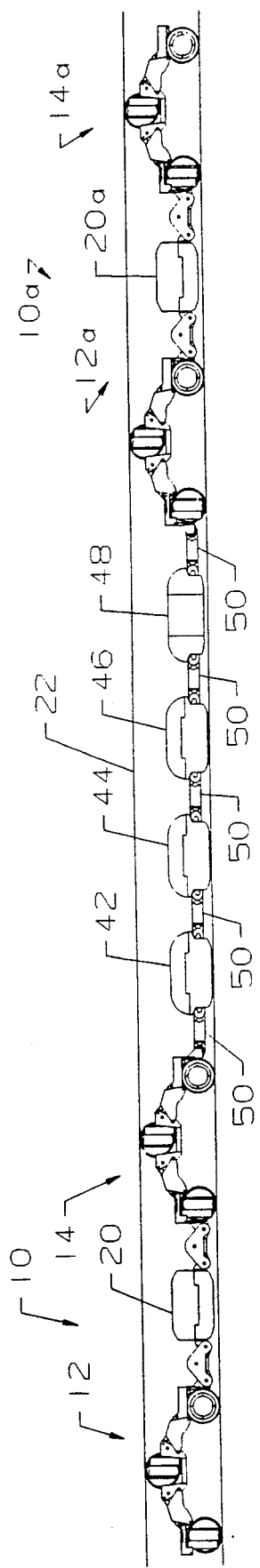
FIG. 2 is a side elevational diagrammatic view of two tractors such as shown in FIG. 1 in a pipe traveler train which includes a number of modules.

Tractor 10 may be used in conjunction with a second tractor 10a, FIG. 2, in a pipe traveler or train 40 which includes a number of towed modules such as a spooler 42 for paying out an umbilical cord as the traveler moves from its starting point in the pipe and recovering the umbilical as the traveler moves toward its starting point, a sensor 44 for sensing conditions inside of pipe 22, a battery module 46 for powering the train, and a sonde 48 for identifying the location of the train in pipe 22. The pipe traveler or train can be expanded to carry more modules, supported and driven by more tractors, if the desired usage requires more modules. The pipe traveler has no specific "front" end and "rear" end or "leading" and "trailing" ends or components. Like the individual tractors, the entire pipe traveler or train is equally capable of and may move in either direction in the pipe. The assignment of the terms "leading", "trailing", "front", "rear", "forward", "rearward", etc., to the pipe traveler parts or components is arbitrary since the traveler may move in either direction. Typically pipe 22 is a part of a piping system such as a natural gas supply system located well beneath the surface of the streets. Modules 42, 44, 46 and 48 are interconnected with each other and with tractors 10 and 10a by means of couplers 50.

Figure 3:
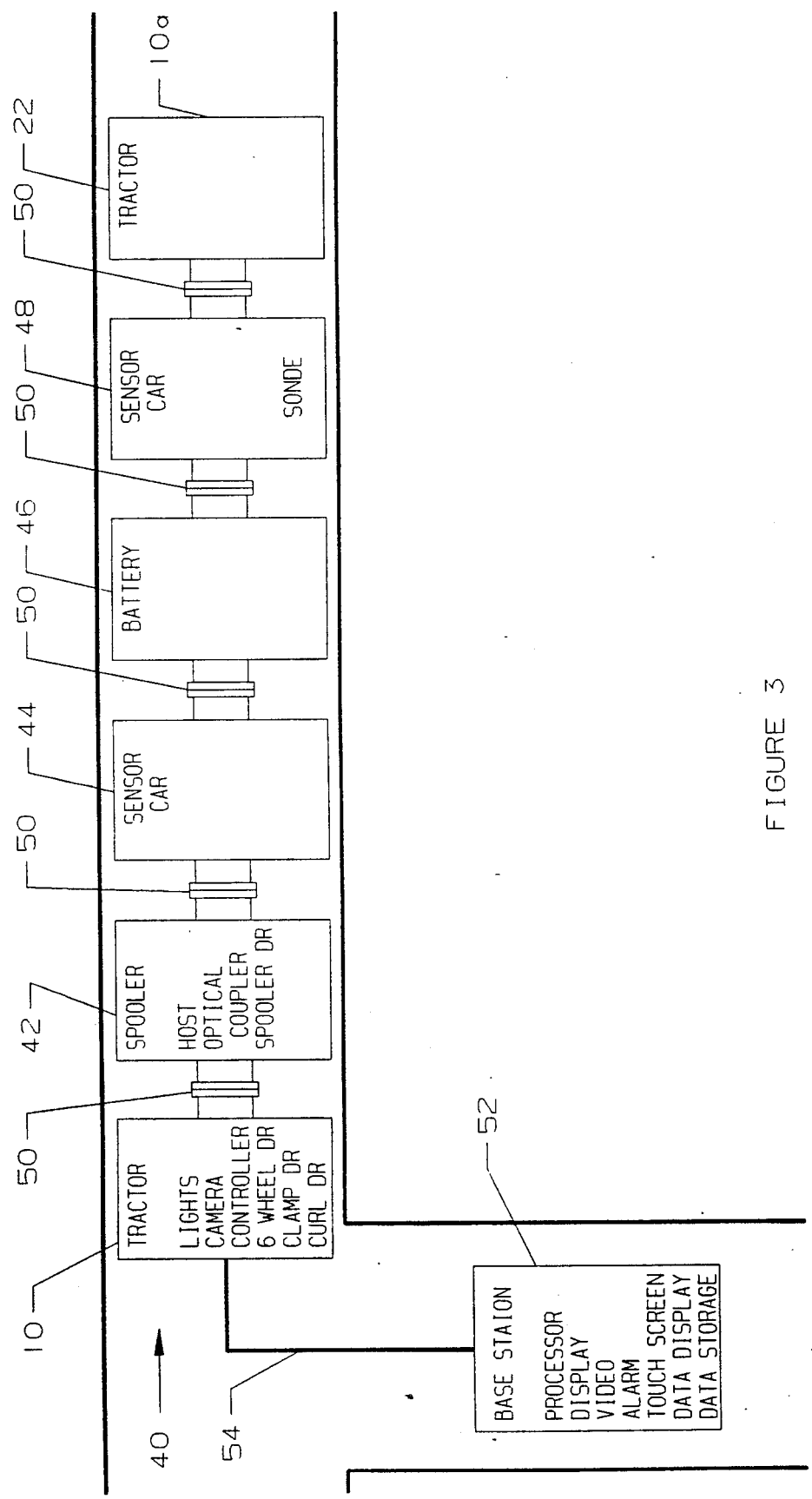
FIG. 3 is a block diagram of the pipe traveler system of FIG. 2 including a base station.

Train 40, FIG. 3, is interconnected with a base station 52, FIG. 3, by means of an umbilical cord 54. The tractor may include lights, camera, a controller, six-wheel drives, clamping drives, and curling drives. Spooler module 42 may include a host optical coupler and a spooler drive. Sensor module 44 may include an eddy current sensor for determining the condition of the pipe walls; battery module 46 may include a primary battery cell such as lithium thionyl chloride, or a secondary battery cell using nickel cadmium batteries, respectively. Sonde module 48 may include an acoustic or a magnetic sonde for locating the train. Couplers 50, in addition to mechanically coupling together the modules, also couple video coax, power and data lines. Train 40 is designed to move through a variety of different pipes, plastic, iron or steel, including their joints and their fittings such as T's, X's and elbows. The pipes may vary in diameter from 2 or 3 inches to 7 inches or more and typically have in their lower portion a pool of particulate or fluid contaminants which the train must move through. There is no limit on the size of the pipe that could be serviced by the tractor and train according to this invention. Tractor 10 and train 40 can be used in live systems without blocking the flow of the fluid.

Figure 4:
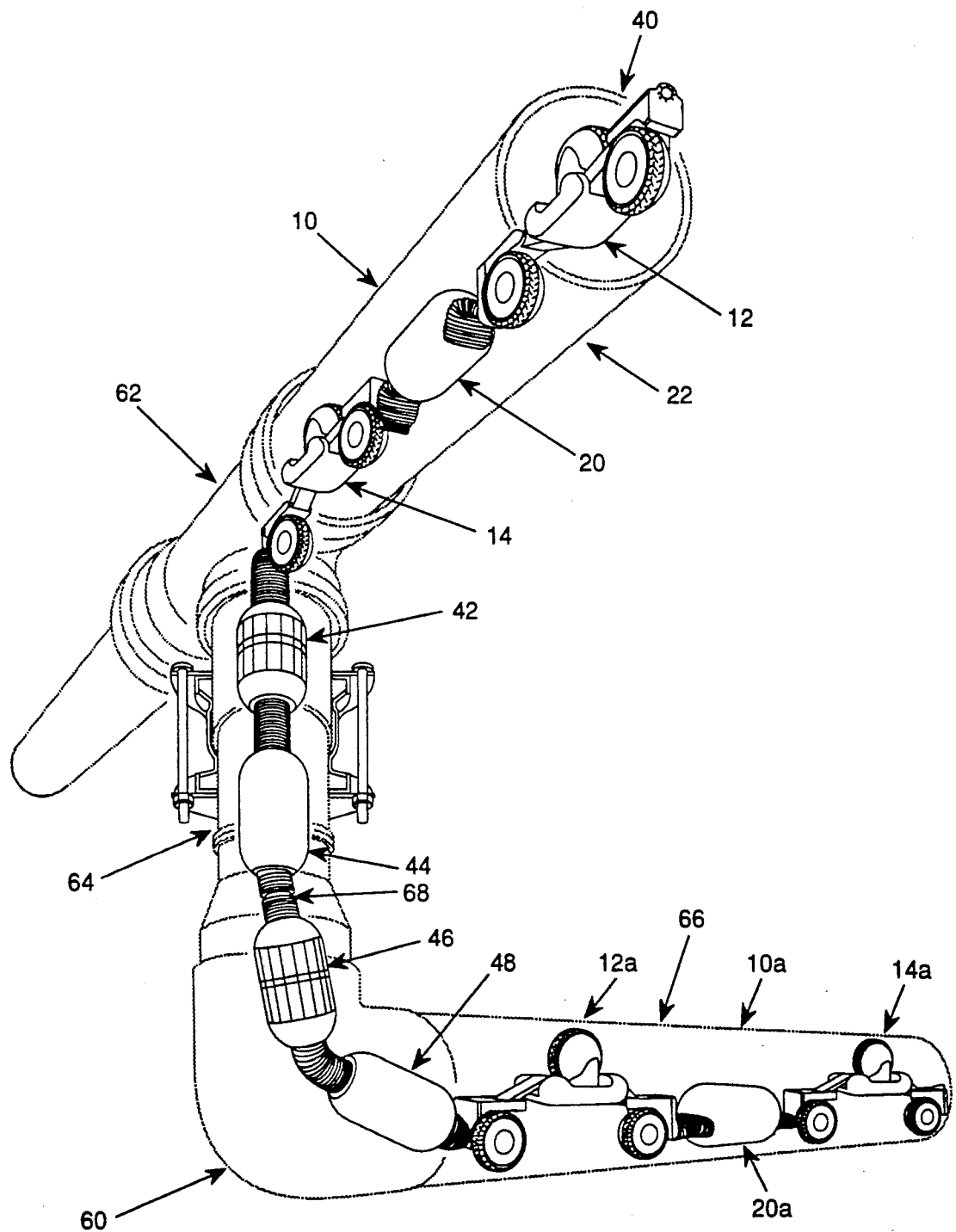
FIG. 4 is a three-dimensional view of the pipe traveler train of FIG. 2 traveling through a typical pipe.
Figure 5:
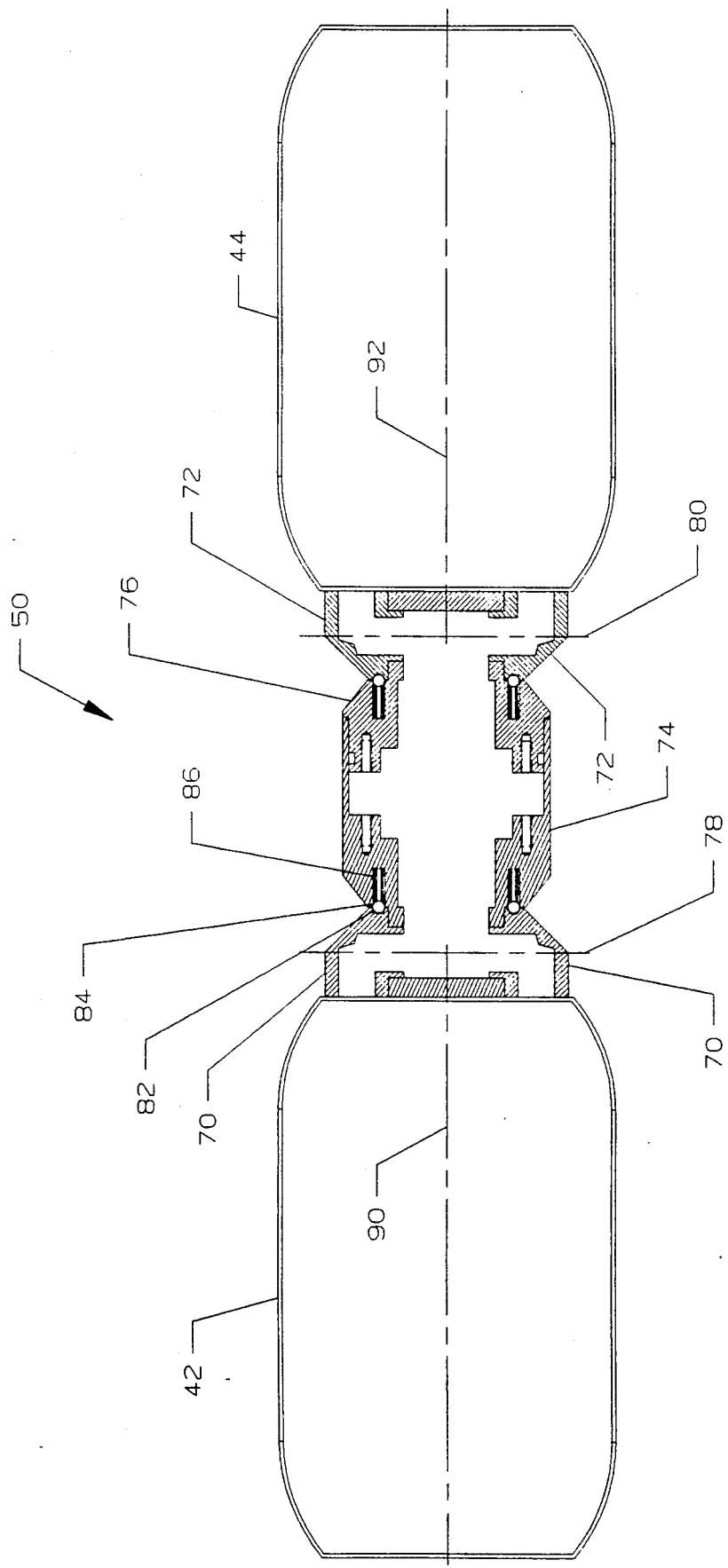
FIG. 5 is an enlarged detailed cross-sectional view of the coupler used between the modules in FIG. 2.

The construction of tractors 10 and 10a as well as the remainder of train 40, enable it to travel in either direction through pipes of varying diameters, through steep ascents and descents and closely occurring fittings as shown in FIG. 4, where train 40 has tractor 10 moving through pipe 22 just ahead of T-fitting 62, while the rest of train 40 is moving through the vertical portion 64 and elbow fitting 60 with tractor 10a still in the lower portion of pipe 66 which is perpendicular to main pipe 22. In order to accommodate the difference in orientation between the forward portion of train 40 containing tractor 10 and the rearward portion containing tractor 10a, a passive roll joint 68 is employed. Couplers 50 include clevis 70 and 72 attached to each module such as modules 42 and 44, respectively, and which are pivoted to sections 74, 76 at pins 78 and 80, respectively, FIG. 5. Section 76 fits snugly within section 74 to form the mechanical connection as well as electrical and optical connections, which is sealed against liquids and gases. Couplers 50 provide the mechanical connection of tractors 10, 10a and the modules 42, 44, 46, 48 capable of withstanding the tensile, compressive and other forces that may be generated as train 50 passes through a piping system. Each clevis at section 74, 76 includes a recess 82 for receiving a detent ball 84 which is loaded by spring 86 to cause coupler 50 to prefer the position in which axes 90 and 92 are aligned, FIG. 5. Train 40 can be oriented within a horizontal pipe, so that pins 78 and 80, of coupler 50, are vertical. In this orientation coupler 50 will passively support adjoining modules 42 and 44 against the downward force of gravity and the modules will not contact the bottom of the pipe. In this orientation modules 46, 48 and any other modules in pipe train 40 will similarly be supported so they do not contact the bottom of the pipe. At corners, pins 78 and 80 of couplers 50 are oriented to permit rotation of section 74 with respect to module 42 about pin 78 and rotation of section 76 with respect to module 44 about pin 80 as the modules 42, 44 and the coupler 50 turn to pass through the corner.

Figure 6:
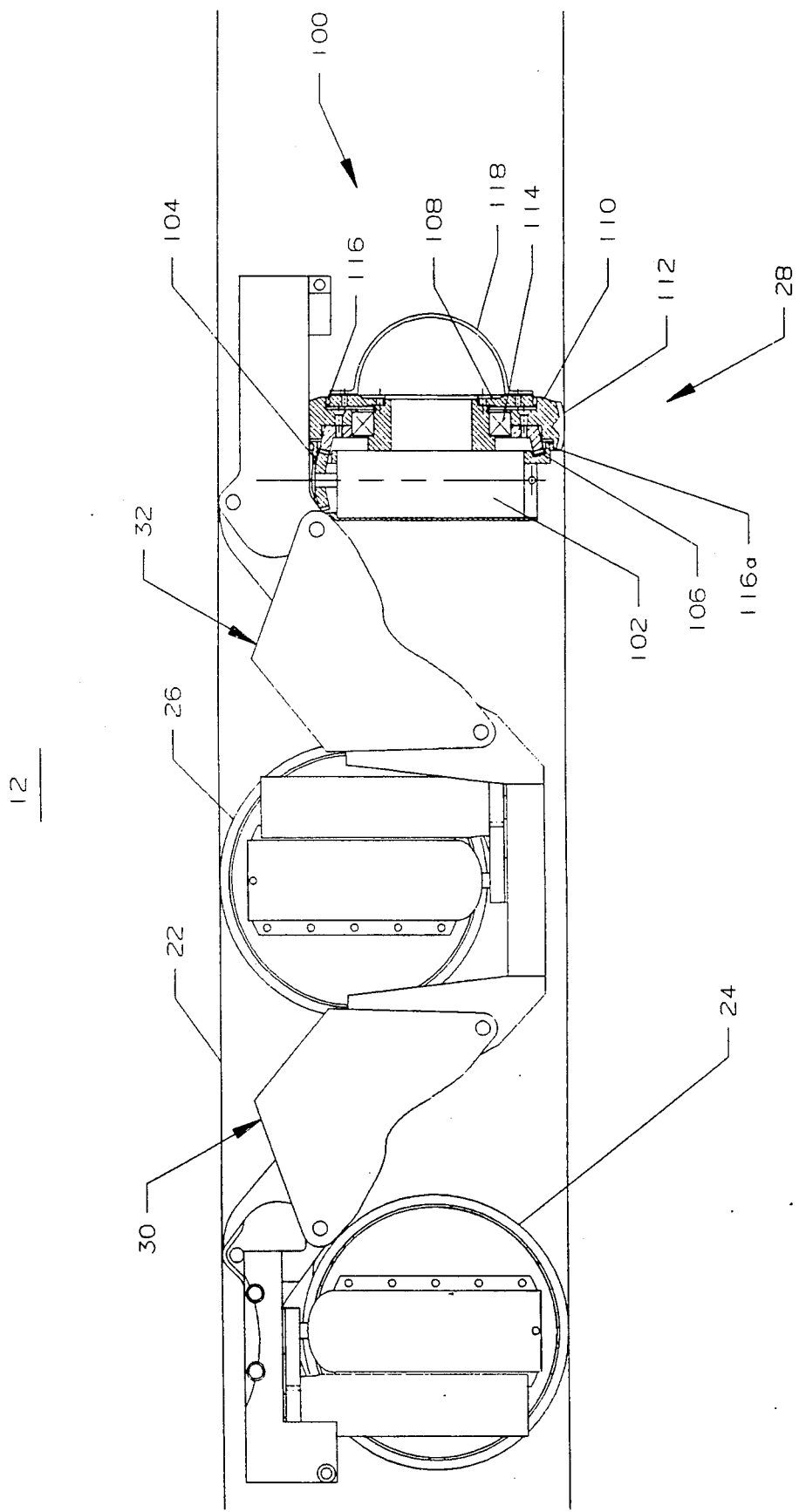
FIG. 6 is a more detailed diagrammatic view of a single carriage as shown in FIG. 1 with one wheel rotated 90° and with parts broken away and shown in cross-section illustrating the wheel drive mechanism.

Carriage 12 is driven forward and backward in pipe 22 by one or more of its wheels 24, 26 and 28 powered by on-board drive mechanisms 100, FIG. 6. Drive mechanism 100, is shown with respect to wheel 28 which is turned at 90° to wheels 24 and 26 in FIG. 6. Drive mechanism 100 includes drive motor 102 which rotates drive pinion 104 engaged with drive gear 106. Gear 106 is fixed to wheel 110 that carries tire 112 and rotates on the wheel hub 108 through bearing 114. Bearing 114 is protected by the outer seals 116 and 116a and hubcap 118 covers wheel hub 108. Each of wheels 24 and 26 may be driven in the same manner.

Figure 7A:
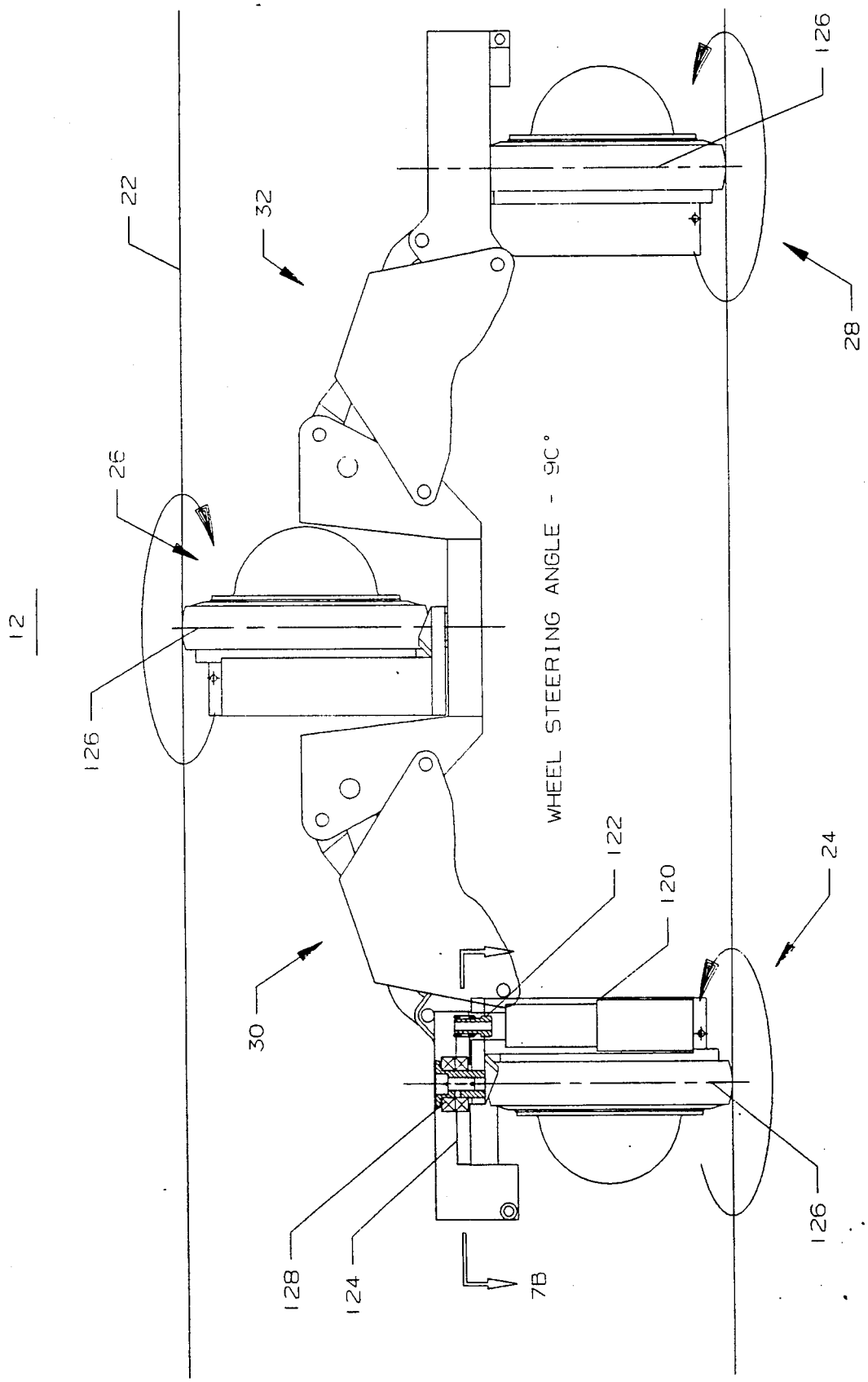
FIGS. 7A is a more detailed diagrammatic view of a single carriage as shown in FIG. 1 with one of the wheels broken away and parts shown in cross-section illustrating the steering mechanism for swivelling one or more of the wheels.
Figure 7B:
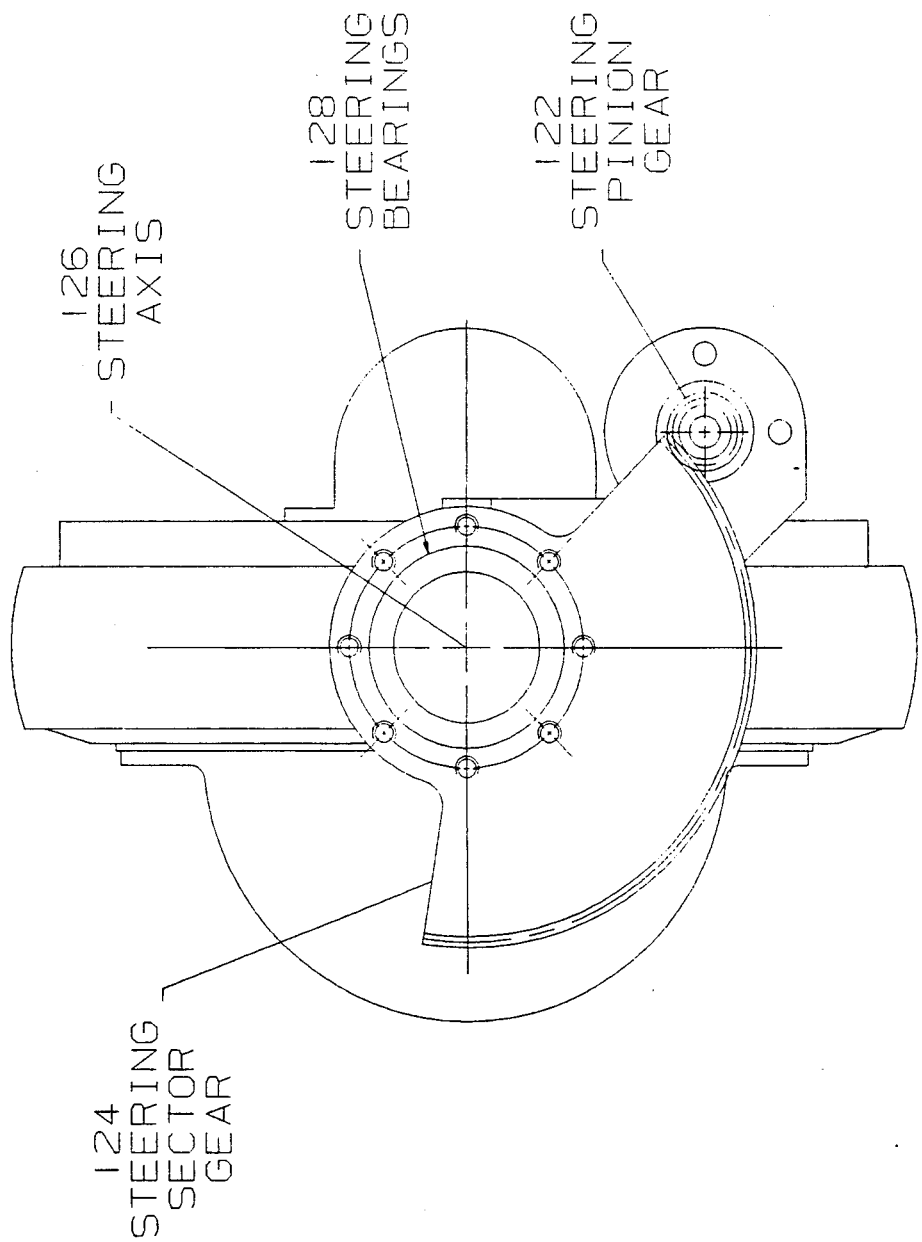
FIG. 7B is a top view taken along line 7B—7B of FIG. 7A.
Figure 9:
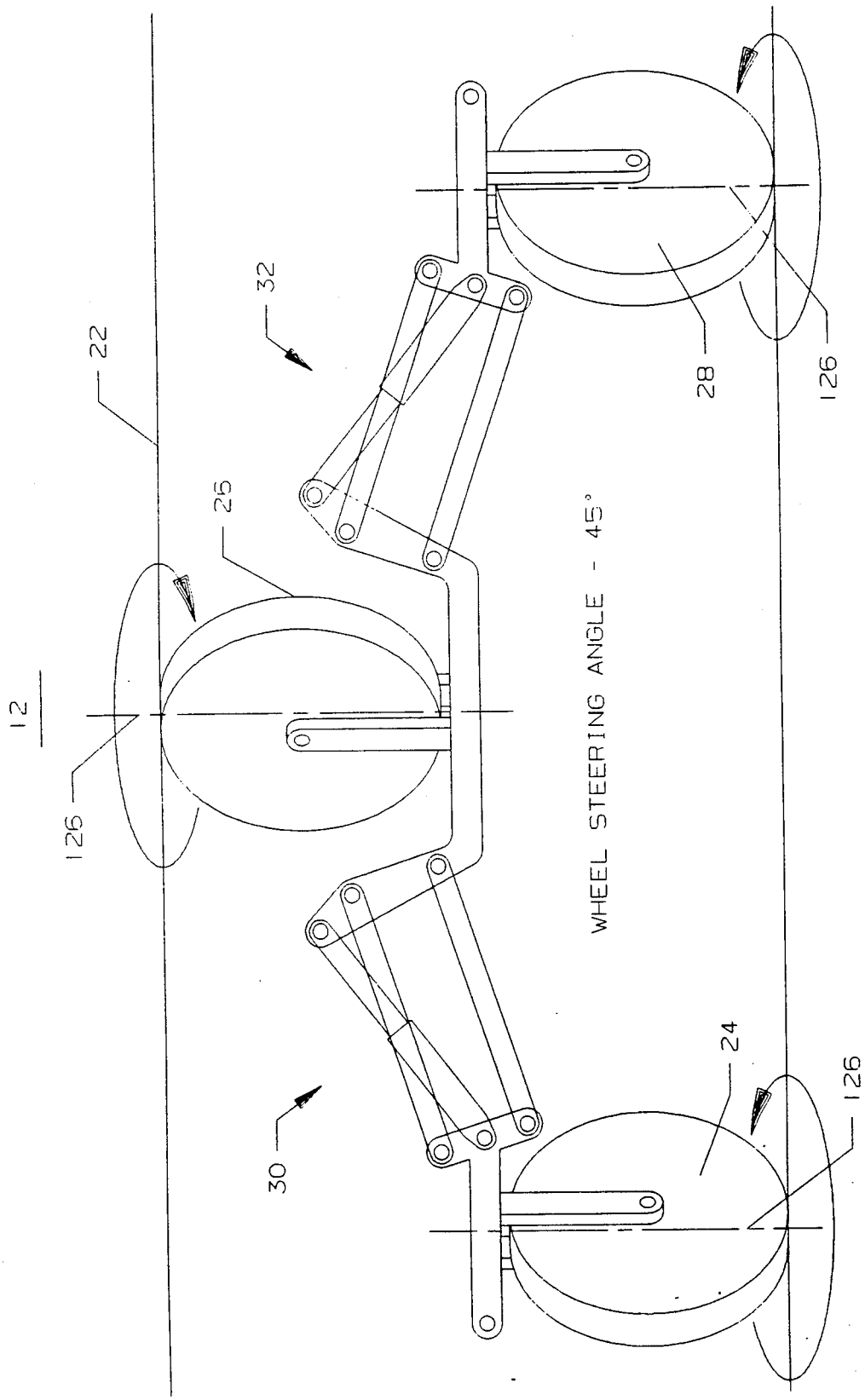
FIG. 9 is a view similar to FIG. 8 with all the wheels swiveled to an angle of +45°.
Figure 10A:
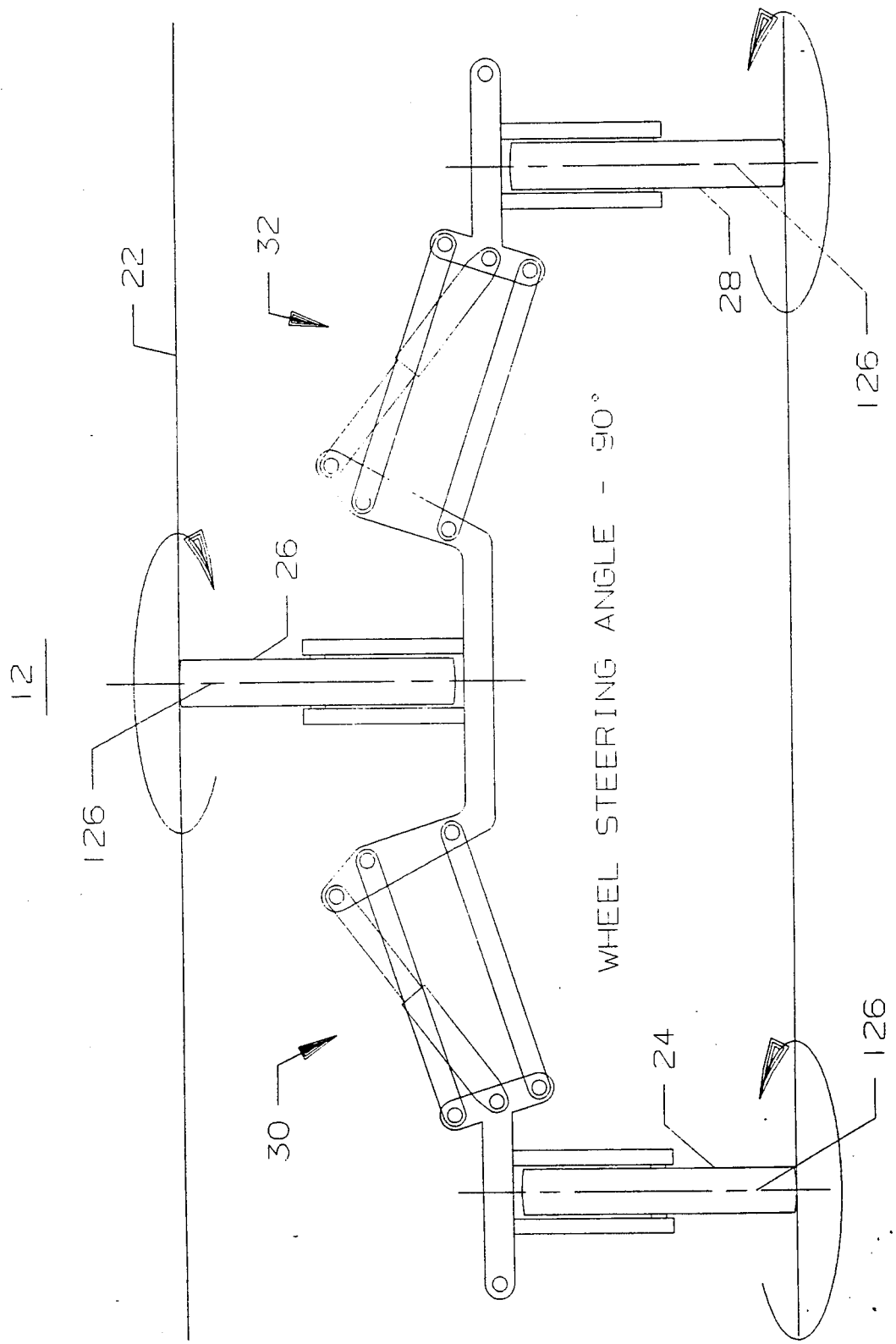
FIG. 10A is a view similar to FIG. 8 with the wheels swiveled to a steering angle of 90°.
Figure 10B:
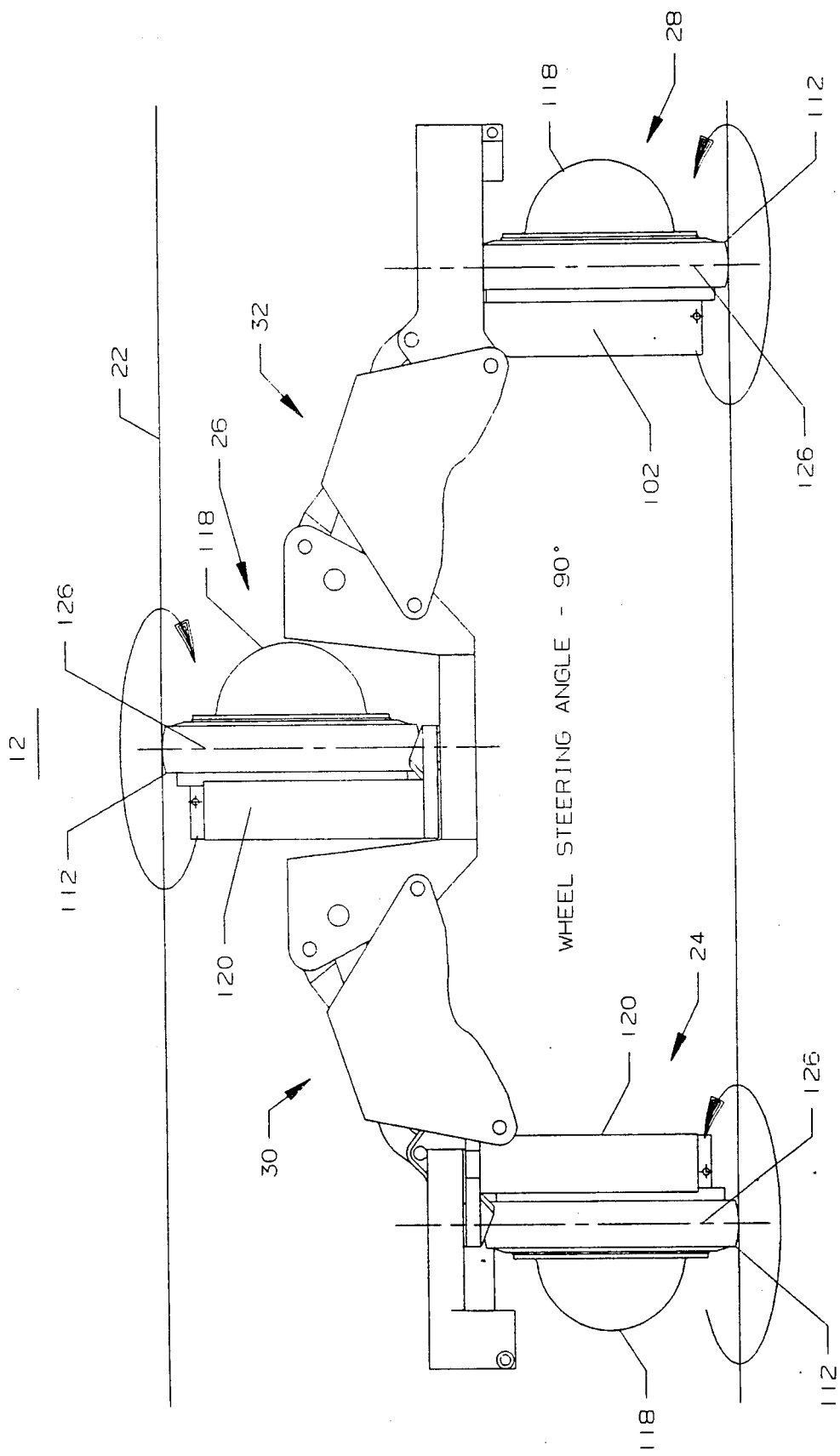
FIG. 10B is a diagrammatic view similar to FIG. 10A but showing the actual structure of the carriage.

One or more of wheels 24, 26, 28 may also be steerable as shown in FIGS. 7A and 7B. Each steerable wheel, as illustrated with respect to wheel 24, includes a steering motor 120 which drives steering pinion 122. Steering pinion 122 is engaged with steering sector gear 124 and rotates on steering bearings 128 about the steering or swivel axis 126. The wheel can be swiveled or turned about axis 126 from +90° to −45°. With all of the wheels at a steering angle of zero, carriage 12 appears as shown in FIG. 8. With the wheels swiveled to a 45° steering angle, carriage 12 appears as shown in FIG. 9. Lower wheels 24 and 28 are faced at 45° toward the reader. While it appears that opposing wheel 26 is driving in the opposite direction, this is not accurate. Since that wheel is on the opposite side of the pipe it is facing in the opposite direction in order to maintain the same steering angle of +45°. With the wheels in this condition, the carriage 12 will follow a helical path through the pipe. Carriage 12 can be made to rotate around the inside of the pipe in the same place by setting a steering angle of 90° as indicated in FIG. 10a. A more detailed showing of carriage 12 with all three wheels at the 90° steering angle is shown in FIG. 10B.

Figure 11:
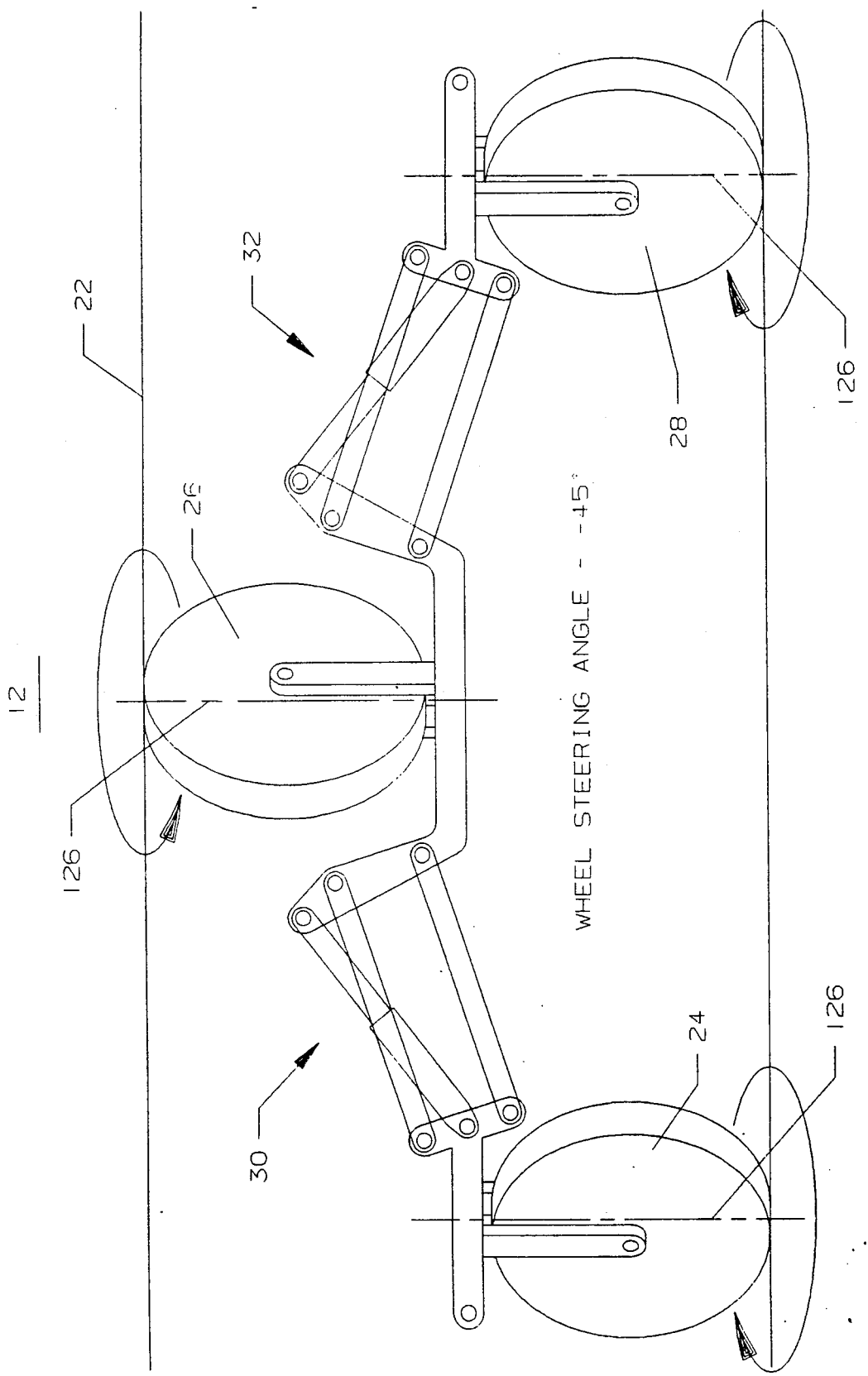
FIG. 11 is a view similar to FIG. 8 with the wheels turned at a −45° angle.

Carriage 12 is shown with the wheels swiveled to a −45° steering angle in FIG. 11, where again it can be seen that opposing wheel 26 has an opposite orientation from wheels 24 and 28, although all three are at a −45° steering angle. In this orientation the carriage would move in a helical path backwards along the pipe.

Figure 12A:
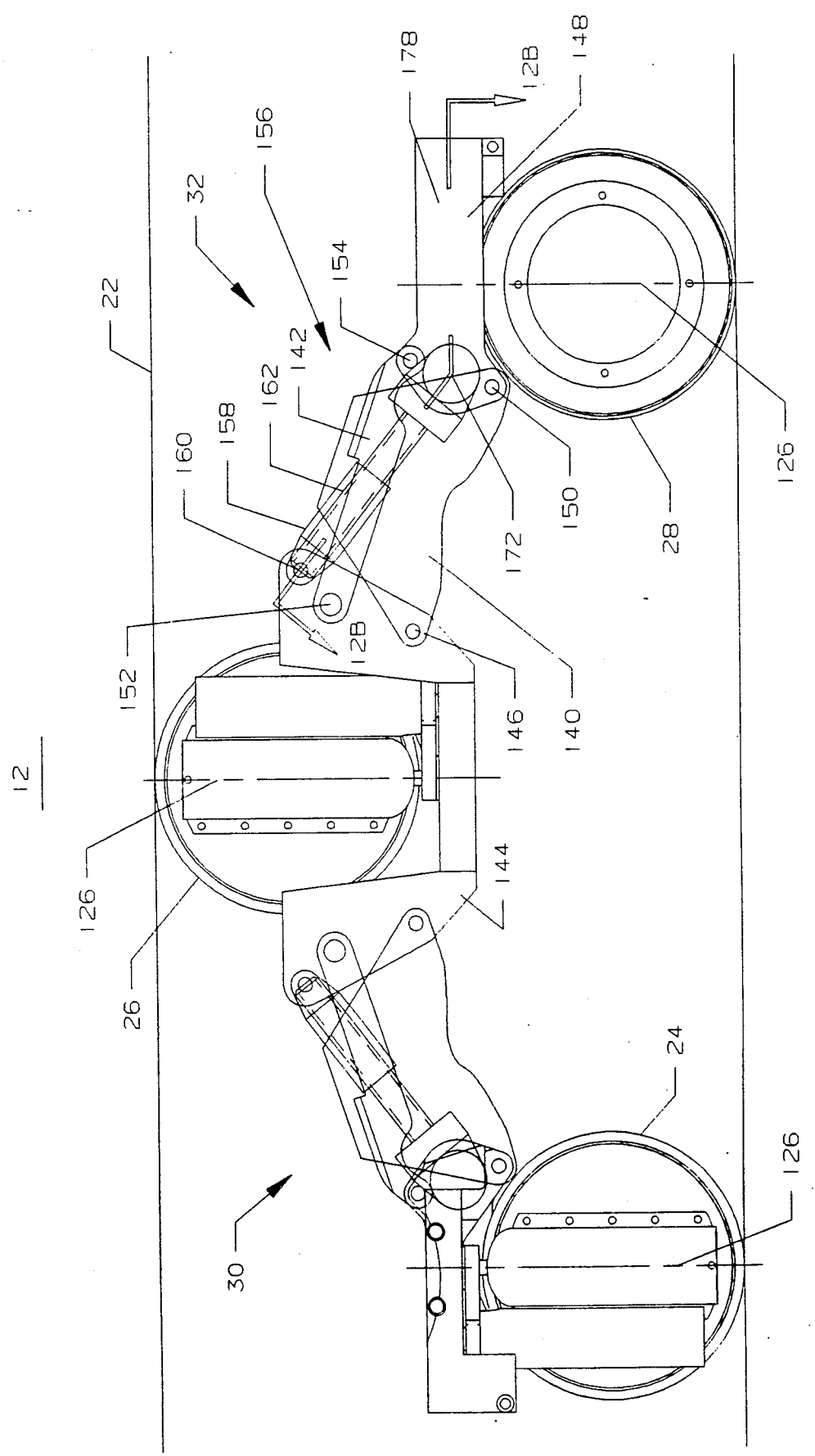
FIG. 12A is a diagrammatic view of the carriage shown in FIG. 1 showing the clamping mechanism in greater detail with the carriage adjusted for accommodating an intermediate size pipe.
Figure 12B:
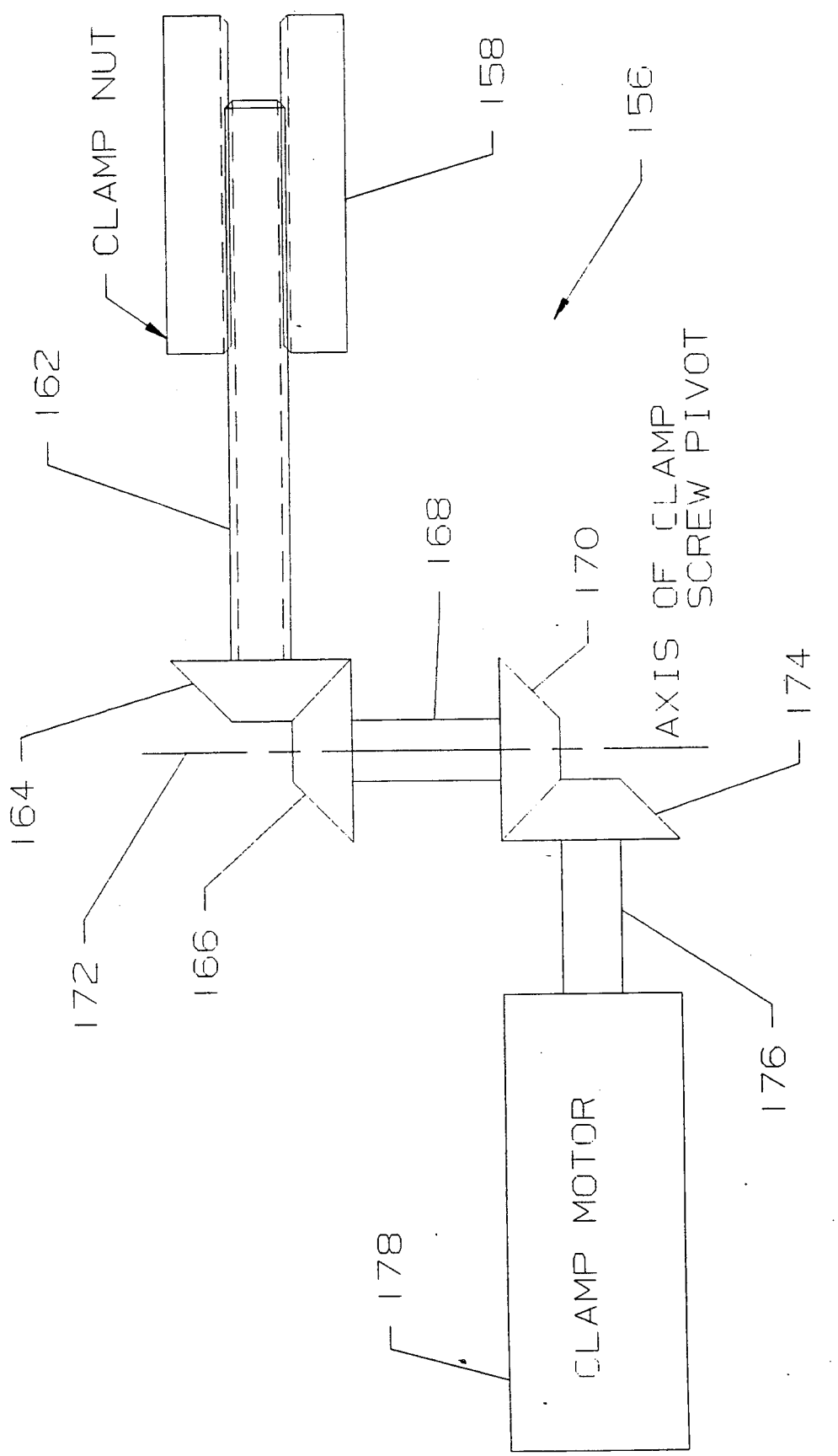
FIG. 12B is a sectional view taken along lines 12B—12B of FIG. 12A.

The clamping mechanisms 30 and 32 which allow a clamping force to be applied by carriage 12 to the walls of the pipe, as well as allowing the carriage 12 to adjust to the size of the pipe, are shown in more detail in FIG. 12A, where mechanisms 30 and 32 are shown as mirror images of one another. Each mechanism 30, 32, as illustrated with respect to clamp mechanism 32, includes a pair of four-bar linkages, including lower link 140 and upper link 142. Lower link 140 is pivoted to the center frame 144 containing wheel 26 at pivot point 146, and to the outer frame 148 containing wheel 28 at pivot 150. Upper link 142 is pivoted at 152 to center frame 144 and at pivot 154 to outer frame 148. This four-bar linkage is actuated by clamp actuator 156 which includes a clamp nut 158 pivotally mounted at 160 to center frame 144, and a clamp screw 162. Clamp screw 162 has at its free end a bevel gear 164, FIG. 12B, which engages with a second bevel gear 166 fixed on shaft 168 that contains second bevel gear 170. Bevel gears 166 and 170 and interconnecting shaft 168 are aligned along axis 172, which can also be seen in FIG. 12A. An additional bevel gear 174 is mounted on the end of drive shaft 176 from clamp motor 178, which can also be seen in FIG. 12A. This allows nut 158 to be driven to and fro on screw 162 by means of rotation of motor 178. Since shaft 168 is concentric with axis 172, motor 178 can drive screw 162 regardless of the angle that screw 162 assumes with respect to outer frame 148. The position of the four-bar linkages in clamping mechanisms 30 and 32 can be seen more clearly in the schematic view of FIG. 13, which corresponds to the detail view in FIG. 12A. Clamp actuator 156 can also include spring compliance between the clamp nut 158 and the clamp nut pivot mounts at 160, and/or between the clamp screw 162 and the mounts at 172. Such spring compliance would allow the clamping mechanism to maintain clamping force against the wall of pipe 22 through variations in the inside diameter of 22, without changes in the state of clamp nut 158 and clamp screw 162. Alternately, such spring compliance can exist as part of the links of mechanisms 30 and 32, as part of the frames 144, 148, or as parts of the wheels 24, 26, 28. Such spring compliance can assist carriages 10 and 12 to maintain clamping force within pipe 22 while the carriages pass through varying pipe inside diameters or through pipes in which solid debris on the inside surfaces varies the inside pipe diameter. Such compliance typically allows the carriages to accommodate smaller pipe inside diameter variations with no action from the clamp actuator 156 while larger variations in pipe inside diameter will typically be accommodated through action of clamp actuator 156.

Figure 13:
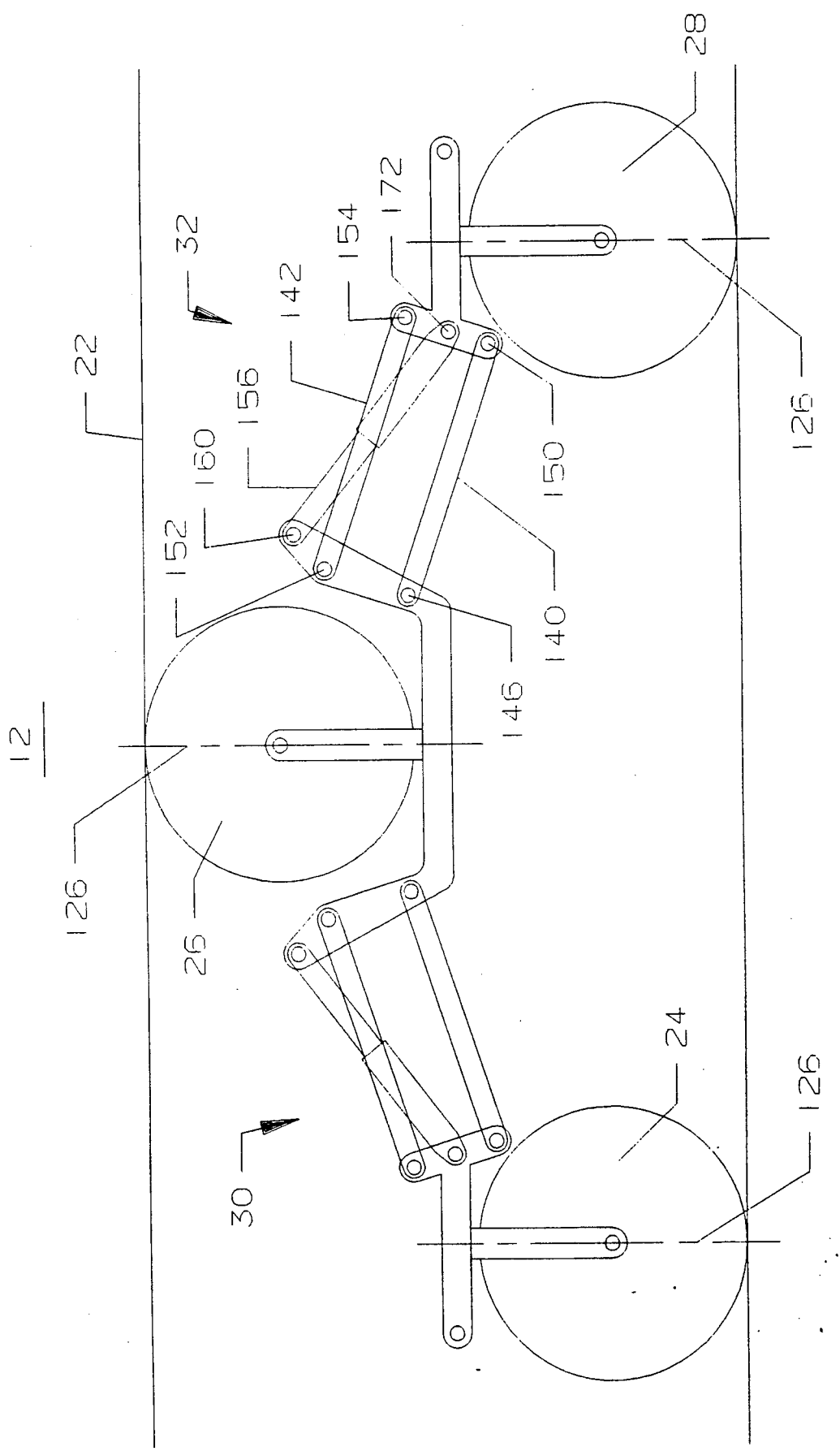
FIG. 13 is a schematic view of the carriage of FIG. 12.
Figure 14:
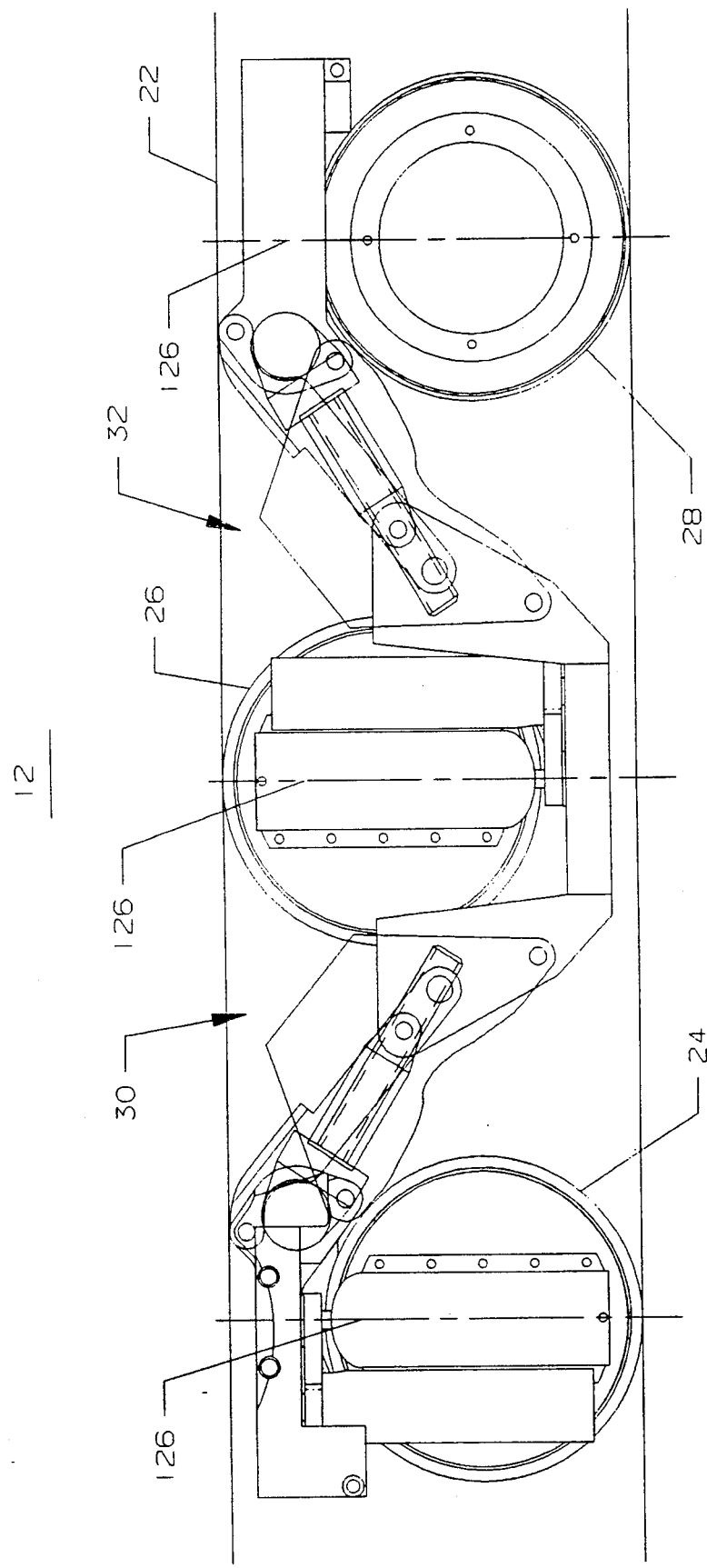
FIG. 14 is a view similar to FIG. 12 with the carriage collapsed to accommodate a small-diameter pipe.
Figure 15:
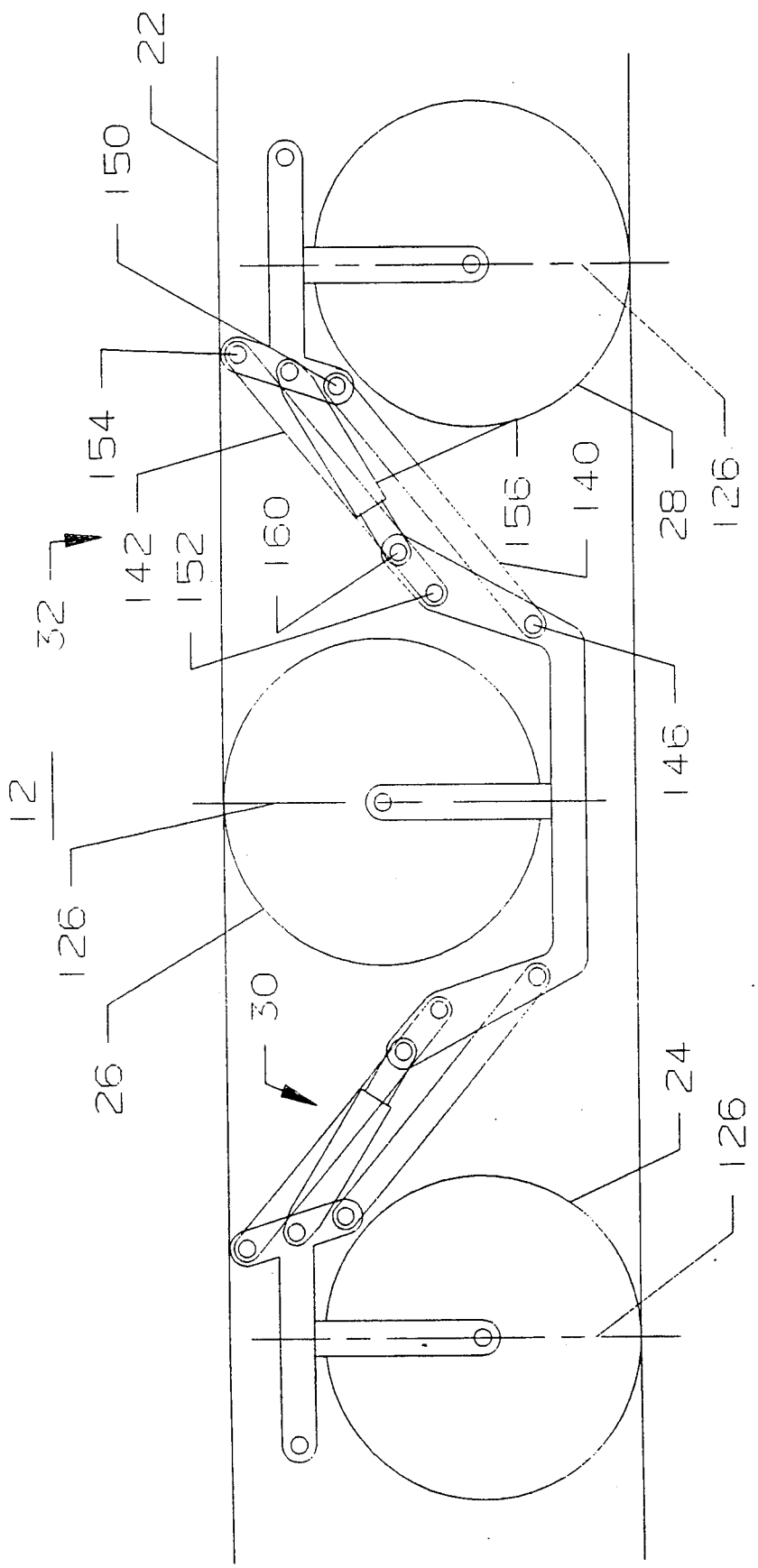
FIG. 15 is a schematic diagram of the carriage of FIG. 14.
Figure 16:
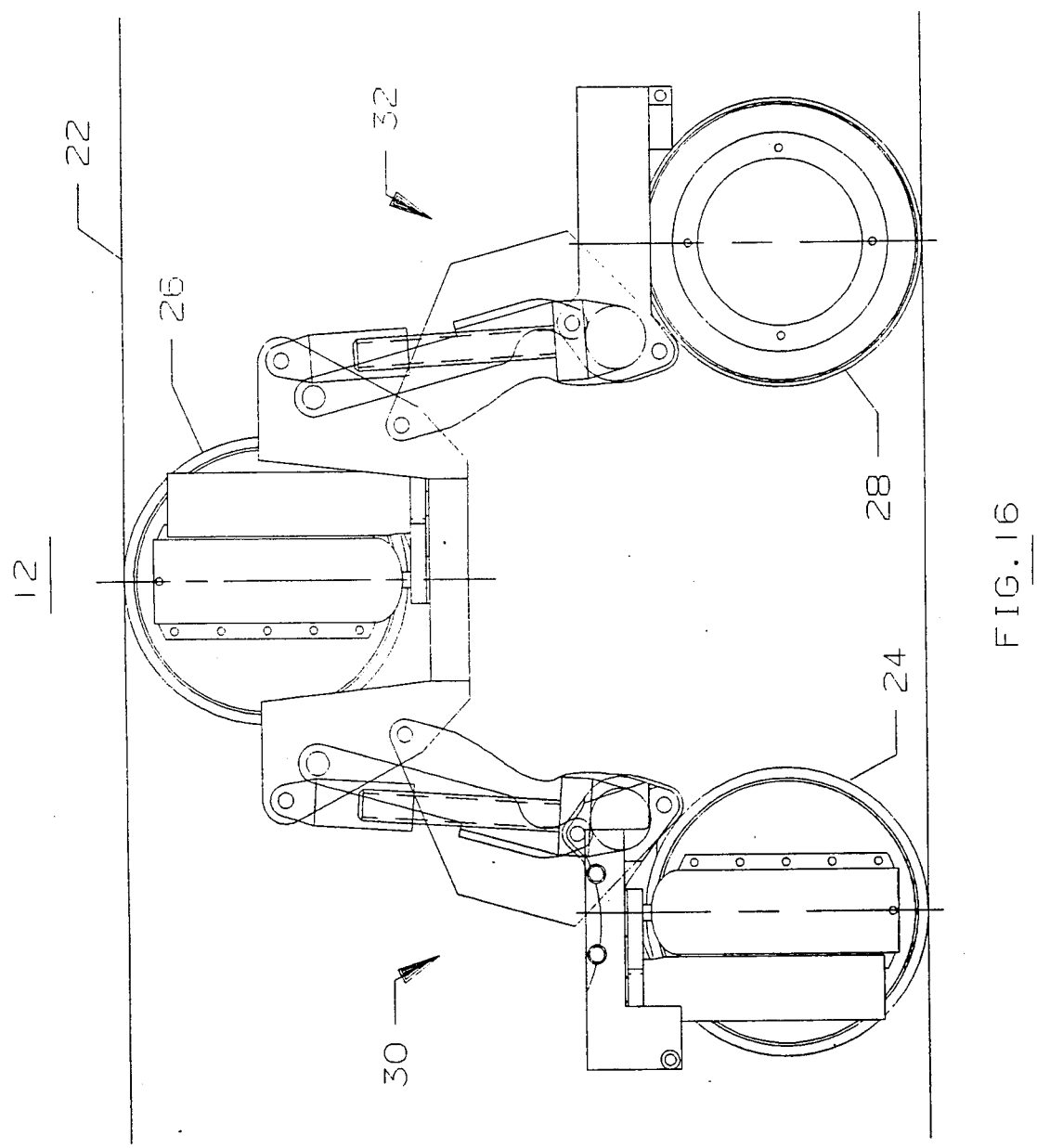
FIG. 16 is a view similar to FIG. 12 with the carriage accommodating a large-diameter pipe.
Figure 17:
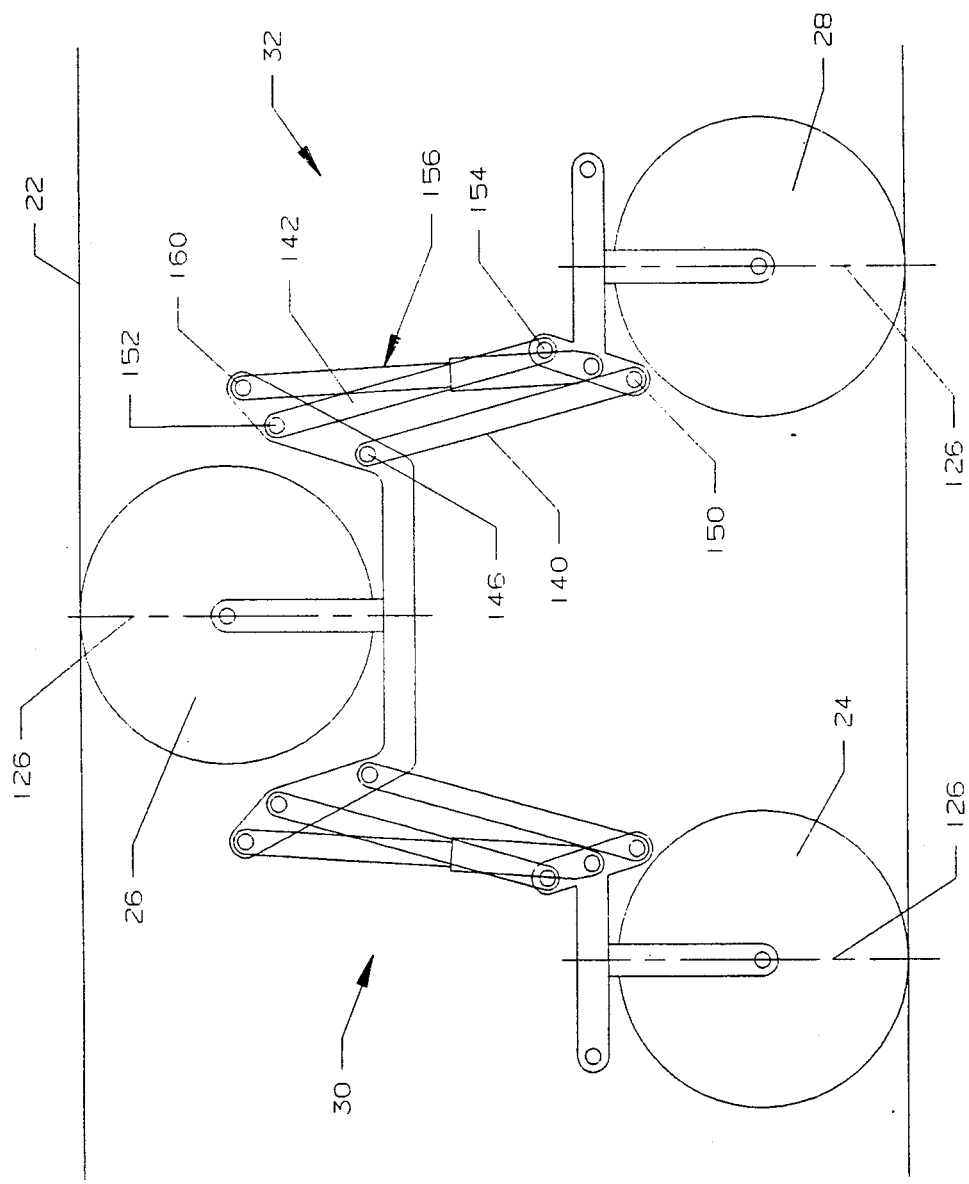
FIG. 17 is a schematic diagram of the carriage of FIG. 16.

FIGS. 12A and 13 demonstrate carriage 12 in an intermediate position for gripping the sides of an intermediate sized pipe. For an extremely narrow pipe, carriage 12 will assume a more condensed position as shown in FIG. 14. The position of four-bar linkages in mechanisms 30 and 32 in the condensed condition of FIG. 14 are shown more clearly in schematic drawing of FIG. 15. For a larger pipe, carriage 12 can assume the position shown in FIG. 16, wherein clamping mechanisms 30 and 32 are nearly vertical. This can be more clearly seen in the schematic of FIG. 17 corresponding to the detailed drawing of FIG. 16.

Mechanisms 30 and 32 function to maintain the orientation of wheels 24, 26 and 28 so that their swivel axes 126 are always substantially perpendicular to the sides of pipe 22. In addition, the four-bar linkages enable carriage 12 to accommodate a range of sizes of pipes. Larger-diameter pipes are accommodated by bringing wheels 24 and 28 closer together to increase the overall diameter of carriage 12 so that a proper clamping force can be applied to the inside of the pipe. In smaller pipes such as those of intermediate diameter, clamping mechanisms 30 and 32 are arranged such as shown in FIG. 13. In very small pipes, as illustrated with respect to FIGS. 14 and 15, clamping mechanisms 30, 32 can bring wheel 26 down to the point where the angle between wheels 24 and 28 and wheel 26 is nearly 180° or even greater. Significant clamping forces can be obtained in all positions through the use of mechanisms 30 and 32.

Figure 18:
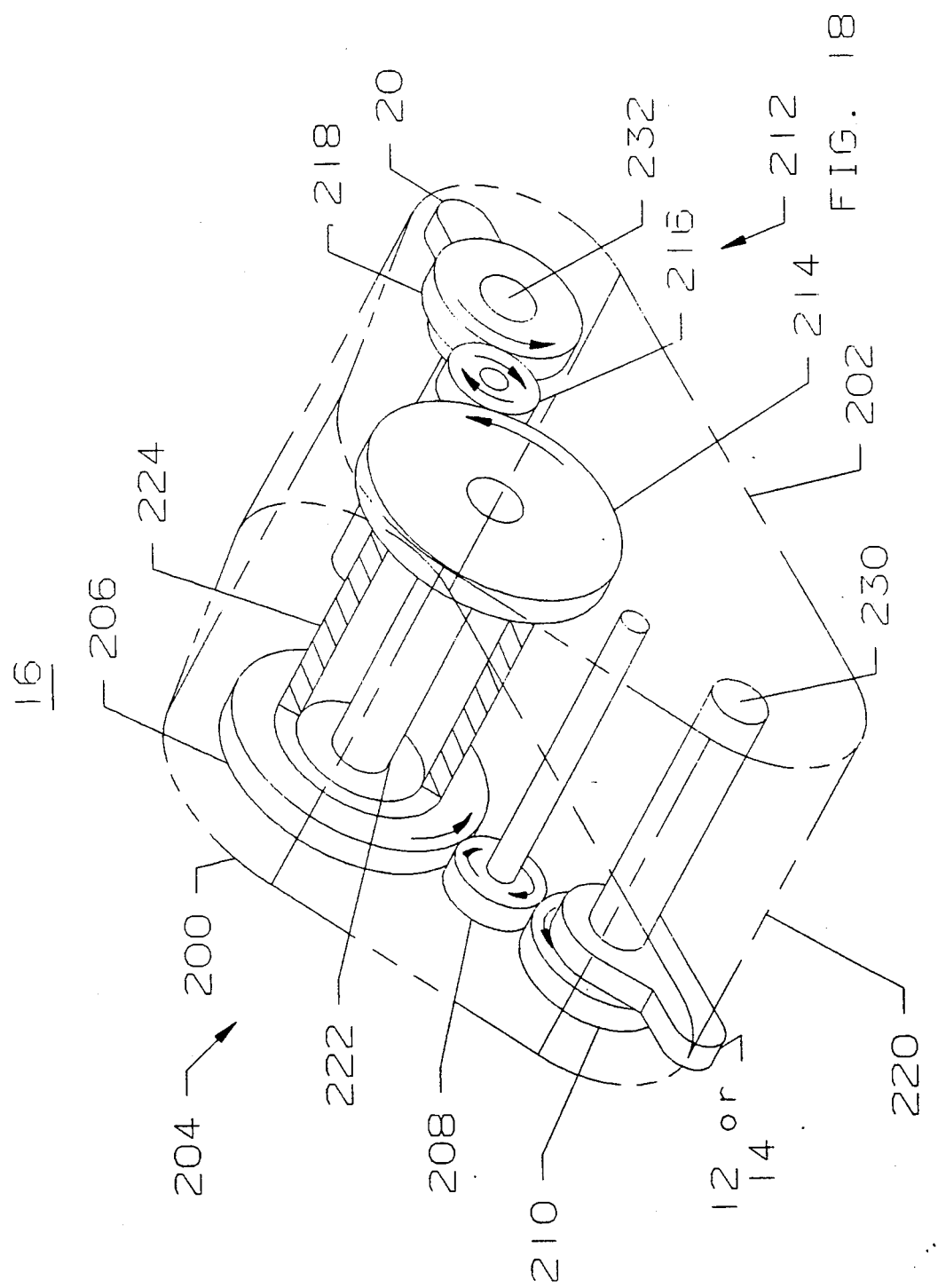
FIG. 18 is a three-dimensional schematic view of a curling link shown in FIG. 1.

Curling links 16 are comprised of two side plates 200 and 202, FIG. 18. The two curling links 16 on tractor 10 are on each end of center body 20 and connect center body 20 to each of the carriages 12 and 14, respectively. Side plate 200 supports a gear train 204 including an inner gear 206, idler gear 208, and an outer gear 210 which is fixed to an outer frame of carriage 12 or carriage 14. Plate 202 supports a second gear train 212 which includes inner gear 214, idler gear 216 and outer gear 218 which is fixed to center body 20. Outer housing 220 secures plates 200 and 202. Common shaft 222 fixed to inner gears 206 and 214 contains a torsional spring 224 which loads both gears 206 and 214 with respect to each other. Spring 224 provides a force through inner gears 206 and 214, which functions as the curling force between carriage 12 and body 20 or carriage 14 and body 20, which is always present and is the basis for the tractor to mechanically feel its way along and into branches such as at T-fittings, X-fittings and elbow fittings. Since spring 224 balances between gears 206 and 214, the curling force applied by curling link 16 to carriage 12 and body 20 or carriage 14 and body 20 remains consistent even though curling link 16 may rotate with respect to carriage 12 and body 20 or carriage 14 and body 20 about pivot points 230 and 232.

Figure 19A:
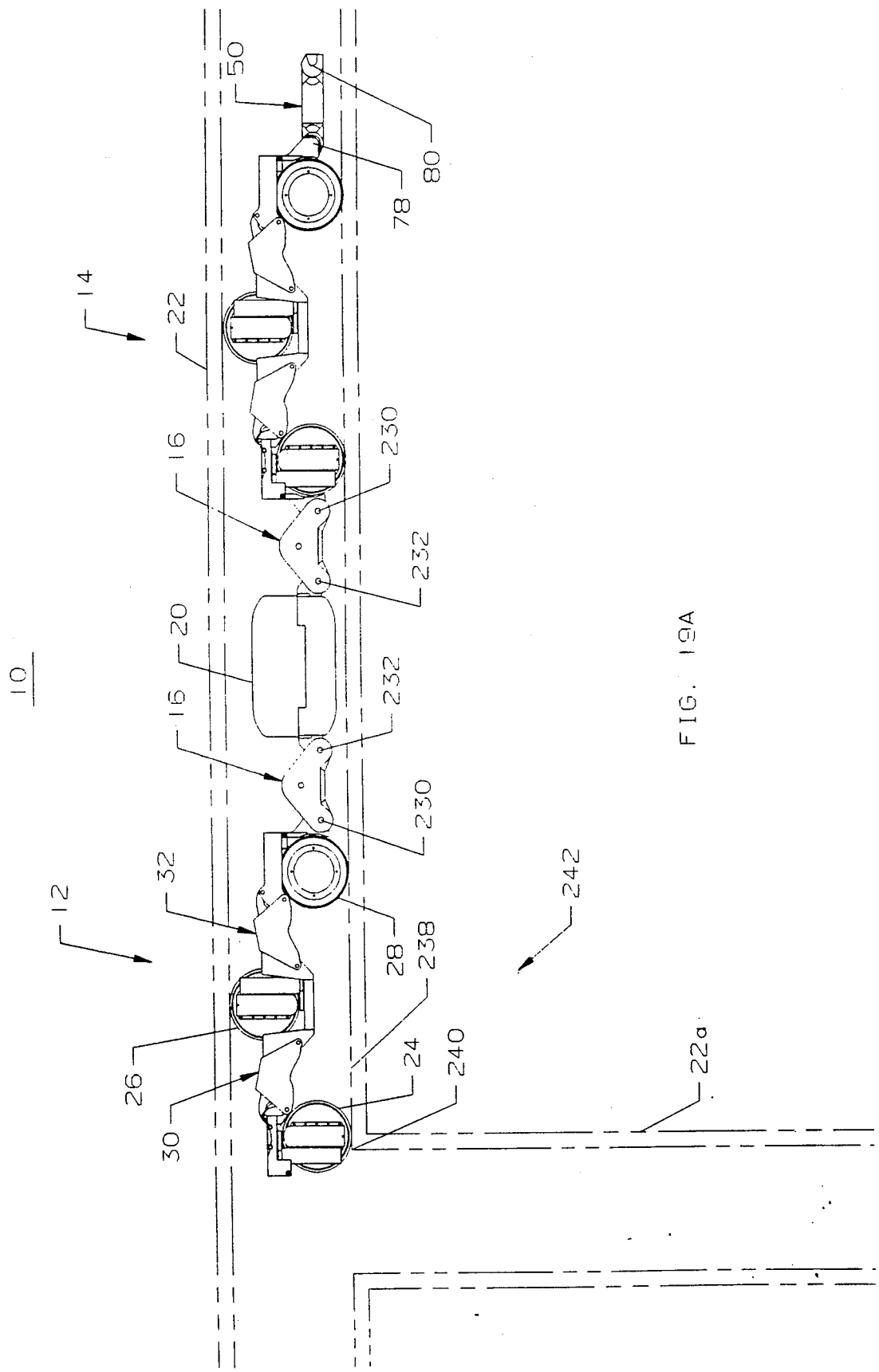
Figure 19B:
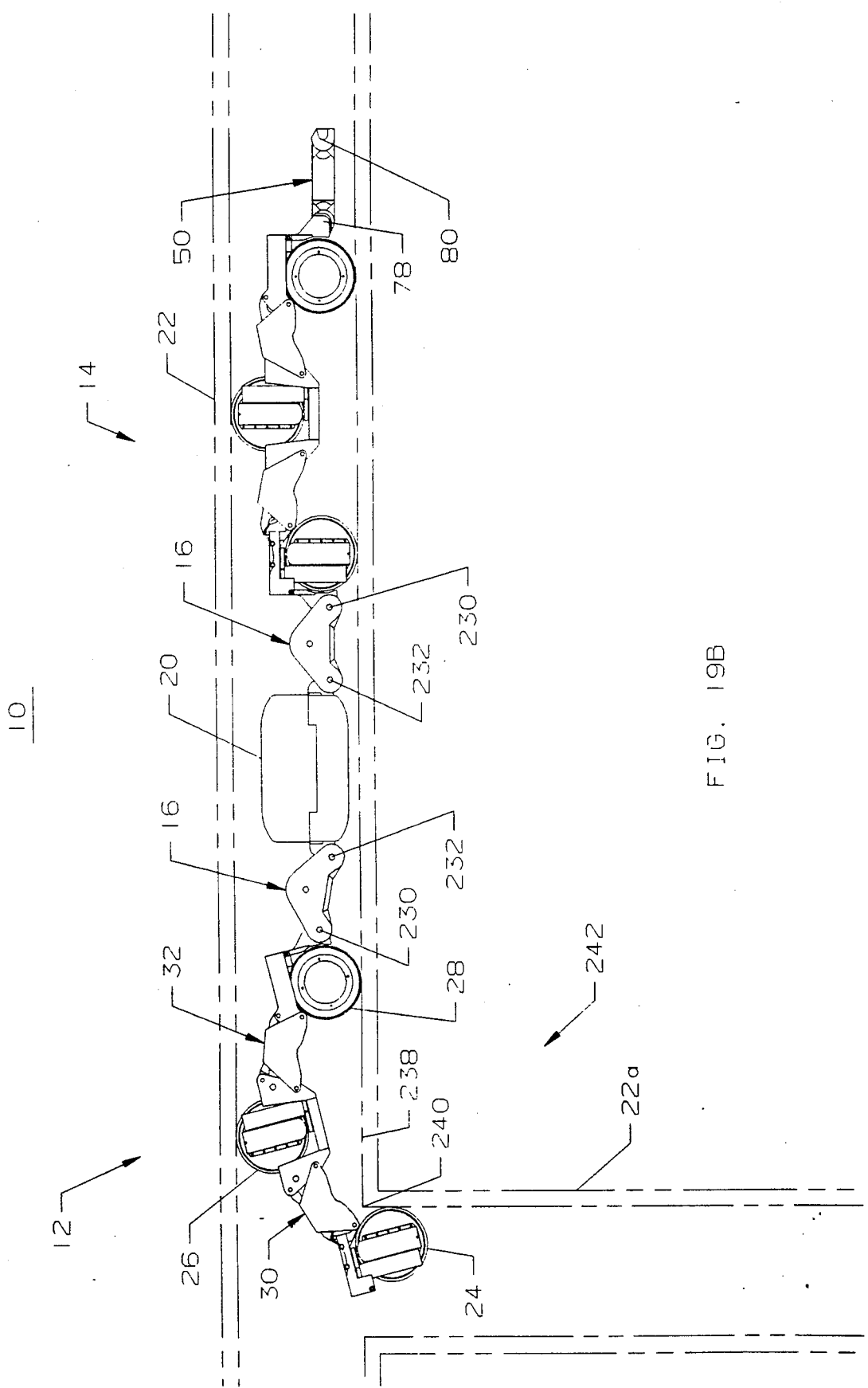
Figure 19C:
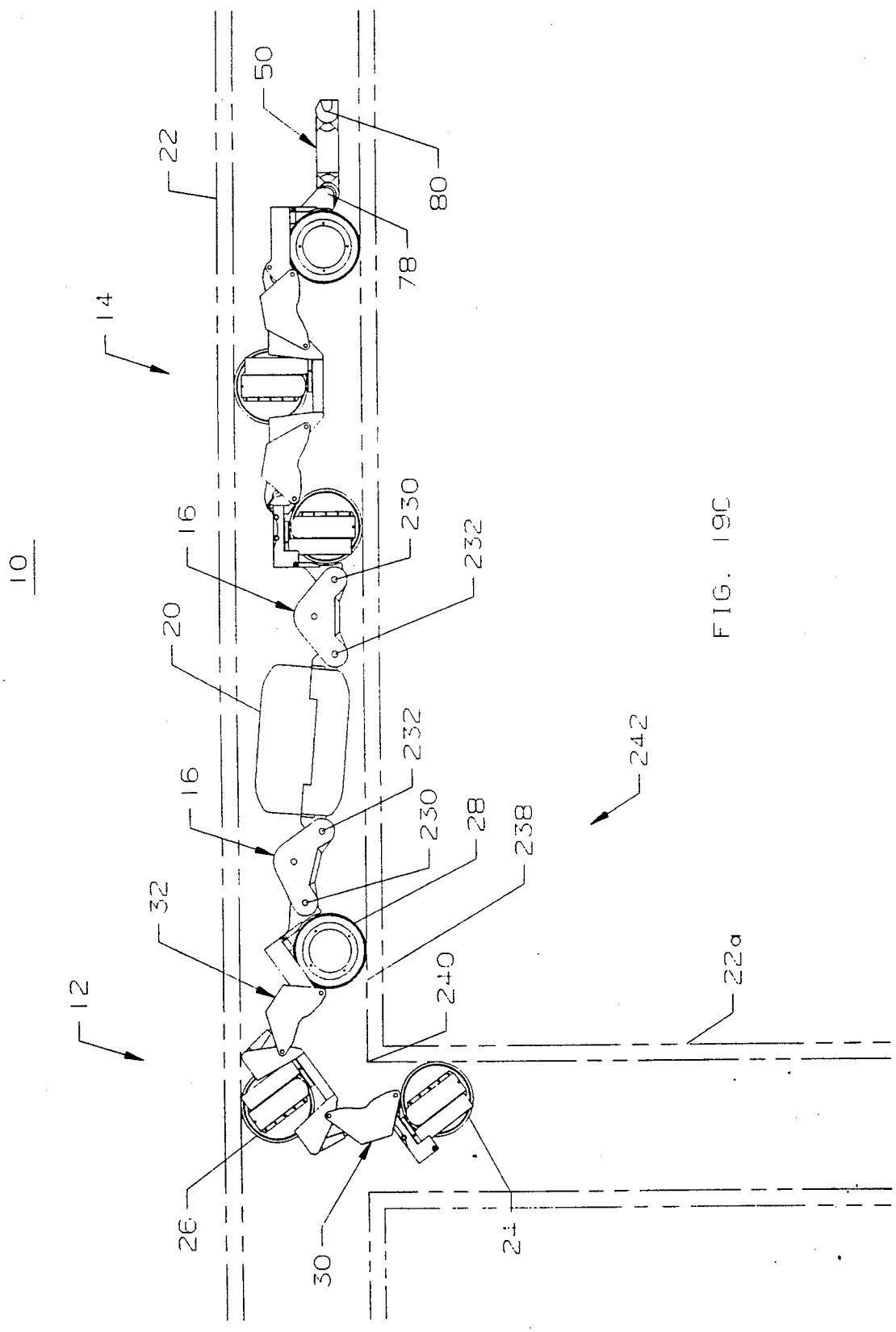
Figure 19D:
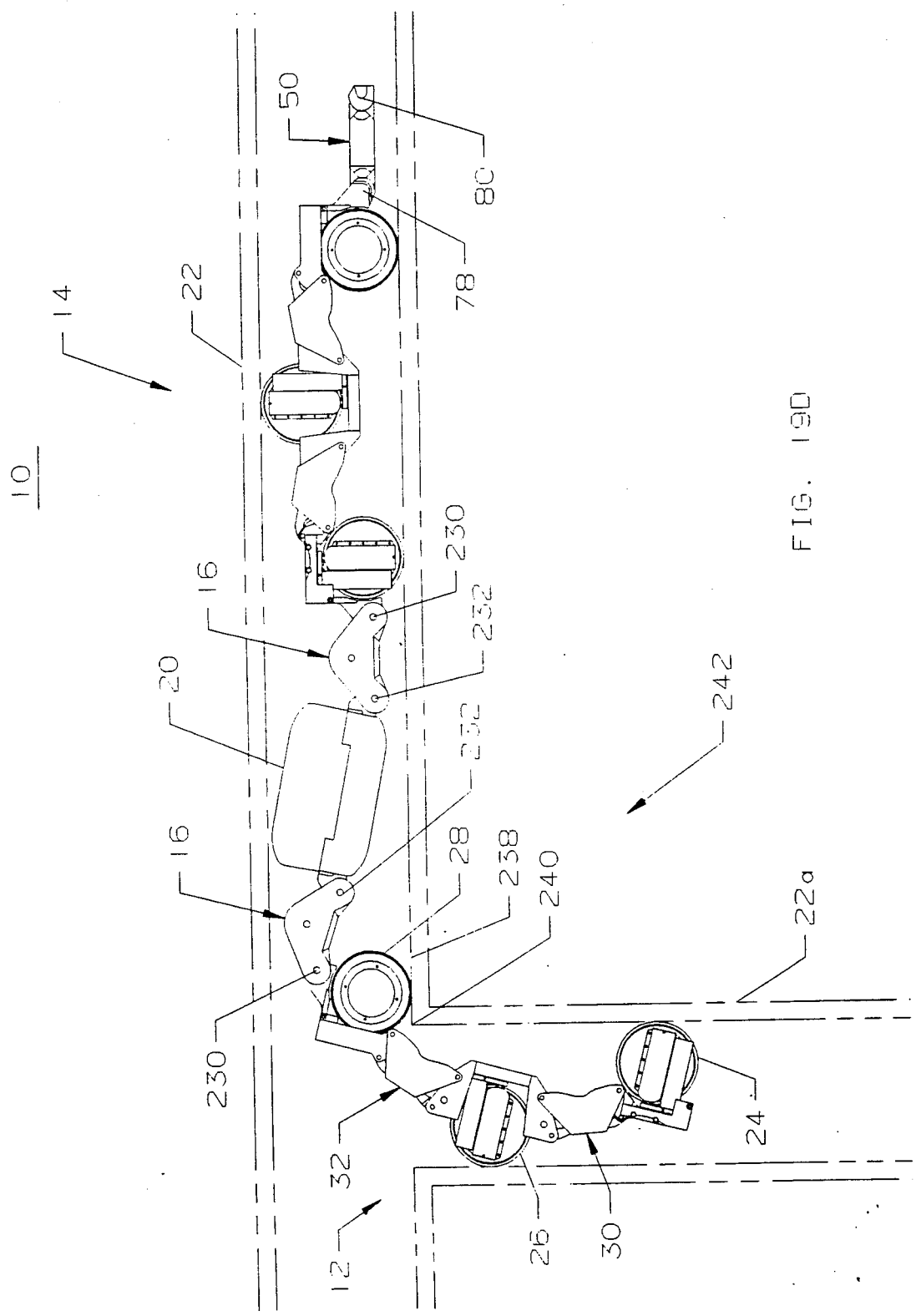
Figure 19E:
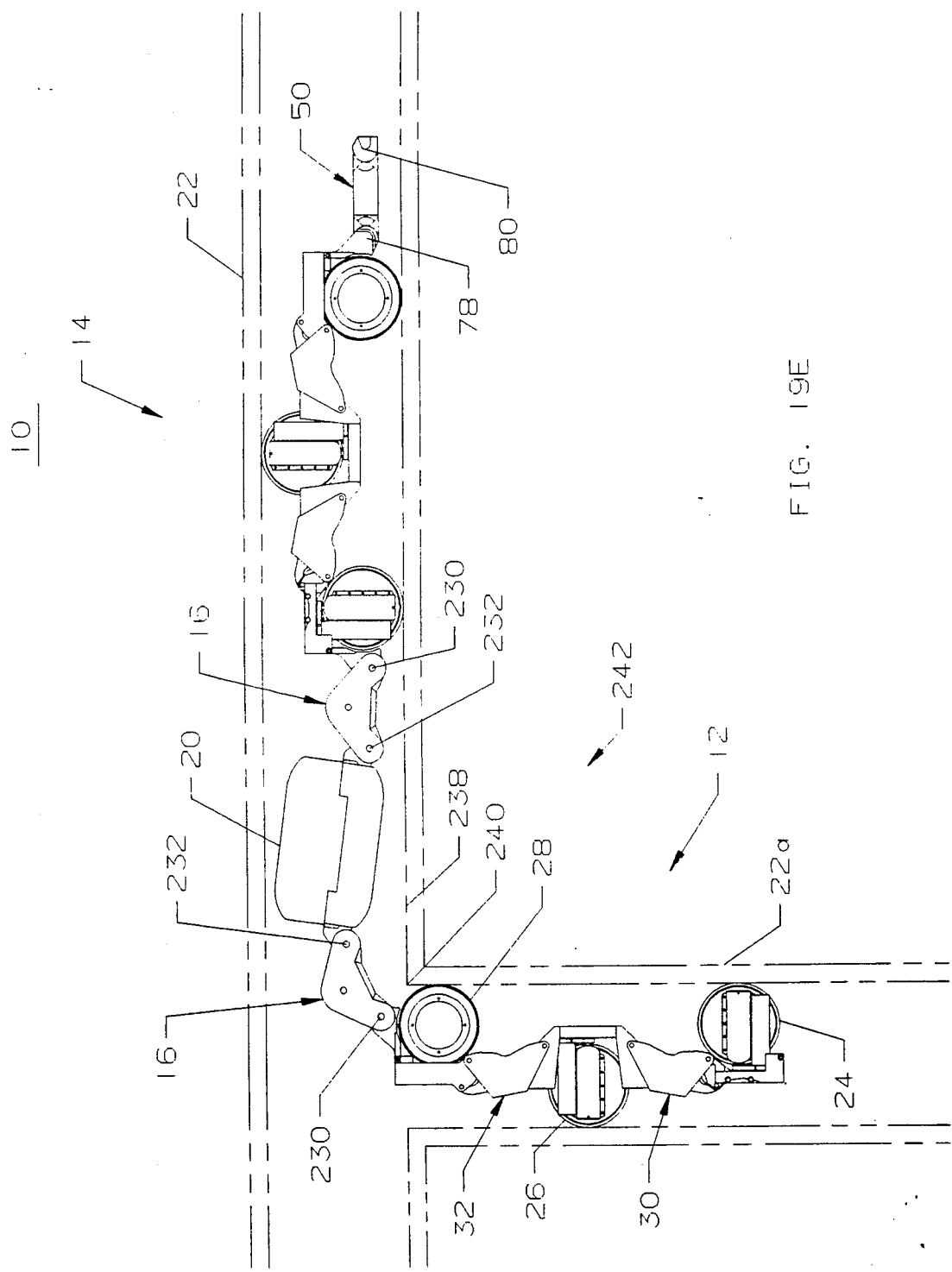
Figure 19F:
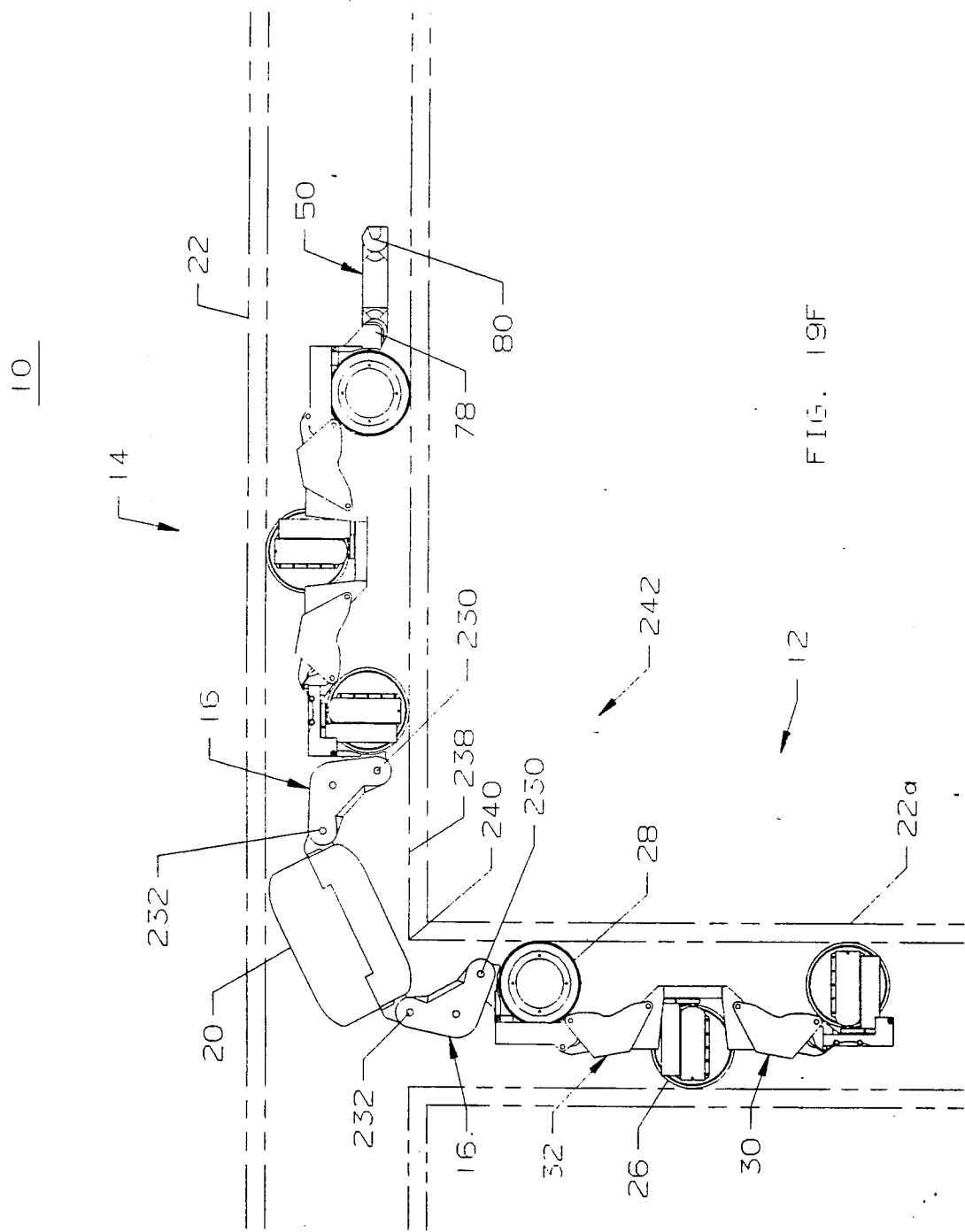
Figure 19K:
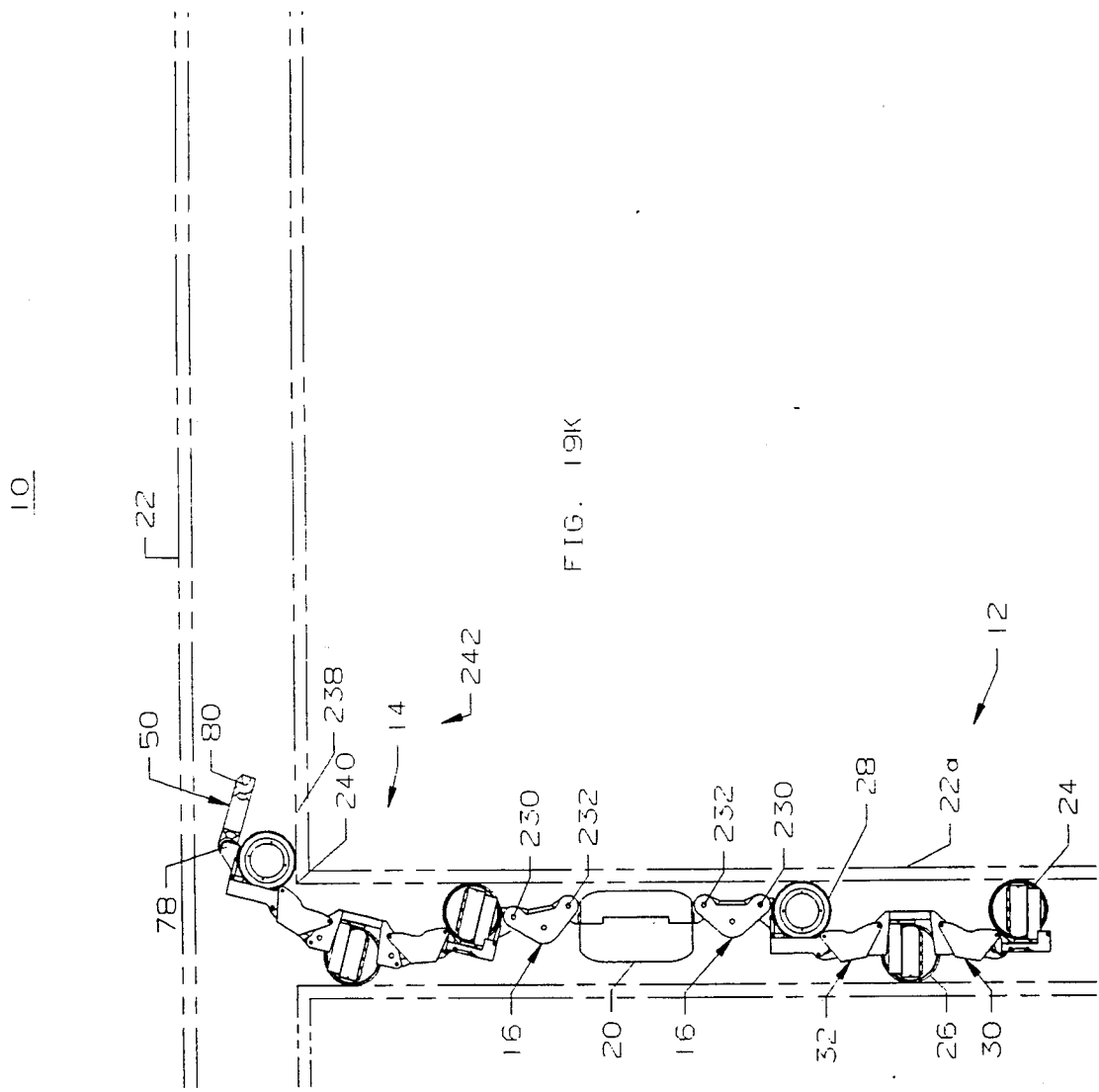

In operation, tractor 10 including carriages 12 and 14 with body 20 between them, mechanically feels its way around corners through the curling force applied through the curling links 16. This occurs when the pivot axes of the curling links 230, 232, as shown in the sequence of FIGS. 19A-L, are generally parallel with the axis 240 of the bend in the pipe 22. Axes 78 and 80 of couplers 50 for the various modules in the train are also aligned in the same way. When this occurs the curling force causes wheel 24, and subsequently wheel 26 and wheel 28, to curl around corner 242 and into branch 22a of pipe 22. Although the curling force smoothly causes the carriage 12, followed by the remainder of tractor 10, to enter into the branch 22a when the curling force is in the plane of the branch 22a to be entered, as shown in FIG. 19A, carriage 12 and the remainder of tractor 10 can be caused to pass by branch 22a simply by reorienting the tractor so that the curling force cannot be applied in the plane of the turn. Such an arrangement is shown in FIG. 20, where carriages 12 and 14 along with body 20 are oriented so that the axes 230, 232, shown simply as a single pivot point 250 and 252, are aligned so that the curling force cannot be applied in the plane of the turn for branch 22a.

The orientation of tractor 10 so as to turn into or pass by a branch can be accomplished in a number of ways. If both carriages 12 and 14 are steerable, FIG. 21A, then the wheels can be set for example at 45° to roll the entire tractor 10 to orient the curling force in the plane of the desired turn, FIG. 21B. Even if one of the carriages, for example 14, is unsteerable, FIG. 22A, the steering action of carriage 12 can rotate body 20 and non-steerable carriage 14 to the proper orientation, FIG. 22B, by virtue of the rigidity of the curling link 16 in that dimension.

Reorientation can also be effected using a passive roll joint 260, FIG. 23A, where both carriages 12 and 14 are steerable. First, steerable carriage 12 is reoriented without reorienting body 20 or steerable carriage 14, FIG. 23B. Subsequently, steerable carriage 14 is reoriented and along with it body 20, so that the entire tractor 10 is reoriented to apply the curling force in the proper plane for turning, FIG. 23C.

If passive joint 260 is implemented instead with a powered roll joint 262, FIG. 24A, then the reorientation can be accomplished even though both carriages are non-steerable. First, non-steerable carriage 12 is unclamped and powered roll joint 262 is rotated to reorient carriage 12, FIG. 24B. Then carriage 12 is again clamped against the sides of pipe 22, carriage 14 is unclamped and powered roll joint 262 is actuated to rotate body 20 and non-steerable carriage 14, FIG. 24C.

Although thus far the curling force has been applied at two positions, between carriage 12 and body 20 and between carriage 14 and body 20, this is not a necessary limitation of the invention. For example, carriages 12 and 14 could be connected directly together using curling link 16a, FIG. 25, so that the force is applied directly to carriages 12 and 14 without the use of body 20.

Figure 26B:
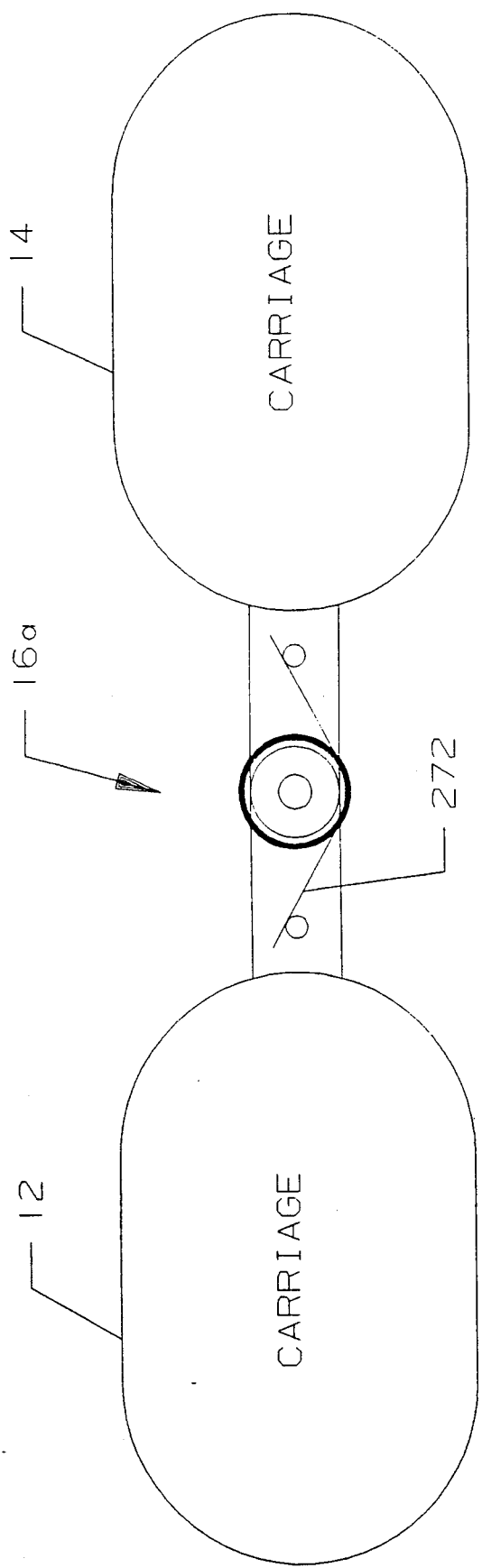

The curling link mechanism of FIG. 18 is not the only mechanism that could be used to generate and apply the curling force. For example, a linear spring 270, FIG. 26a, or a torsional spring 272, FIG. 26B, can be used. While springs 270 and 272 apply a curling force constantly in curling link 16a, force can be applied selectively, intermittently by, the use of a solenoid 274, FIGS. 27A and B, which can be electrically, pneumatically or hydraulically operated.

Thus far the members which engage the walls of the pipe have been shown generally as wheels, but this is not a necessary limitation of the invention as various other devices can be used. For example, a track or tread 280, FIG. 28, can be mounted on trucks or bogies 282 to accomplish the same result.

The three-member or three-wheel construction discussed above is but one embodiment. For example, another embodiment of a carriage 12c, FIG. 29, can employ two wheels 24c, 26c, which engage opposing surfaces of pipe 22 and they are adjusted to the proper diameter and clamping force by clamping mechanism 30c. Each carriage can in fact include but a single wheel 12d, 14d, interconnected by a body 20d for example, if the wheels 12d and 14d are formed of rolling magnets to engage with a ferromagnetic pipe 22d, FIG. 30.

While thus far the curling force is oriented in the plane of the turn by reorienting the tractors either by steering or using a powered roll joint, this is not a necessary limitation of the invention. For example, an "elephant trunk" connector 300, FIG. 31A, can be used as the curling link between carriages 12 and 14. Then curling force on carriages 12 and 14 can be reoriented in the first plane, FIG. 31B, by actuating "elephant trunk" mechanism 300 to apply the curling force in that plane or without rotating carriages 12 and 14, FIG. 31C, mechanism 300 can be turned, FIG. 31D, to orient curling force on carriages 12 and 14 in a second plane, all without changing the orientation of carriages 12 and 14 themselves.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A cornering pipe traveler for moving through a pipe, comprising:
   a tractor having a pair of carriages, a leading carriage and a trailing carriage, each carriage including clamping means for positively engaging the inner surface of the pipe, and means for propelling said carriage along the pipe;
   curling means interconnected between said pair of carriages for exerting a curling force between the two carriages for mechanically compelling the lead carriage to curl in relation to the trailing carriage and enter a turn in the pipe; and
   means for aligning by steering the lead carriage about the longitudinal axis of the tractor so that the curling force mechanically compels the lead carriage to enter a selected turn to be made.

2. The cornering pipe traveler of claim 1 in which said clamping means includes at least two members for contacting opposing surfaces of said pipe.

3. The cornering pipe traveler of claim 1 in which the pipe includes ferromagnetic material and said clamping means includes at least one magnetic member for engaging the pipe surface.

4. The cornering pipe traveler of claim 1 in which said clamping means includes at least three members, two for contacting one surface of the pipe and the third for contacting the opposing surface of the pipe.

5. The cornering pipe traveler of claim 1 in which said clamping means includes means for adjusting said carriage to engage with the surface of pipes having a range of different diameters.

6. The cornering pipe traveler of claim 4 in which said clamping means includes means for adjusting said carriage to engage with the surface of pipes having a range of different diameters.

7. The cornering pipe traveler of claim 6 in which said means for adjusting includes means for maintaining clamping force through a range of angles of said two members about said third member from an acute angle to an angle of at least 180°.

8. The cornering pipe traveler of claim 1 in which said clamping means includes at least one wheel and said means for propelling includes means for driving at least one of said wheels.

9. The cornering pipe traveler of claim 1 in which said clamping means includes at least one track.

10. The cornering pipe traveler of claim 1 in which said means for aligning includes means for orienting the tractor to align the plane of the curling force with the plane of the turn.

11. The cornering pipe traveler of claim 10 in which said means for orienting includes means for steering at least one of said carriages.

12. The cornering pipe traveler of claim 11 in which said means for steering includes means for steering each of said carriages.

13. The cornering pipe traveler of claim 6 in which said members are adapted to swivel about a swivel axis, and said means for aligning includes means for swivelling said members of at least one of said carriages about their respective swivel axes to reorient that carriage and the plane of the curling force.

14. The cornering pipe traveler of claim 13 in which said clamping means further includes means for interconnecting said third member with each of said first and second members for maintaining the position of the swivel axes relative to the pipe surface.

* * * * *